US012294262B2

(12) United States Patent
Uga et al.

(10) Patent No.: US 12,294,262 B2
(45) Date of Patent: May 6, 2025

(54) ROTATING ELECTRIC MACHINE

(71) Applicant: DENSO CORPORATION, Kariya (JP)

(72) Inventors: Toshiaki Uga, Kariya (JP); Hiroshi Kaneiwa, Kariya (JP); Akihito Koike, Kariya (JP); Masayoshi Yamamoto, Kariya (JP); Kazuya Enokizono, Kariya (JP); Hiroshi Endo, Kariya (JP)

(73) Assignee: DENSO CORPORATION, Kariya (JP)

( * ) Notice: Subject to any disclaimer, the term of this patent is extended or adjusted under 35 U.S.C. 154(b) by 65 days.

(21) Appl. No.: 17/517,312

(22) Filed: Nov. 2, 2021

(65) Prior Publication Data

US 2022/0140681 A1  May 5, 2022

(30) Foreign Application Priority Data

Nov. 4, 2020  (JP) .................................. 2020-184740

(51) Int. Cl.
*H02K 3/12* (2006.01)
*H02K 1/16* (2006.01)
*H02K 3/28* (2006.01)

(52) U.S. Cl.
CPC ................. *H02K 3/12* (2013.01); *H02K 1/16* (2013.01); *H02K 3/28* (2013.01); *H02K 2213/03* (2013.01)

(58) Field of Classification Search
CPC .. H02K 3/28; H02K 1/16; H02K 3/12; H02K 3/04; H02K 3/14; H02K 3/18; H02K 3/46;
(Continued)

(56) References Cited

U.S. PATENT DOCUMENTS 3,916,273 A * 10/1975 Leistner .................... H02K 3/28
  318/724
4,351,102 A *  9/1982 Grozinger ................ H02K 3/28
  242/432

(Continued)

FOREIGN PATENT DOCUMENTS

CN  110556934 A  12/2019
DE  102013108798 A1 *  2/2014  ............... H02K 3/28
(Continued)

OTHER PUBLICATIONS

Espacenet, DE 102013108798 A1 Translation (Year: 2014).*
17517312_NPL_Search IP.com (Year: 2023).*
JP 2019201485 A-Translation (Year: 2024).*

*Primary Examiner* — Christopher M Koehler
*Assistant Examiner* — Ahmed F Seck
(74) *Attorney, Agent, or Firm* — Oliff PLC

(57) ABSTRACT

In a rotating electric machine, an armature winding includes segmented conductors that include a coil side portion, housed in slots of the armature, and a coil end portion protruding from an armature core on both sides in an axial direction. The coil side portions are housed in the slots so as to form 2N+1 layers in a radial direction. The coil end portion connects two coil side portions respectively housed in the slots that are a predetermined pitch apart in a circumferential direction. The coil end portion includes a first coil end portion connecting the coil side portions of differing layers in the radial direction and a second coil end portion connecting the coil side portions of the same layer. On both ends in the axial direction, any of the plurality of coil side portions that are housed in the slots is connected to the second coil end portion.

18 Claims, 40 Drawing Sheets

(58) Field of Classification Search
CPC .. H02K 3/48; H02K 3/52; H02K 1/06; H02K 15/02; H02K 15/04; H02K 15/0414; H02K 15/0421; H02K 15/0428; H02K 15/0435; H02K 15/0042; H02K 15/045; H02K 15/0464; H02K 15/0471; H02K 15/0478; H02K 15/0485; H02K 15/0492; H02K 15/06; H02K 15/062; H02K 15/063; H02K 15/064; H02K 15/065; H02K 15/08; H02K 15/085; H02K 15/09; H02K 17/12; H02K 17/06; H02K 17/14; H02K 7/02; H02K 7/12
See application file for complete search history.

(56) References Cited

U.S. PATENT DOCUMENTS

| | | | |
|---|---|---|---|
| 5,449,962 A * | 9/1995 | Shichijyo | H02K 3/28 310/198 |
| 6,414,410 B1 | 7/2002 | Nakamura et al. | |
| 6,794,785 B2 | 9/2004 | Isogai et al. | |
| 9,906,085 B2 | 2/2018 | Nakamura et al. | |
| 2001/0038251 A1* | 11/2001 | Nakamura | H02K 15/085 310/180 |
| 2008/0079328 A1 | 4/2008 | Shichijoh et al. | |
| 2014/0125185 A1* | 5/2014 | Suzuki | H02K 3/28 310/198 |
| 2017/0310169 A1* | 10/2017 | Neet | H02K 3/12 |
| 2018/0294686 A1 | 10/2018 | Sawada et al. | |
| 2019/0149004 A1 | 5/2019 | Tamura et al. | |
| 2020/0161916 A1 | 5/2020 | E Silva et al. | |
| 2021/0305864 A1* | 9/2021 | Ahmed | H02K 3/28 |

FOREIGN PATENT DOCUMENTS

| | | | |
|---|---|---|---|
| JP | 2006-94694 A | 4/2006 | |
| JP | 2011-193600 A | 9/2011 | |
| JP | 2014-36559 A | 2/2014 | |
| JP | 2014217136 A | 11/2014 | |
| JP | 2016-123249 A | 7/2016 | |
| JP | 2019201485 A * | 11/2019 | H02K 3/28 |

* cited by examiner

THIRD EMBODIMENT

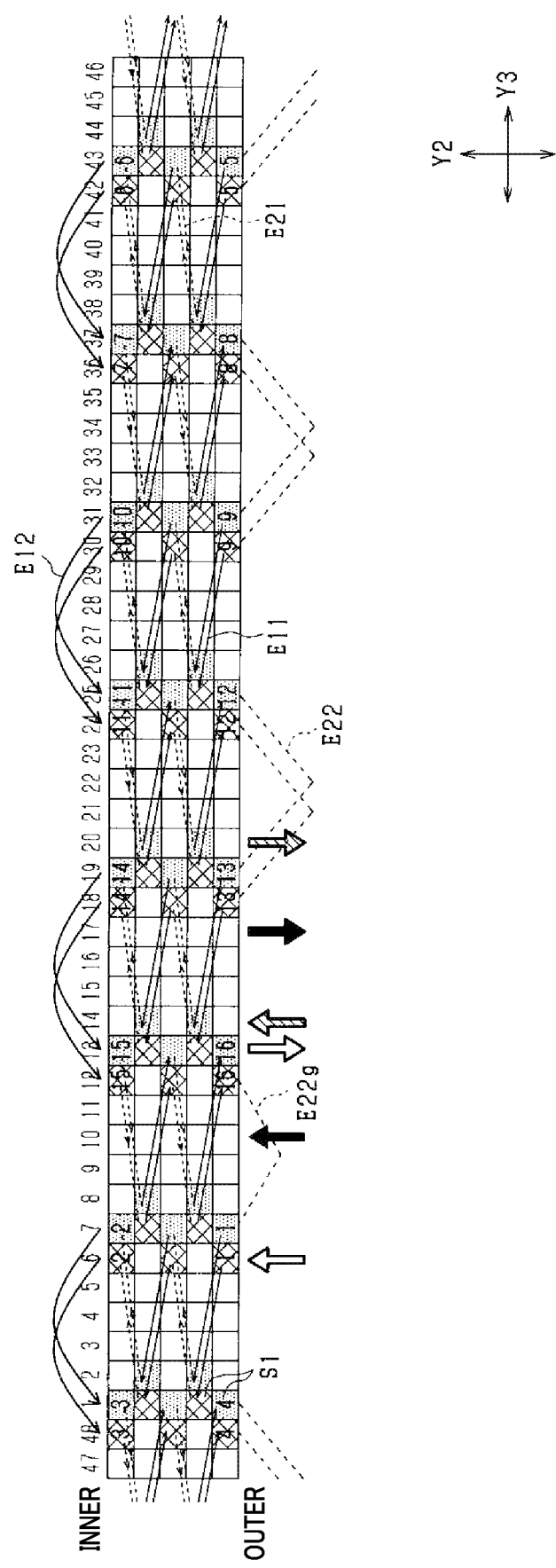

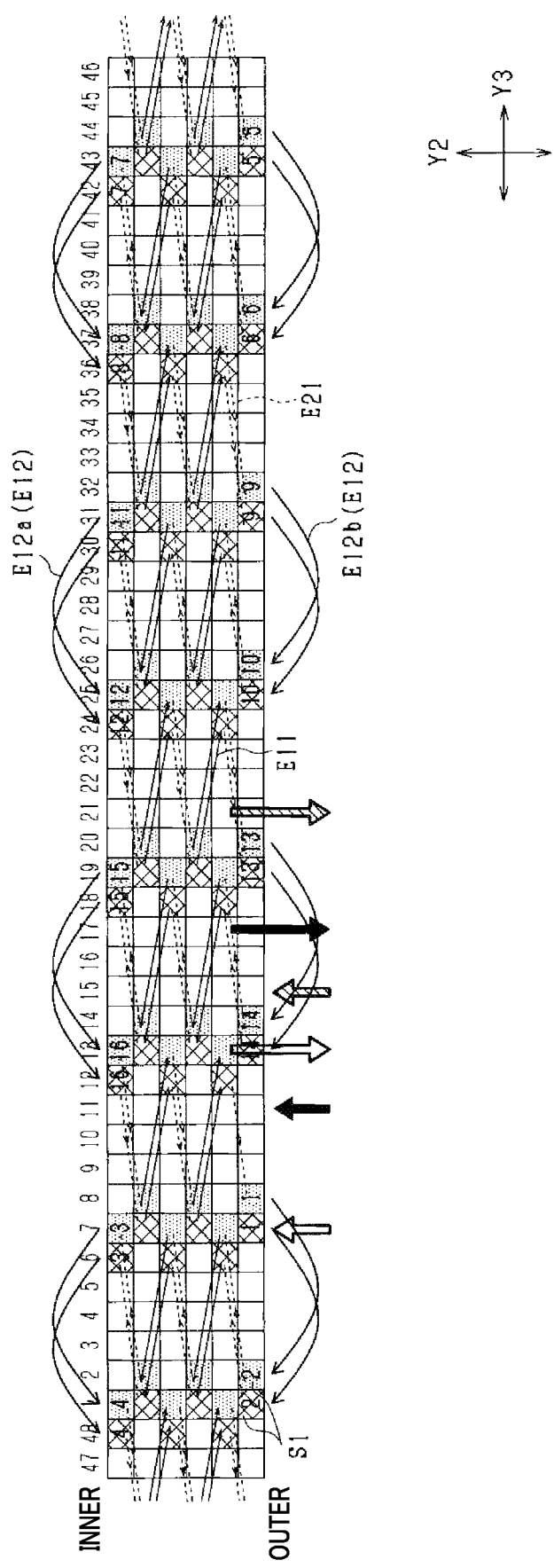

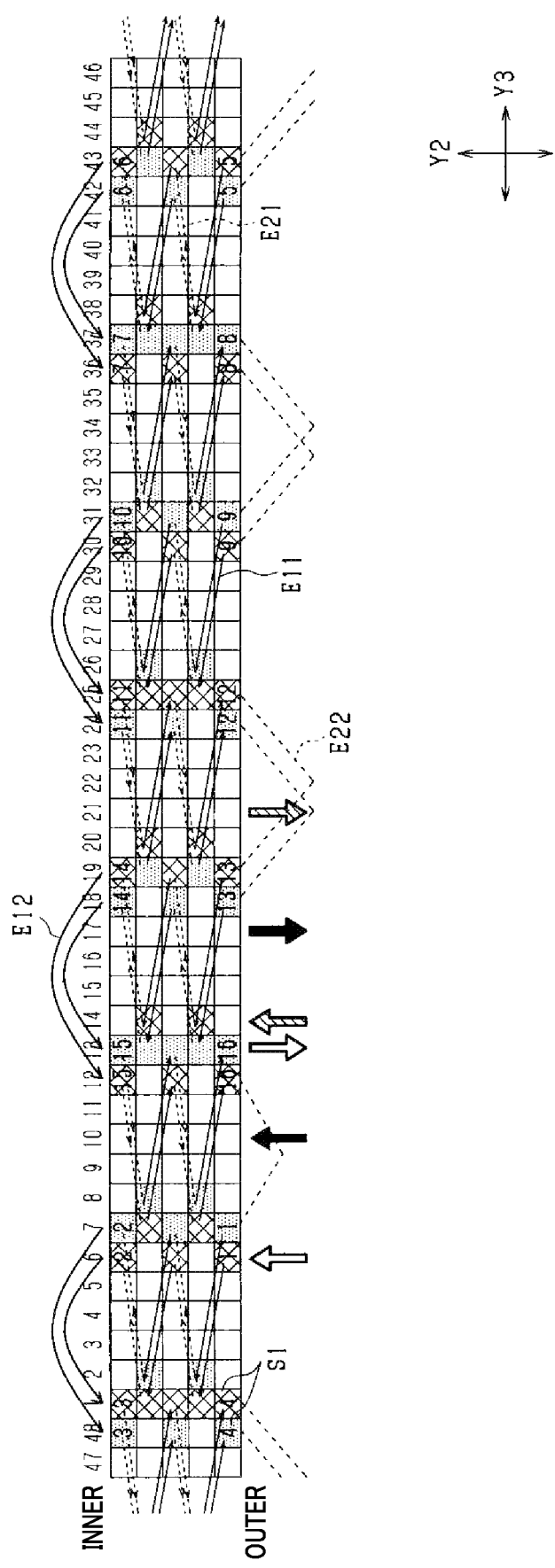

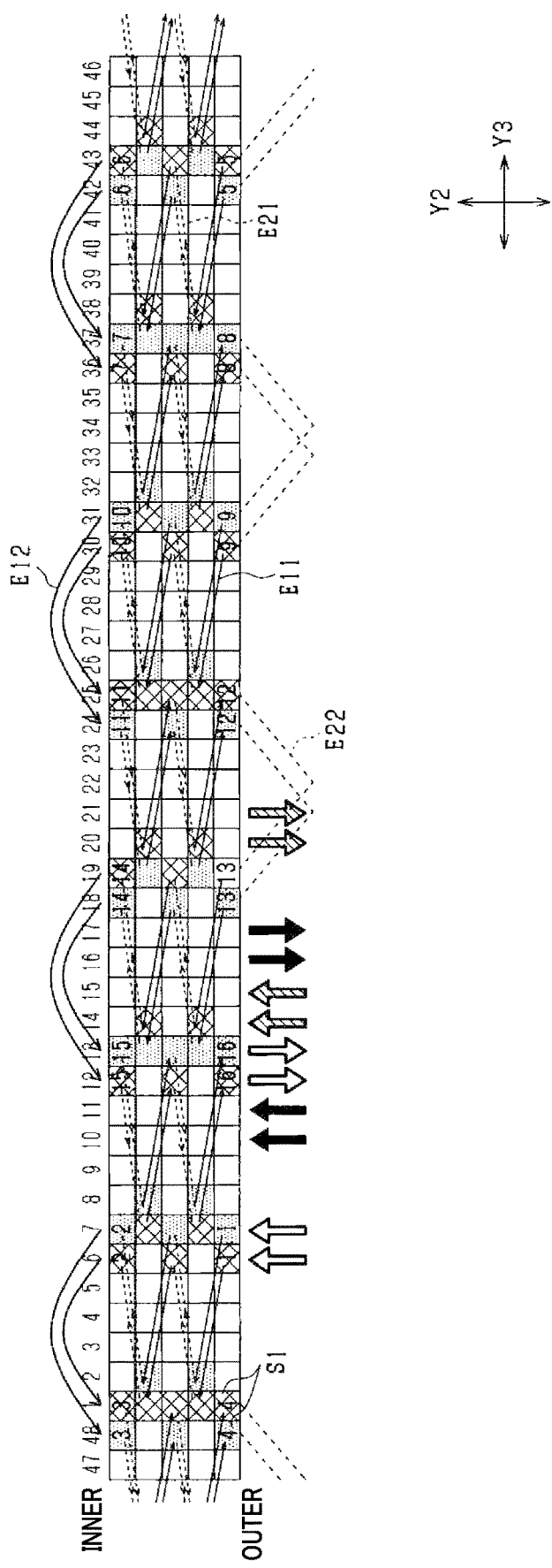

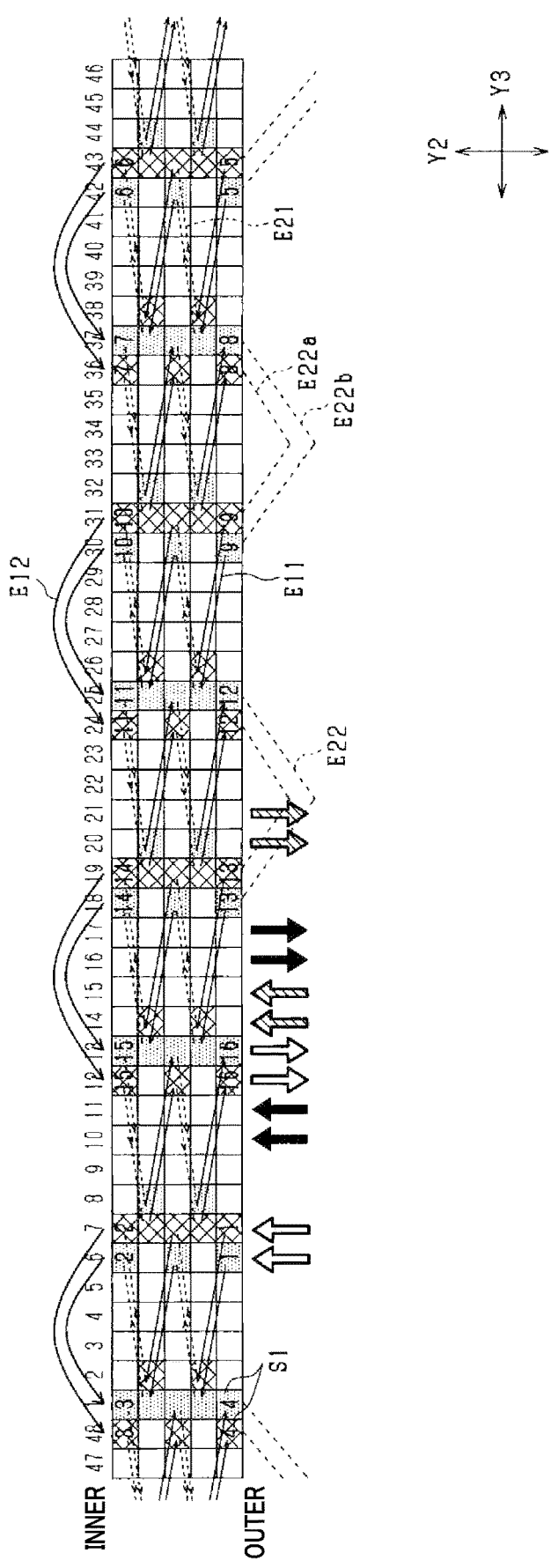

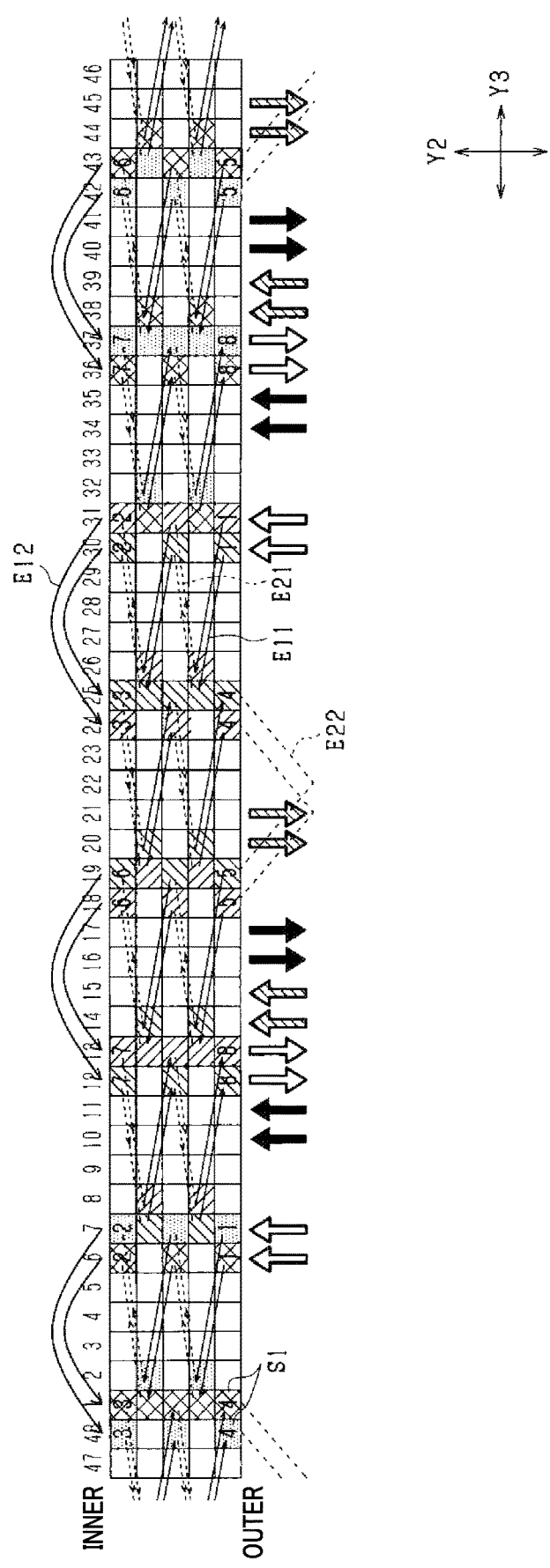

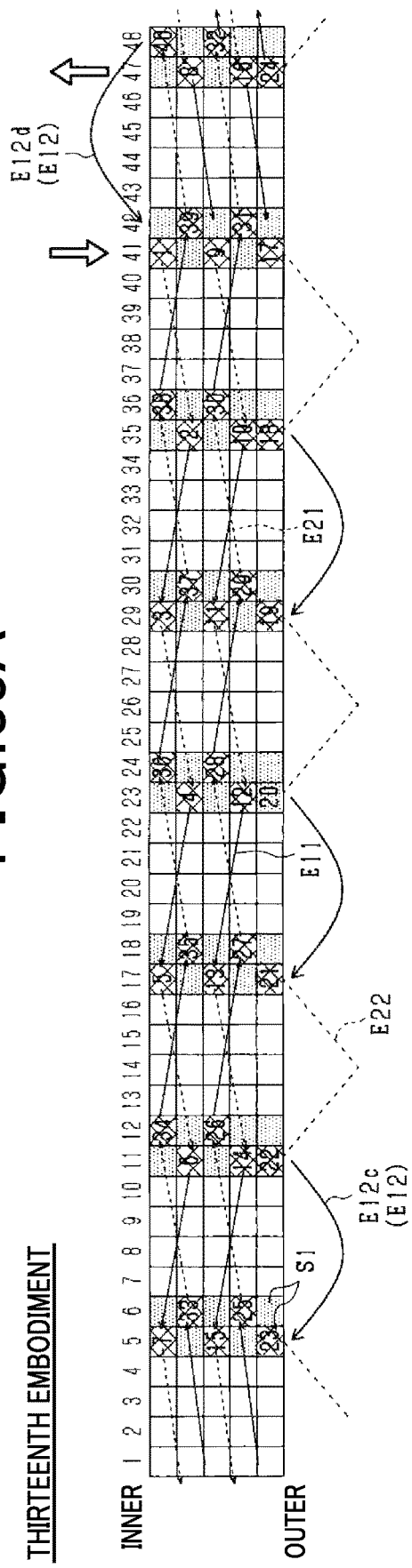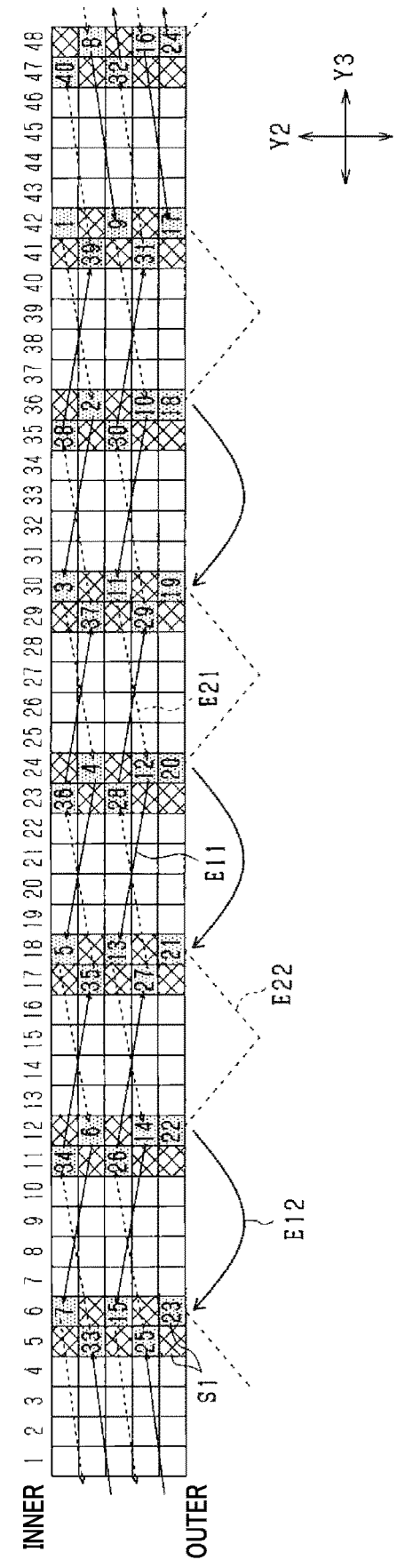

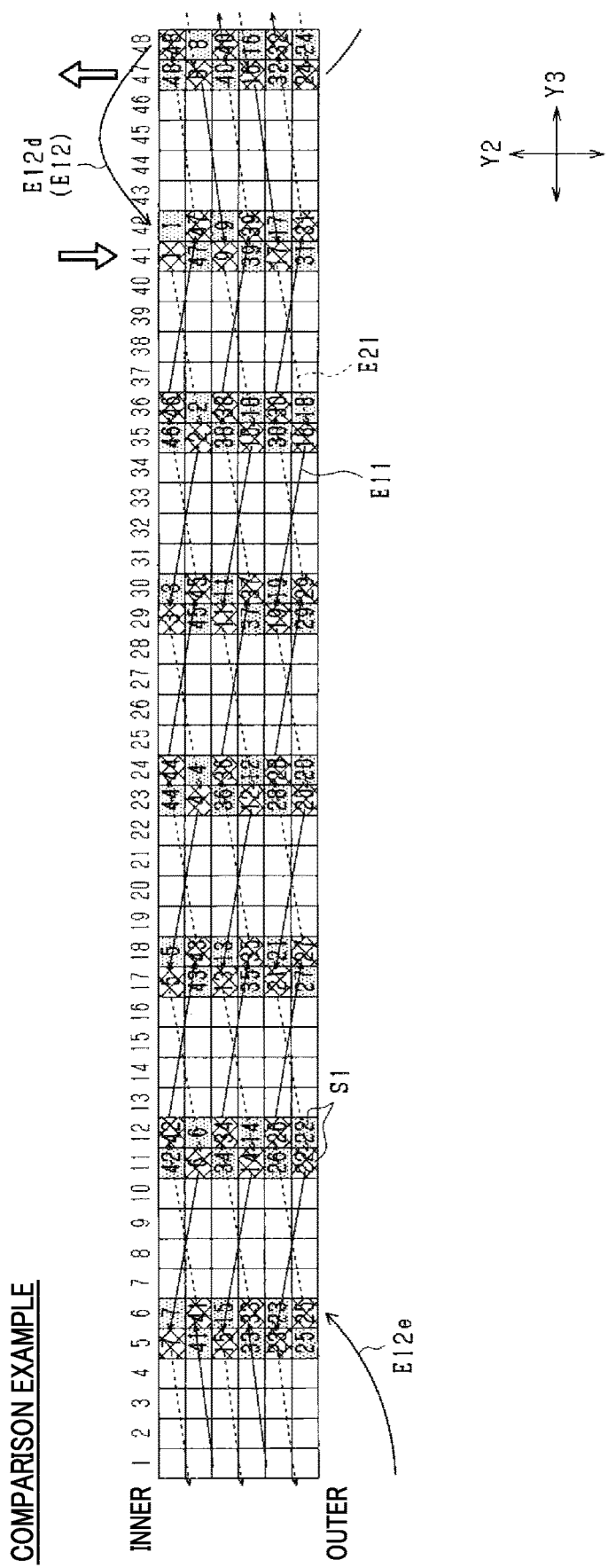

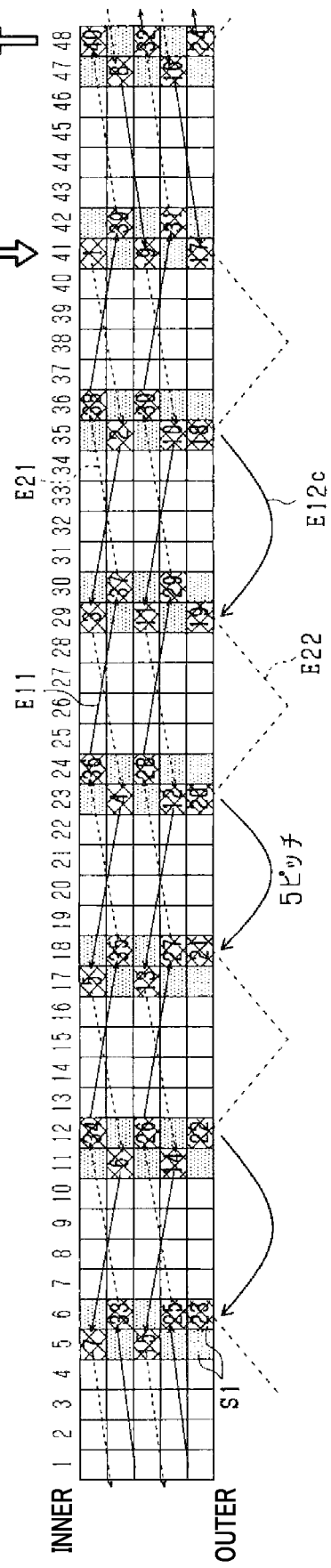
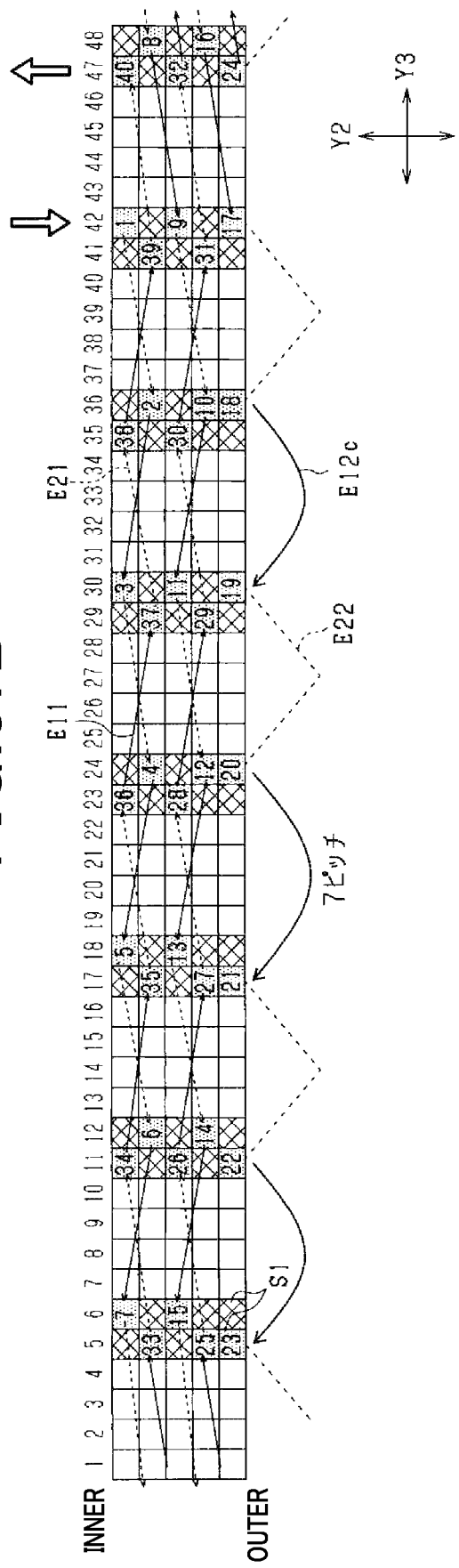

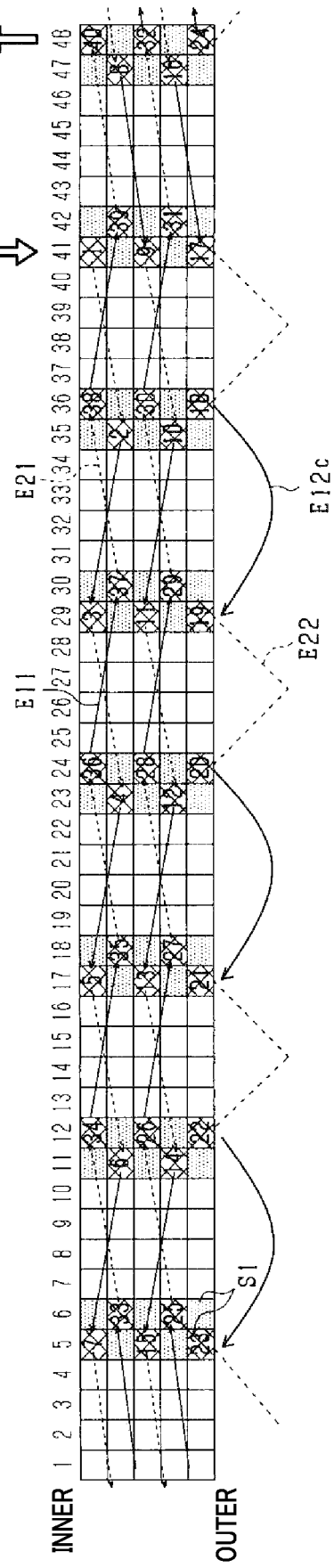
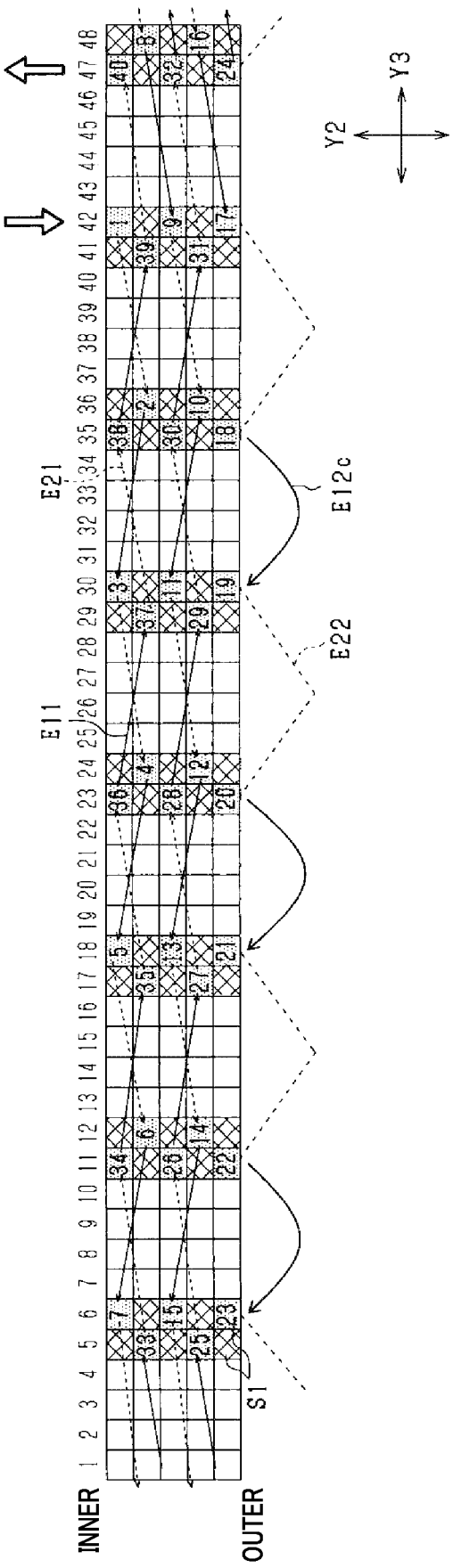
FIG.38A
FIG.38B

ROTATING ELECTRIC MACHINE

CROSS-REFERENCE TO RELATED APPLICATIONS

This application is based on and claims the benefit of priority from Japanese Patent Application No. 2020-184740, filed on Nov. 4, 2020. The entire disclosure of the above application is incorporated herein by reference.

BACKGROUND

Technical Field

The present invention relates to a rotating electric machine.

Related Art

A rotating electric machine includes an armature in which an armature winding of multiple phases is wound around an armature core. Conventionally, as this armature winding, the following armature winding is known. This armature winding is configured by both leg portions of a U-shaped coil segment being inserted into slots in the armature core from one side in an axial direction, and the leg portions of the coil segment that protrude on another side in the axial direction being connected together.

SUMMARY

One aspect of the present disclosure provides a rotating electric machine that includes an armature winding and an armature core around which the armature winding is wound. The armature is provided with a plurality of slots in a circumferential direction thereof. The armature winding is configured by a plurality of segmented conductors being connected. Each of the segmented conductors includes a coil side portion that is housed in the slots and a coil end portion that protrudes from the armature core on both sides in an axial direction of the armature core. The coil side portions are housed in the slots so as to form 2N+1 layers, where N is a natural number. The coil end portion is configured to connect two coil side portions that are respectively housed in the slots that are a predetermined pitch apart in the circumferential direction. The coil end portion includes a first coil end portion that connects together the coil side portions of differing layers in a radial direction and a second coil end portion that connects together the coil side portions of a same layer in the radial direction. On both ends in the axial direction, any of the plurality of coil side portions that are housed in the slots is connected to the second coil end portion.

BRIEF DESCRIPTION OF THE DRAWINGS

In the accompanying drawings:
FIG. 27 is a wiring diagram of a wiring pattern of a U-phase stator winding according to an eighth embodiment;
FIG. 28 is a wiring diagram of a comparison example of the wiring pattern;
FIG. 29 is a wiring diagram of a wiring pattern of a U-phase stator winding according to a ninth embodiment;
FIG. 30 is a wiring diagram of a wiring pattern of a U-phase stator winding according to a tenth embodiment;
FIG. 31 is a wiring diagram of a wiring pattern of a U-phase stator winding according to an eleventh embodiment;
FIG. 34 is a wiring diagram of a wiring pattern of a U-phase stator winding according to a twelfth embodiment;
FIG. 35A and FIG. 35B are wiring diagrams of a wiring pattern of a U-phase stator winding according to a thirteenth embodiment;
FIG. 36 is a wiring diagram of a comparison example of the wiring pattern;
FIG. 37A and FIG. 37B are wiring diagrams of a wiring pattern of a U-phase stator winding according to a fourteenth embodiment;
FIG. 38A and FIG. 38B are wiring diagrams of a wiring pattern of a U-phase stator winding according to a fifteenth embodiment;

DESCRIPTION OF THE EMBODIMENTS

Figure 1:
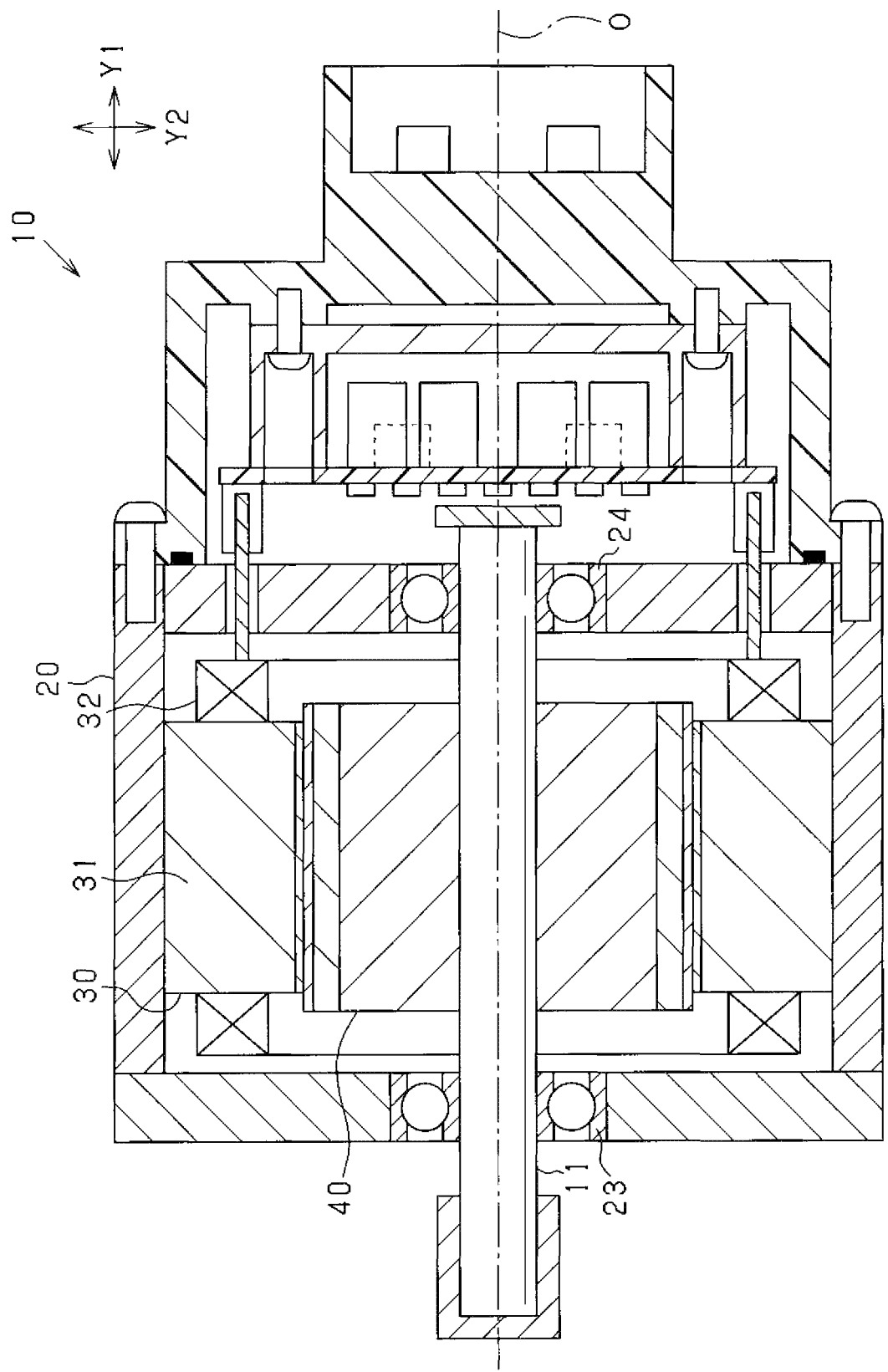
FIG. 1 is a cross-sectional view of a motor.
Figure 2:
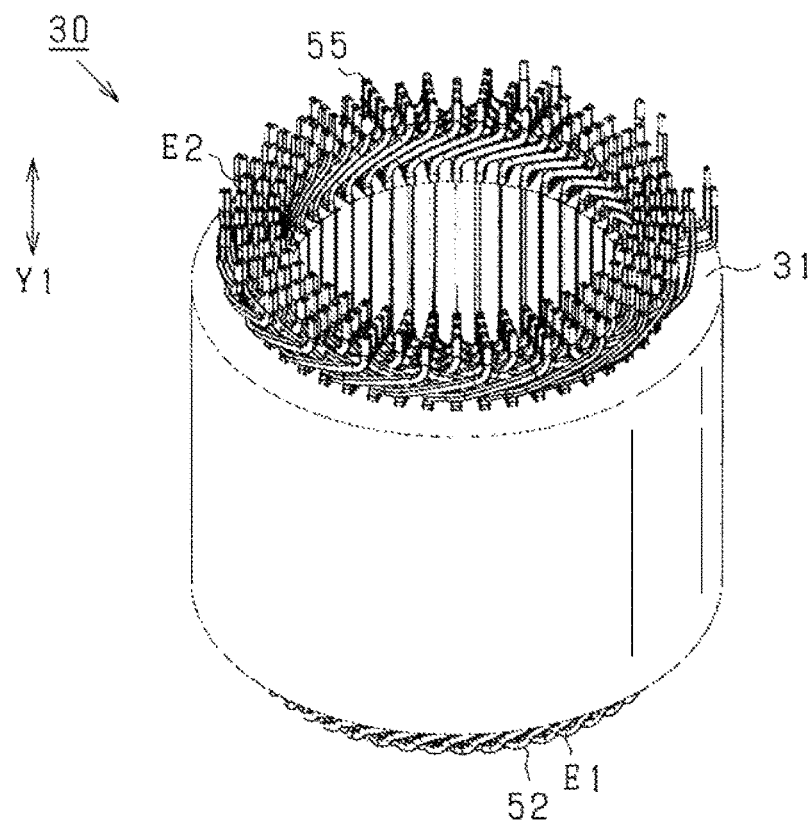
FIG. 2 is a perspective view of a stator.

A rotating electric machine includes an armature in which an armature winding of multiple phases is wound around an armature core. Conventionally, as this armature winding, the following armature winding is known (for example, Japanese Patent Publication No. 6623961). This armature winding is configured by both leg portions of a U-shaped coil segment being inserted into slots in the armature core from one side in an axial direction, and the leg portions of the coil segment that protrude on another side in the axial direction being connected together.

Here, to enable accommodation of various demands placed on the rotating electric machine, a greater variation in the number of turns of a stator winding is preferable. However, to actualize a desired number of turns, the number of layers of coil side portions inside slots is required to be finely changed in single-layer units. However, when the stator winding is configured by coil segments, in a conventional technology, a configuration is such that, on a coil end on one side in the axial direction, the coil side portions of layers that are adjacent in a radial direction are invariably connected to each other by welding. That is, a coil end in which the coil side portions of a same layer in the radial direction are connected to each other is only arranged on the other side in the axial direction. Therefore, changing the number of layers of the coil side portions from an even number to an odd number while maintaining a basic configuration of the winding is not possible.

It is thus desired to provide a rotating electric machine in which, as a result of an armature in which coil side portions are provided in an odd-number of layers which are reduced from those of a conventional armature in which the coil side portions are provided in an even-number of layers, changes to specifications can be easily made when the number of turns is changed to an odd number.

A first exemplary embodiment provides a rotating electric machine that includes an armature winding and an armature core around which the armature winding is wound. The armature is provided with a plurality of slots in a circumferential direction thereof. The armature winding is configured by a plurality of segmented conductors being connected. Each of the segmented conductors includes a coil side portion that is housed in the slots and a coil end portion that protrudes from the armature core on both sides in an axial direction of the armature core. The coil side portions are housed in the slots so as to form 2N+1 layers, where N is a natural number. The coil end portion is configured to connect two coil side portions that are respectively housed in the slots that are a predetermined pitch apart in the circumferential direction. The coil end portion includes a first coil end portion that connects together the coil side portions of differing layers in a radial direction and a second coil end portion that connects together the coil side portions of a same layer in the radial direction. On both ends in the axial direction, any of the plurality of coil side portions that are housed in the slots is connected to the second coil end portion.

As a result of the above-described embodiment, the coil side portions can be housed in the slots so as to form 2N+1 layers, where N is a natural number, and the number of turns of the armature winding can be set to an odd number. In addition, when the coil side portions form 2N+2 layers, where N is a natural number, on a first end side of both ends in the axial direction, an even number of coil side portions among the plurality of coil side portions that are housed in the slots is connected to the second coil end portions. Meanwhile, on a second end side, all of the coil side portions are connected to the first coil end portions. Therefore, when the coil side portions are changed from 2N+2 layers to 2N+1 layers, the second coil end portions on the first end side are eliminated, and instead, the second coil end portions are provided on the second end side, while the number of layers of the coil side portions is reduced. Therefore, the number of layers of the coil side portions can be easily changed from 2N+2 layers to 2N+1 layers. Changing of the number of turns can be facilitated.

According to a second exemplary embodiment, in the first exemplary embodiment, the second coil end portion connects together the coil side portions that are arranged in an outermost layer or an innermost layer in the radial direction.

The first coil end portion and the second coil end portion have differing shapes. Therefore, when the first coil end portion is changed to the second coil end portion, interference may occur. Thus, when the second coil end portion is arranged in a layer other than the outermost layer or the innermost layer, the second coil end portion may interfere with the first coil end portion due to the difference in shape. The shape of not only the second coil end portion but also the first coil end portion may require change. Therefore, the second coil end portion is arranged in the outermost layer or the innermost layer in the radial direction. Space in which the shape of the second coil end portion can be arbitrarily changed is ensured. Changing of the shape of the first coil end portion can be avoided.

According to a third exemplary embodiment, in the first or second exemplary embodiment, the armature winding is a lap winding. On a first end side of both ends in the axial direction, the coil side portion that is housed in an outermost layer in the radial direction is connected to the second coil end portion. On a second end side, the coil side portion that is housed in an innermost layer is connected to the second coil end portion. As a result, only either of the innermost layer and the outermost layer need be changed. The number of sections to be changed can be reduced.

According to a fourth exemplary embodiment, in the first or second exemplary embodiment, the armature winding is a wave winding. On both sides in the axial direction, the coil side portion that is housed in either of an innermost layer and an outermost layer in the radial direction is connected to the second coil end portion. As a result, only either of the innermost layer and the outermost layer need be changed. The number of sections to be changed can be reduced.

According to a fifth exemplary embodiment, in any of the first to fourth exemplary embodiments, on at least either of both ends in the axial direction of the armature, the second coil end portion is arranged in either of an innermost layer or an outermost layer in the radial direction, and has a joining portion in which conductor end portions of the segment conductors are connected together.

The second coil end portion differs in shape from the first coil end portion. Therefore, connecting together the conductor end portions in a state in which the second coil end portion and the first coil end portion are mixed is difficult. Here, as a result of the second coil end portions being arranged on the outer side in the radial direction that is relatively spacious, as according to the above-described exemplary embodiment, the conductor end portions can be easily connected together.

According to a sixth exemplary embodiment, in any of the first to fifth exemplary embodiments, on at least either of both ends in the axial direction, the coil end portion includes a joining portion in which conductor end portions of the segmented conductors are connected together. The conductor end portions are joined so as to overlap in the radial direction in the joining portion of the first coil end portion. The conductor end portions are joined so as to overlap in the circumferential direction in the joining portion in the second coil end portion.

As a result of the above-described configuration, because the first coil end portion connects the coil side portions of differing layers in the radial direction, as a result of the conductor end portions being connected so as to overlap in the radial direction, a bending amount of the first coil end portion can be reduced. In addition, because the second coil end portion connects the coil end portions of the same layer in the radial direction, as a result of the conductor end portions being connected so as to overlap in the circumferential direction, a bending amount of the second coil end portion can be reduced.

According to a seventh exemplary embodiment, in any of the first to fifth exemplary embodiments, on at least either of both ends in the axial direction, the coil end portion includes a joining portion in which conductor end portions of the segmented conductors are connected together. The joining portion of the second coil end portion is shifted in the circumferential direction in relation the joining portion of the first coil end portion.

As a result, by the joining portion of the second coil end portion and the joining portion of the first coil end portion being shifted in the circumferential direction, a distance between the joining portions can be ensured while increase in a radial-direction dimension is suppressed. Size reduction can be achieved.

According to an eighth exemplary embodiment, in any of the first to fifth exemplary embodiments, on at least either of both ends in the axial direction, the coil end portion includes a joining portion in which conductor end portions of the segmented conductors are connected together. The second coil end portion connects together the coil side portions in an innermost layer or an outermost layer in the radial direction, and is bent in the radial direction such that the joining portion protrudes further toward an inner side in the radial direction than the innermost layer is or further toward an outer side in the radial direction than the outermost layer is.

As a result of the second coil end portion that differs in shape from the first coil end portion being arranged in the innermost layer or the outermost layer, the second coil end portion can be prevented from obstructing other coil end portions. In addition, connection is facilitated as a result of the second coil end portion being bent in the radial direction such that the joining portion thereof protrudes further toward the inner side in the radial direction than the innermost layer is or further toward the outer side in the radial direction than the outermost layer is.

According to a ninth exemplary embodiment, in any of the first to fifth exemplary embodiments, on at least either of both ends in the axial direction, the coil end portion includes a joining portion in which conductor end portions of the segmented conductors are connected together. Two second coil end portions that have differing pitches in the circumferential direction are arranged so as to overlap in the axial direction in a same position in the circumferential direction. The two second coil end portions each connect together the coil side portions in an innermost layer or an outermost layer in the radial direction, and are each bent in the radial direction such that the respective joining portions protrude further toward an inner side in the radial direction than the innermost layer is or further toward an outer side in the radial direction than the outermost layer is.

As a result of the second coil end portions being overlapped in the axial direction as in the configuration described above, the radial-direction dimension can be suppressed. In addition, because the joining portion of the second coil end portion is made to protrude toward the outer side in the radial direction or the inner side in the radial direction, joining of the conductor end portions is facilitated.

According to a tenth exemplary embodiment, in any of the first to fifth exemplary embodiments, on at least either of both ends in the axial direction, the coil end portion includes a joining portion in which conductor end portions of the segmented conductors are connected together. Two second coil end portions that have differing pitches in the circumferential direction each connect together the coil side portions in an innermost layer or an outermost layer in the radial direction, and are arranged such that positions in the axial direction of respective joining portions coincide and the second coil end portions are shifted in the circumferential direction.

As a result of the second coil end portions being arrayed in the radial direction as in the configuration described above, an axial-direction dimension can be suppressed. In addition, because the positions in the axial direction of the joining portions of the second coil end portions are made to coincide, joining of the conductor end portions is facilitated.

According to an eleventh exemplary embodiment, in any of the first to tenth exemplary embodiments, an empty space is provided in the slots. As a result, when winding specifications are changed within a range of the empty space, specifications of the armature need not be changed. Changing of the specifications is facilitated.

According to a twelfth exemplary embodiment, in the eleventh exemplary embodiment, the slots are configured to be capable of housing 2N+2 layers, where N is a natural number, of the coil side portions. An empty space is provided in the slots. As a result, even when the slots house the coil side portions in 2N+2 layers, specifications of the armature core need not be changed.

According to a thirteenth exemplary embodiment, in the eleventh or twelfth exemplary embodiment, the coil side portion that is adjacent to the empty space is bent such that a portion thereof is housed in the empty space. As a result, a filler is not required to be placed inside the empty space. In addition, because a position of a portion of the coil side portion is changed, eddy currents can be suppressed. In particular, when the empty space is provided on the rotor side (a magnet portion side) in the radial direction, eddy currents can be further suppressed.

According to a fourteenth exemplary embodiment, in the thirteenth exemplary embodiment, the coil side portion that is adjacent to the empty space is bent on both ends in the axial direction and both ends are housed in the empty space. In this configuration, when the second coil end portion is connected to a coil side portion that is adjacent to the empty space, space in which the second coil end portion is able to bend can be ensured. In addition, the bending amount of the second coil end portion can be reduced. Furthermore, when the coil end portion includes the joining portion, connection of the conductor end portions is facilitated.

According to a fifteenth exemplary embodiment, in the eleventh or twelfth exemplary embodiment, a coolant passage through which a coolant passes is housed in the empty space. As a result, cooling performance of the armature can be improved.

According to a sixteenth exemplary embodiment, in the eleventh or twelfth exemplary embodiment, the rotating electric machine further includes a bus bar unit that connects together winding end portions of the armature windings that are separated in the circumferential direction. The bus bar unit is arranged on the outer side in the radial direction of the coil end portion. The bus bar unit is fixed to the armature core by a fixing member. The fixing member is inserted into the empty space and fixed. As a result, a hole for fixing the bus bar unit to the armature core is not required. Fixing is facilitated. In addition, a magnetic flux path being disturbed as a result of a hole being provided in the armature core can be prevented.

According to a seventeenth exemplary embodiment, in the eleventh or twelfth exemplary embodiment, a dummy coil is housed in the empty space. As a result of the above-described exemplary embodiment, the empty space is filled by the dummy coil. Consequently, a varnish for coil bonding flowing out as a result of the empty space being formed can be suppressed.

According to an eighteenth exemplary embodiment, in any of the first to seventeenth exemplary embodiments, the segmented conductor is configured to have a U-shape or an I-shape. As a result, a winding that has a high space factor can be actualized without the armature core being segmented. In addition, through use of the segmented conductor that has the U-shape in particular, a connecting portion that connects the segmented conductors is provided on only one side in the axial direction, thereby contributing to improvement in productivity.

According to a nineteenth exemplary embodiment, in any of the first to eighteenth exemplary embodiment, the first coil end portion connects together the coil side portions that are separated by a same pitch as a pole pitch in the circumferential direction. Because a full-pitch winding is configured as a result, a winding factor increases, thereby contributing to improvement in torque.

According to a twentieth exemplary embodiment, in any of the first to eighteenth exemplary embodiments, the first coil end portion connects together the coil side portions that are separated by a pitch that is smaller than a pole pitch in the circumferential direction. Because a short-pitch winding is configured as a result, a coil-end height is reduced, thereby contributing to size reduction.

Embodiments will hereinafter be described with reference to the drawings. Here, sections among the embodiments and modifications below that are identical or equivalent are given the same reference numbers in the drawings. Descriptions of sections having the same reference numbers are applicable therebetween. A motor 10 that serves as a rotating electric machine according to the embodiments is used as a motor for a vehicle.

First Embodiment

The motor 10 shown in FIG. 1 is a permanent-magnet field-type motor. Specifically, the motor 10 is a permanent-magnet field-type synchronous motor that has a three-phase winding. The motor 10 includes a housing 20, a stator 30, a rotor 40, and a rotation shaft 11. The stator 30 serves as an armature and is fixed to the housing 20. The rotor 40 rotates in relation to the stator 30. The rotor 40 is fixed to the rotation shaft 11. Hereafter, according to the present embodiment, an axial direction refers to an axial direction of the rotation shaft 11 (indicated by an arrow Y1 in the drawings). A radial direction refers to a radial direction of the rotation shaft 11 (indicated by an arrow Y2 in the drawings). A circumferential direction refers to a circumferential direction of the rotation shaft 11 (indicated by an arrow Y3 in the drawings).

The housing 20 is formed into a circular cylindrical shape. The stator 30, the rotor 40, and the like are housed inside the housing 20. The housing 20 is provided with bearings 23 and 34. The rotation shaft 11 is supported so as to freely rotate by the bearings 23 and 24. An axial center of an inner circumferential surface of the housing 20 is coaxial with the rotation shaft 11.

The rotor 40 configures a portion of a magnetic circuit. The rotor 40 has one or a plurality of magnetic poles in the circumferential direction and is arranged so as to oppose the stator 30 in the radial direction. The rotor 40 may have a known configuration. For example, the rotor 40 may be an interior permanent magnet (IPM)-type (embedded magnet-type) rotor or a surface permanent magnet (SPM)-type (surface magnet-type) rotor. In addition, any type of rotor, such as a field winding type, a reluctance type, or an asynchronous type that includes a cage conductor, is applicable as the rotor 40. According to the present embodiment, the IPM-type rotor is used. The rotation shaft 11 is inserted into the rotor 40. The rotor 40 is then fixed to the rotation shaft 11 so as to integrally rotate with the rotation shaft 11 with the rotation shaft 11 as a center.

The stator 30 is provided in a circular cylindrical shape along an inner circumference of the housing 20, in substantially a center in the axial direction of the housing 20. In addition, the stator 30 is fixed to the inner circumferential surface of the housing 20 with an axial center O of the rotation shaft 11 as a center.

The stator 30 configures a portion of a magnetic circuit. The stator 30 has a circular annular shape, and includes a stator core 31 (stator core) and a stator winding 32 (armature coil). The stator core 31 serves as an armature core and is arranged so as to oppose the rotor 40 in the radial direction on an outer circumferential side of the rotor 40. The stator winding 32 serves as an armature winding that is wound around the stator core 31.

As shown in FIG. 2 to FIG. 6, the stator core 31 includes a back yoke (back core) 33 and a plurality of teeth 34. The back yoke 33 has a circular annular shape. The plurality of teeth 34 protrude from the back yoke 33 toward an inner side in the radial direction and are arrayed a predetermined distance apart in the circumferential direction. A slot 35 (stator slot) is formed between the teeth 34 that are adjacent to each other. In the stator core 31, the slots 35 are provided at even intervals in the circumferential direction. The stator winding 32 is wound through the slots 35. According to the present embodiment, the number of teeth 34 and the number of slots 35 are each 48.

Figure 8:
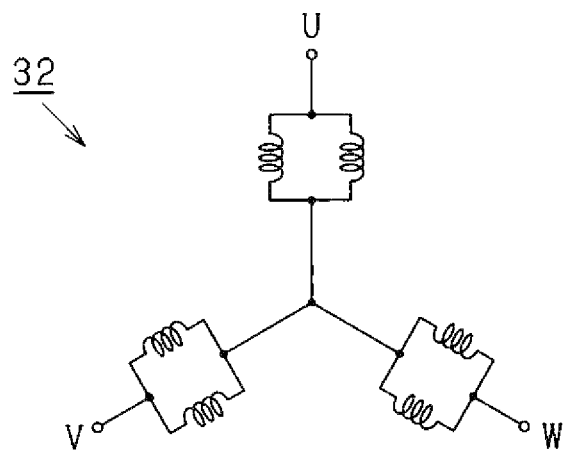
FIG. 8 is a circuit diagram of the stator winding.

As shown in FIG. 8, the stator winding 32 is configured by two three-phase windings that are each connected by a Y connection (star connection) being connected in parallel. In addition, the stator winding 32 generates magnetic flux by being supplied electric power (alternating-current power). The stator winding 32 is configured such that a plurality of conductor segments 50 are inserted into the slots 35 from a first end side of both ends in the axial direction of the stator core 31, and conductor end portions 53 of the plurality of conductor segments 50 are connected. The conductor segment 50 serves as a segmented conductor in which an electrical conductor that has a fixed thickness and a substantially rectangular cross-section (flat cross-section) is formed into a substantially U-like shape. This will be described in detail below.

Figure 9:
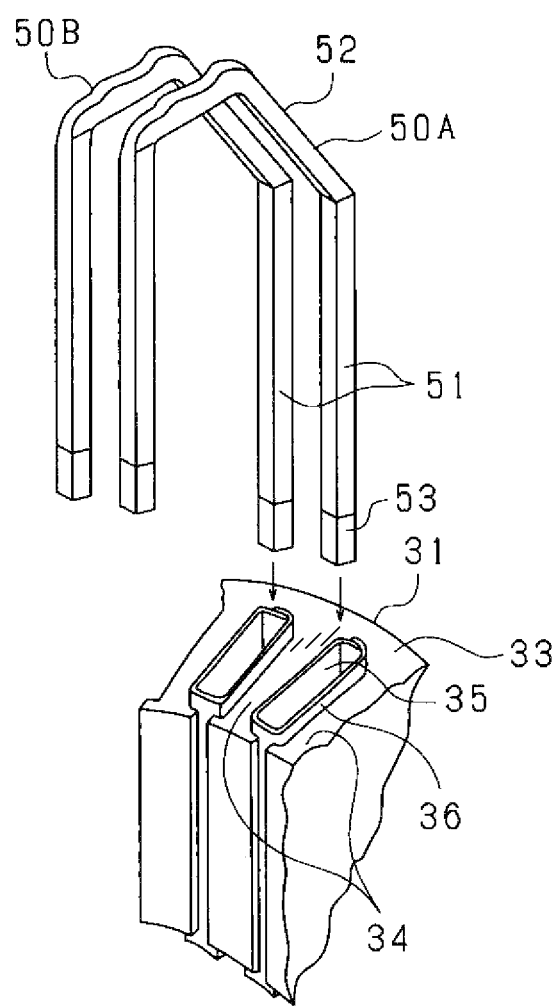
FIG. 9 is a perspective view of conductor segments and a portion of a stator core.

As shown in FIG. 9, the conductor segment 50 is formed into a substantially U-like shape. The conductor segment 50 has a pair of linear straight portions 51 and a turn portion 52 that is formed by being bent so as to connect the pair of straight portions 51. The conductor segment 50 is configured using a flat conductor in which a conductor that has a rectangular lateral cross-section (a conductor that has a pair of opposing flat portions) is covered by an insulating film. The conductor segment 50 is formed by the flat conductor being plastically deformed into a substantially U-like shape.

Figure 10:
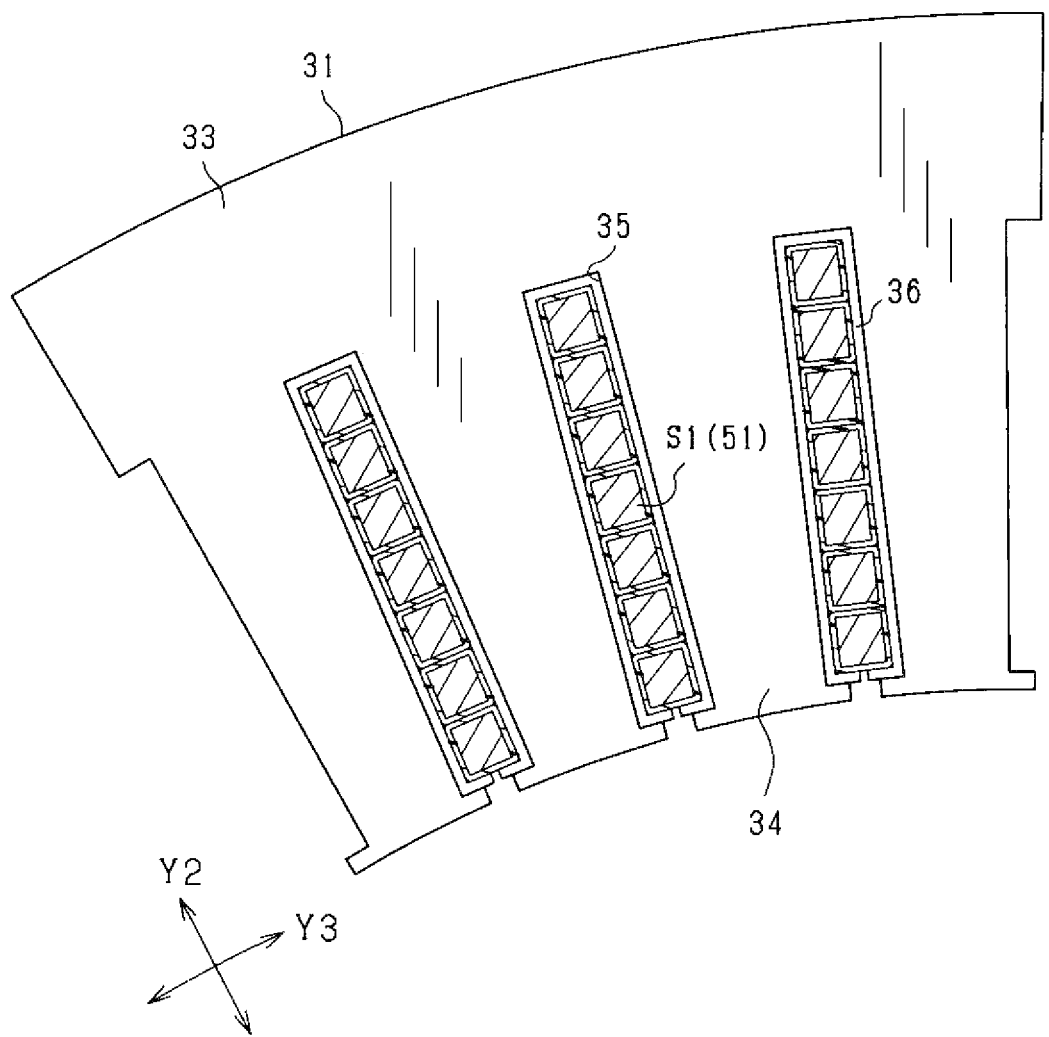
FIG. 10 is a lateral cross-sectional view of the stator.

In the stator core 31, the plurality of conductor segments 50 are inserted into the slots 35 so as to be arrayed in a row in the radial direction. When the plurality of conductor segments 50 are inserted into the slot 35, as shown in FIG. 10, the straight portions 51 of the conductor segments 50 are housed so as to be arrayed in a single row in the radial direction inside the slot 35 and stacked in 2N+1 layers (N being a natural number; seven layers according to the present embodiment). Of the straight portion 51, a portion that is housed inside the slot 35 corresponds to a coil side portion S1 of the stator winding 32.

Here, an insulation sheet 36 (insulator) that provides electrical insulation between the stator core 31 and the stator winding 32 (conductor segments 50) is provided inside the slot 35. The insulation sheet 36 is provided so as to be bent based on a shape and a size of a plurality (seven according to the present embodiment) of coil side portions S1 that are inserted into the slot 35, and surround the overall plurality of coil side portions S1. As a result, the insulation sheet 36 is provided so as to be sandwiched between an inner circumferential surface (inner wall surface) of the stator core 31 and the coil side portions S1 inside the slot 35. The insulation sheet 36 is provided so as to protrude slightly further toward the outer side than an end surface of the stator core 31 is.

Figure 3:
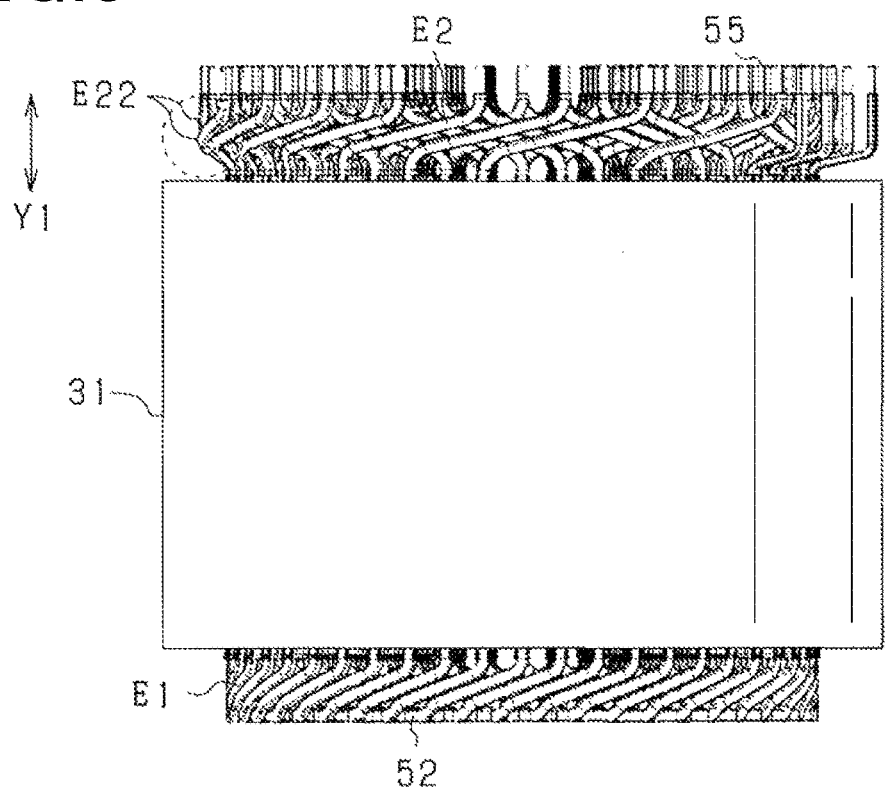
FIG. 3 is a side view of the stator.
Figure 6:
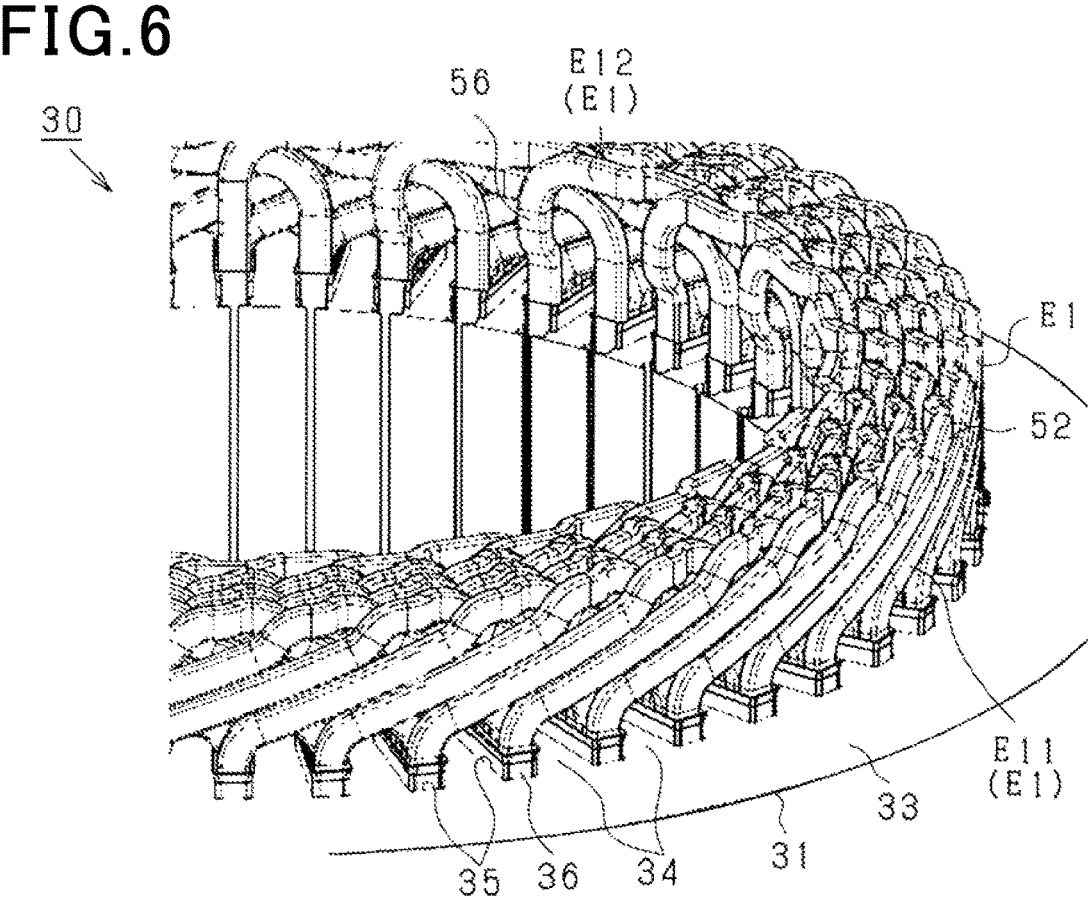
FIG. 6 is a perspective view of coil end portions on a first end side.

As described above, the straight portions 51 of each conductor segment 50 are inserted from the first end side of both ends in the axial direction of the stator 30. Therefore, as shown in FIG. 3 and FIG. 6, a plurality of coil end portions E1 that are portions of the stator winding 32 that protrude from the stator core 31 toward the first end side (lower side in FIG. 3) are each configured by the turn portion 52.

Figure 5:
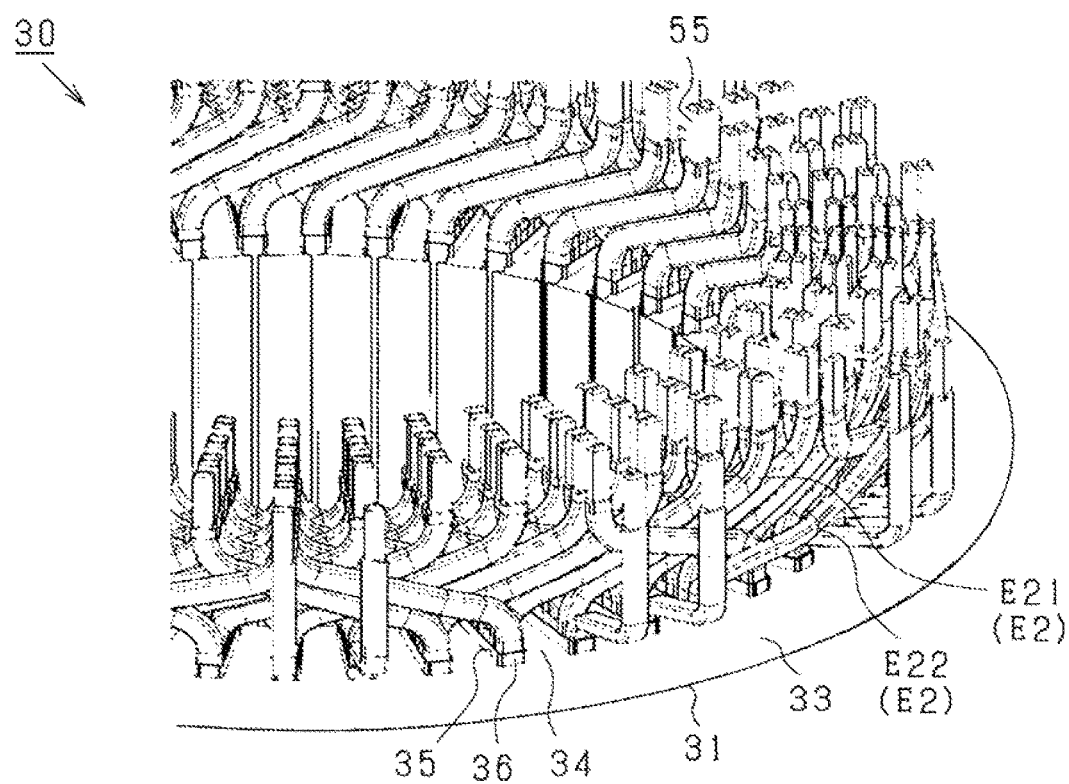
FIG. 5 is a perspective view of coil end portions on a second end side.

Meanwhile, the straight portion 51 has a length that is greater than a thickness in the axial direction of the stator core 31. Therefore, the conductor end portion 53 of the straight portion 51 (an end portion of the straight portion 51 on a side opposite the turn portion 52) protrudes from a second end side of both ends in the axial direction of the stator 30. As shown in FIG. 3 and FIG. 5, the conductor end portions 53 of differing conductor segments 50 are joined together, thereby configuring coil end portions E2 on the second end side (upper side in FIG. 3).

The coil end portion E2 will be described in further detail. In the conductor segment 50, the conductor end portions 53 of the pair of straight portions 51 that protrude in the axial direction from the stator core 31 toward the second end side are twisted toward sides opposite each other in the circumferential direction so as to be skewed at a predetermined angle in relation to the end surface of the stator core 31. Then, as a result of the conductor end portions 53 of differing conductor segments 50 being joined together by welding or the like, a joining portion 55 is formed. When the conductor end portions 53 are joined, tip ends of the conductor end portions 53 of the conductor segments 50 are exposed from the insulation film. The conductor end portions 53 are joined together in a state in which the tip ends overlap each other.

The coil end portion E2 is a portion that protrudes from the stator core 31 toward the second end side. Therefore, the coil end portion E2 includes the conductor end portions 53 of the pair of conductor segments 50 that are skewed in relation to the end surface of the stator core 31 and the joining portion 55 in which the conductor end portions 53 are joined.

Figure 7:
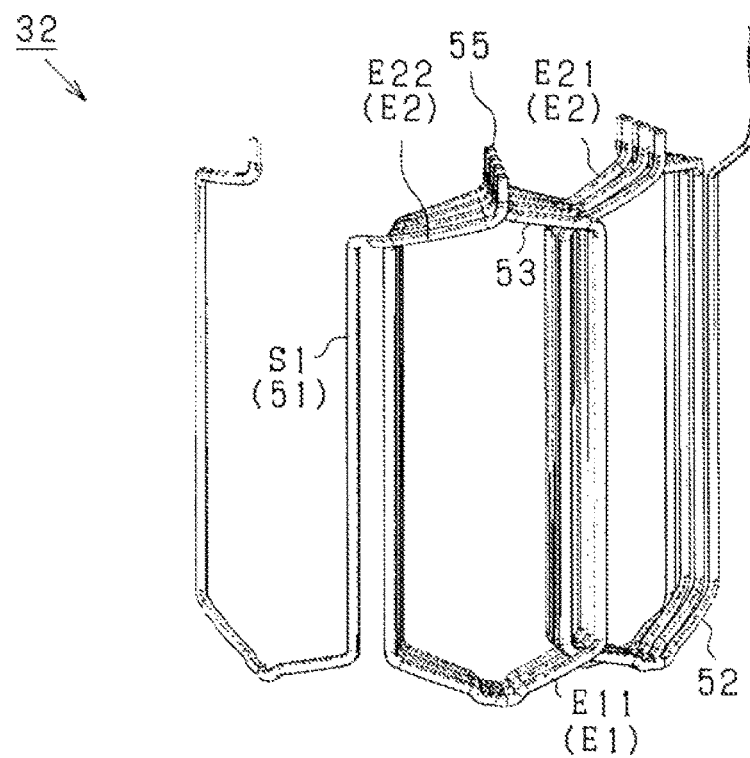
FIG. 7 is a perspective view of a portion of a stator winding.

As a result of the plurality of conductor segments 50 being assembled to the stator core 31 in this manner, as shown in FIG. 7, the conductor segments 50 are connected together, thereby configuring the stator winding 32. Here, FIG. 7 shows a portion of the stator winding 32. The stator winding 32 is wound around the stator core 31 by the conductor segments 50 being connected in a predetermined wiring pattern.

Here, the wiring pattern of the stator winding 32 will be described with reference to FIG. 11. Here, in the drawings of the wiring patterns below, the wiring pattern of the stator winding 32 of only one phase (such as the U-phase) among the stator windings 32 of three phases is shown. However, the wiring patterns of the stator windings 32 of the other two phases are also similar. The drawings of the wiring patterns are FIG. 11, FIG. 12, FIG. 19, FIG. 21, FIG. 22, FIG. 24 to FIG. 31, and FIG. 34 to FIG. 39. This similarly applies hereafter. In addition, in the drawings of the wiring patterns, slot numbers of the slots 35 are shown in an upper portion. Furthermore, in the drawings of the wiring patterns, an up/down direction corresponds to the radial direction, and a left/right direction corresponds to the circumferential direction. Still further, in the drawings of the wiring patterns, an upper side corresponds to an inner side in the radial direction (rotor 40 side) and a lower side corresponds to an outer side in the radial direction. Moreover, in the drawings of the wiring patterns, the coil end portion E1 on the first end side (lower side in FIG. 3) is indicated by a solid line, and the coil end portion E2 on the second end side (upper side in FIG. 3) is indicated by a broken line.

In addition, in the drawings of the wiring patterns, a section (a U-phase lead-out line) in which a U-phase power line and the U-phase stator winding 32 are connected is indicated by a white upward arrow. In a similar manner, a section (a V-phase lead-out line) in which a V-phase power line and the V-phase stator winding 32 are connected is indicated by a black upward arrow. In a similar manner, a section (a W-phase lead-out line) in which a W-phase power line and the W-phase stator winding 32 are connected is indicated by a hatched upward arrow. Furthermore, in the drawings of the wiring patterns, a section (a U-phase lead-out line) in which a neutral point and the U-phase stator winding 32 are connected is indicated by a white downward arrow. In a similar manner, a section (a V-phase lead-out line) in which a neutral point and the V-phase stator winding 32 are connected is indicated by a black downward arrow. In a similar manner, a section (a W-phase lead-out line) in which a neutral point and the W-phase stator winding 32 are connected is indicated by a hatched downward arrow.

Figure 11:
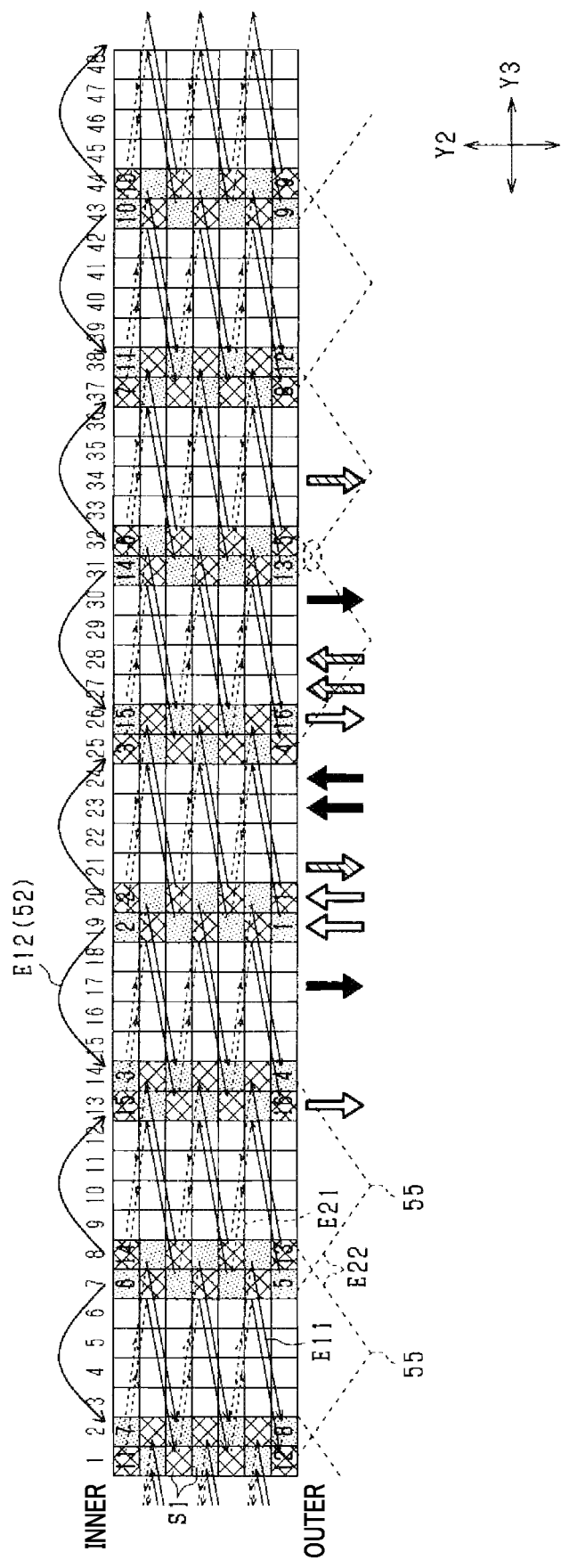
FIG. 11 is a wiring diagram of a wiring pattern of a U-phase stator winding.

As shown in FIG. 11, the stator winding 32 according to the present embodiment is a full-pitch winding in which a coil pitch and a pole pitch (pitch per pole per phase) are equal. In addition, the stator winding 32 is wound by lap winding. Furthermore, two three-phase stator windings 32 are connected in parallel (two parallels). In FIG. 11, a first U-phase stator winding 32 is configured by the coil side portions S1 that are indicated by cross-hatched squares being connected based on an order that is indicated by arrows and numbers. In a similar manner, a second U-phase stator winding 32 is configured by the coil side portions S1 that are indicated by dot-shaded squares being connected based on an order that is indicated by arrows and numbers.

As shown in FIG. 11, the coil side portions S1 of a same phase are housed in two slots 35 that are adjacent in the circumferential direction. Among the coil end portions E1 on the first end side, the coil end portion E1 (referred to, hereafter, as a first coil end portion E11) that connects the coil side portions S1 of differing layers in the radial direction is arranged in a layer other than an innermost layer in the radial direction. The first coil end portion E11 is provided so as to connect the coil side portion S1 that is in an n+2th layer (n being a number that is any of 1, 3, and 5) from the inner side in the radial direction, and the coil side portion S1 that is six pitches (six slots) away in a clockwise direction (rightward direction in FIG. 11) from the coil side portion S1 in the n+2th layer and is in an n+1th layer from the inner side in the radial direction. Therefore, each first coil end portion E11 on the first end side is oblique at a predetermined angle in relation to the circumferential direction. The coil end portions E11 are configured such that the first coil end portions E11 that are adjacent to each other do not easily interfere with each other. Here, in the full-pitch winding, the first coil end portion E11 connects together the coil side portions S1 that are separated by a same pitch (six pitches according to the present embodiment) as the pole pitch in the circumferential direction. The pole pitch refers to a pitch (NS magnetic pole pitch) between differing magnetic poles in the circumferential direction.

Meanwhile, among the coil end portions E1 on the first end side, the coil end portion E1 (referred to, hereafter, as a second coil end portion E12) that connects the coil side portions S1 of the same layer in the radial direction is arranged in the innermost layer in the radial direction. The second coil end portion E12 is provided so as to connect together the coil side portions S1 in the innermost layer (a first layer from the inner side in the radial direction) that are five pitches apart in the clockwise direction.

In addition, among the coil end portions E2 on the second end side, the coil end portion E2 (referred to, hereafter, as a first coil end portion E21) that connects the coil side portions S1 of differing layers in the radial direction is arranged in a layer other than an outermost layer in the radial direction. The first coil end portion E21 is provided so as to connect the coil side portion S1 that is in an nth layer (n being a number that is any of 1, 3, and 5) from the inner side in the radial direction, and the coil side portion S1 that is six pitches away in the clockwise direction from the coil side portion S1 in the nth layer and is in an n+1th layer from the inner side in the radial direction. Here, in the full-pitch winding, the first coil end portion E21 connects together the coil side portions S1 that are separated by a same pitch as the pole pitch in the circumferential direction.

Figure 4:
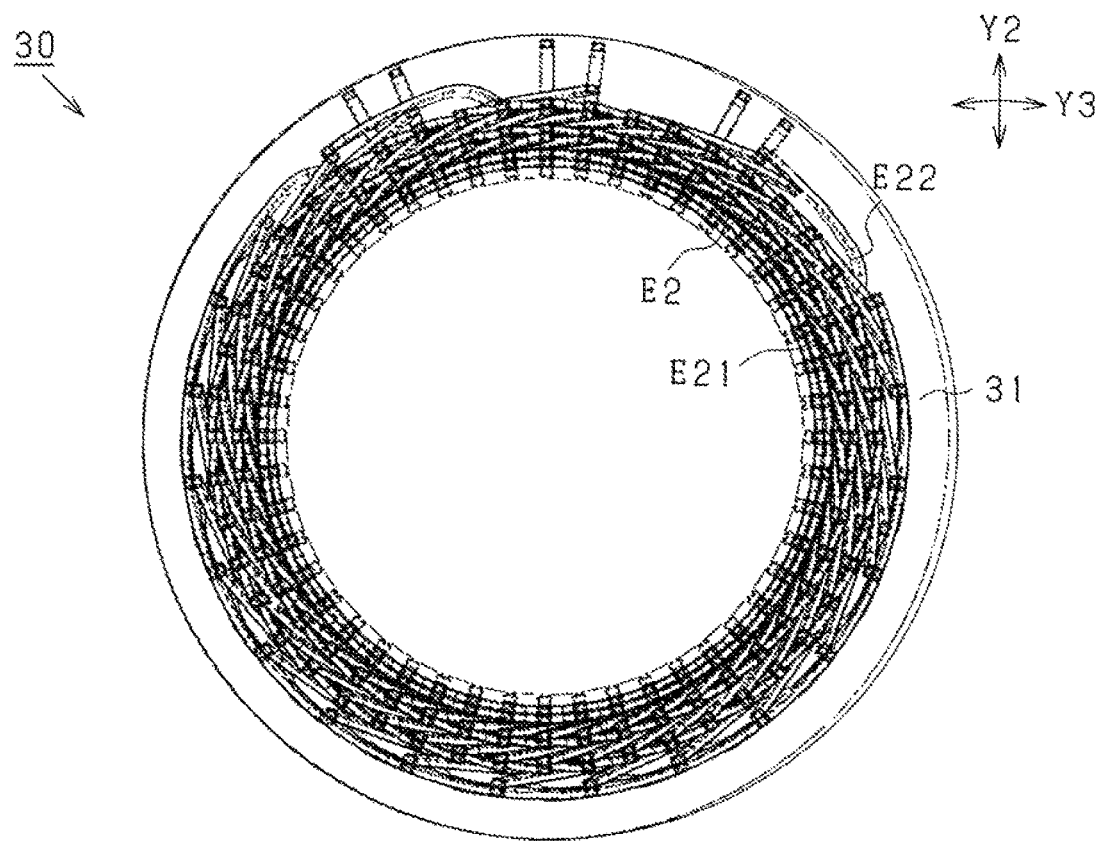
FIG. 4 is a plan view of the stator.

In addition, on the second end side, as shown in FIG. 4 and FIG. 5, the joining portion 55 that is provided in the first coil end portion E21 is configured by the conductor end portions 53 that form a pair being overlapped in the radial direction and joined together. Furthermore, the joining portions 55 of the first coil end portions E21 that are adjacent to each other in the radial direction are arrayed in a single row in the radial direction. Therefore, as shown in FIG. 4, FIG. 11, and the like, the first coil end portions E21 on the second end side are oblique at a predetermined angle in relation to the circumferential direction. The first coil end portions E21 are configured such that the first coil end portions E21 that are adjacent to each other do not easily interfere with each other.

Meanwhile, among the coil end portions E2 on the second end side, the coil end portion E2 (referred to, hereafter, as a second coil end portion E22) that connects the coil side portions S1 of the same layer in the radial direction is arranged in the outermost layer in the radial direction. The second coil end portion E22 is provided so as to connect together the coil side portions S1 in the outermost layer (a seventh layer from the inner side in the radial direction) that are seven pitches apart in the clockwise direction.

Here, on the second end side, as shown in FIG. 4 and FIG. 5, the joining portion 55 that is provided in the second coil end portion E22 that connects the coil side portions S1 of the same layer is configured by the conductor end portions 53 that form a pair being overlapped in the radial direction and joined together. That is, in a manner similar to that of the joining portion 55 of the first coil end portion E21, the conductor end portions 53 of the joining portion 55 of the second coil end portion E22 are arrayed in a single row in the radial direction. Therefore, of the conductor end portions 53 that form a pair, the conductor end portion 53 on a right side in the clockwise direction is bent toward the outer side in the radial direction. The conductor end portion 53 on the right side is configured to be further toward the outer side in the radial direction than the conductor portion 53 on a left side is.

Here, for example, as shown in a section that is encircled by a single-dot chain line in FIG. 11, on the second end side of the stator 30, the second coil end portions E22 that are adjacent to each other in the circumferential direction may intersect. That is, when the conductor end portions 53 on the outermost layer that form a pair are wired along the circumferential direction, interference occurs with the second coil end portion E22 of the same phase that is adjacent thereto in the circumferential direction.

Therefore, when the second coil end portions are E22 are provided, of the conductor end portions 53 that form a pair, the conductor end portion 53 on the right side in the clockwise direction is greatly bent toward the outer side in the radial direction, such that interference with the second coil end portion E22 of the same phase that is adjacent thereto in the circumferential direction does not occur (see the broken-line portion in FIG. 3).

Figure 12:
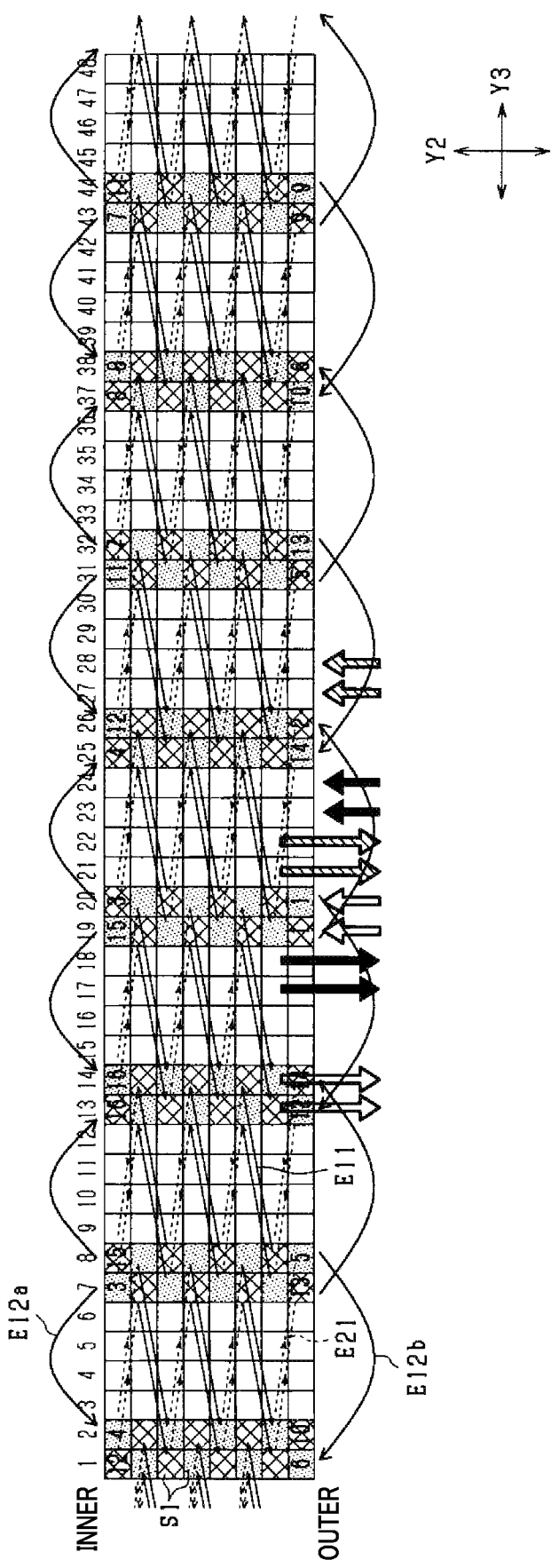
FIG. 12 is a wiring diagram of a comparison example of the wiring pattern.

Here, a method for changing the number of turns of the stator winding 32 from an even number to an odd number will be described. First, as a premise, a comparison example in FIG. 12 will be described. FIG. 12 shows a wiring pattern of the stator winding 32 in which two three-phase stator windings 32 are connected in parallel. The stator winding 32 is a full-pitch winding and a lap winding. The wiring pattern in FIG. 12 differs from the wiring pattern in FIG. 11 in terms of the number of turns. Hereafter, the wiring pattern of the comparison example shown in FIG. 12 will be described mainly focusing on sections that differ from the wiring pattern according to the present embodiment shown in FIG. 11.

In the comparison example in FIG. 12, among the coil end portions E1 on the first end side, the first coil end portions E11 are provided in a manner similar to that in FIG. 11. Meanwhile, among the coil end portions E1 on the first end side, the second coil end portions E11 that connect the coil side portions S1 of the same layer in the radial direction are arranged in the innermost layer and the outermost layer in the radial direction. Hereafter, the second coil end portion E12 in the innermost layer in the radial direction is referred to as a second coil end portion E12*a*, and the second coil end portion E12 in the outermost layer is referred to as a second coil end portion E12*b*.

The second coil end portion E12*a* is provided so as to connect together the coil side portions S1 in the innermost layer (the first layer from the inner side in the radial direction) that are five pitches apart in the clockwise direction. That is, the second coil end portion E12*a* is provided in a manner similar to the second coil end portion E12 in FIG. 11. The second coil end portion E12*b* is provided so as to connect together the coil side portions S1 in the outermost layer (an eighth layer from the inner side in the radial direction) that are seven pitches apart in the clockwise direction.

In addition, among the coil end portions E2 on the second end side, the first coil end portion E21 that connects the coil side portions S1 of differing layers in the radial direction is provided so as to connect the coil side portion S1 that is in an mth layer (m being a number that is any of 1, 3, 5, and 7) from the inner side in the radial direction, and the coil side portion S1 that is six pitches away in the clockwise direction from the coil side portion S1 in the mth layer and is in an m+1th layer from the inner side in the radial direction. That is, compared to the wiring pattern in FIG. 11, the first coil end portions E21 are increased.

Therefore, when the wiring pattern is changed from the wiring pattern shown in FIG. 12 (an even number of turns) to the wiring pattern shown in FIG. 11 (an odd number of turns), only the configuration of the outermost layer need be changed. Specifically, first, the number of coil side portions S1 that are housed in each slot 35 is reduced to an odd number (seven layers). Specifically, the first coil end portions E21 on the second end side are decreased.

Then, on both ends in the axial direction, any one of the plurality of coil side portions S1 that are housed in the slot 35 is connected to the second coil end portion E12 or E22. More specifically, on the first end side, the second coil end portions E12*b* in the outermost layer are eliminated. Instead, on the second end side, the coil side portions S1 in the outermost layer are connected together by the second coil end portions E22.

As a result of the configuration according to the first embodiment described above, advantageous effects such as those described below can be obtained.

According to the first embodiment, the coil side portions S1 can be housed in each slot 35 so as to form 2N+1 layers (N being a natural number; seven layers according to the first embodiment). The number of turns of the stator winding 32 can be set to an odd number. In addition, when the wiring pattern such as that shown in FIG. 12 (a wiring pattern in which the coil side portions S1 form eight layers and the number of turns is an even number) is changed to the wiring pattern shown in FIG. 11, the second coil end portions that are provided on only the first end side may be provided on both the first end and the second end. That is, on both ends in the axial direction, any of the plurality of coil side portions S1 that are housed in the slots 35 may be connected to the second coil end portions E12 or E22.

More specifically, upon the coil side portions S1 that are housed in each slot 35 being decreased to an odd number, the second coil end portions E22 that serve to replace the second coil end portions E12*b* on the first end side shown in FIG. 12 may be provided on the second end side. Here, when the number of turns is changed from an odd number to an even number, a reverse of the foregoing may be performed. Therefore, the number of layers of the coil side portions S1 that are housed in each slot 35 can be easily changed from seven layers to eight layers and from eight layers to seven layers. Changing of the number of turns is facilitated. That is, the number of turns can be easily changed based on demands placed on the motor 10.

The first coil end portion E21 and the second coil end portion E22 differ in shape. Therefore, when the second coil end portion E22 is arranged in a layer other than the innermost layer or the outermost layer, the second coil end portion E22 interferes with other first coil end portions E21 due to the difference in shape. The shape of not only the second coil end portion E22 but also the first coil end portion E21 may require change. Therefore, the second coil end portion E22 is arranged in the outermost layer in the radial direction. The second coil end portion E22 that has a differing shape is set away on the outer side in the radial direction. Changing of the shape of the first coil end portion E21 can be avoided.

The stator winding 32 is a lap winding. On the first end side, the coil side portions S1 that are housed in the innermost layer are connected to the second coil end portions E12. In addition, on the second end side, the coil side portions S1 that are housed in the outermost layer are connected to the second coil end portions E22. Therefore, when the number of turns is changed from an even number to an odd number, all that is required is for the conductor segments 50 in the outermost layer to be changed. The number of sections to be changed can be reduced.

On the second end side, the second coil end portion E22 differs in shape from the first coil end portion E21. Therefore, connecting together the conductor end portions 53 in a state in which the second coil end portion E22 and the first coil end portion E21 are mixed is difficult. Here, on the second end side, as a result of the second coil end portions E22 being arranged on the outer side in the radial direction that is relatively spacious, the conductor end portions 53 can be easily connected together.

On the second end side, the second coil end portion E22 connects together the coil side portions S1 in the outermost layer in the radial direction. The second coil end portion E22 is bent in the radial direction such that the joining portion 55 thereof protrudes further toward the outer side in the radial direction than the outermost layer is. As a result of the second coil end portion E22 that alone has a differing shape being arranged in the outermost layer, the second coil end portion E22 obstructing the first coil end portion E21 can be prevented. In addition, connection is facilitated as a result of the second coil end portion E22 being bent in the radial direction such that the joining portion 55 thereof protrudes further toward the outer side in the radial direction than the outermost layer is.

Second Embodiment

Figure 13:
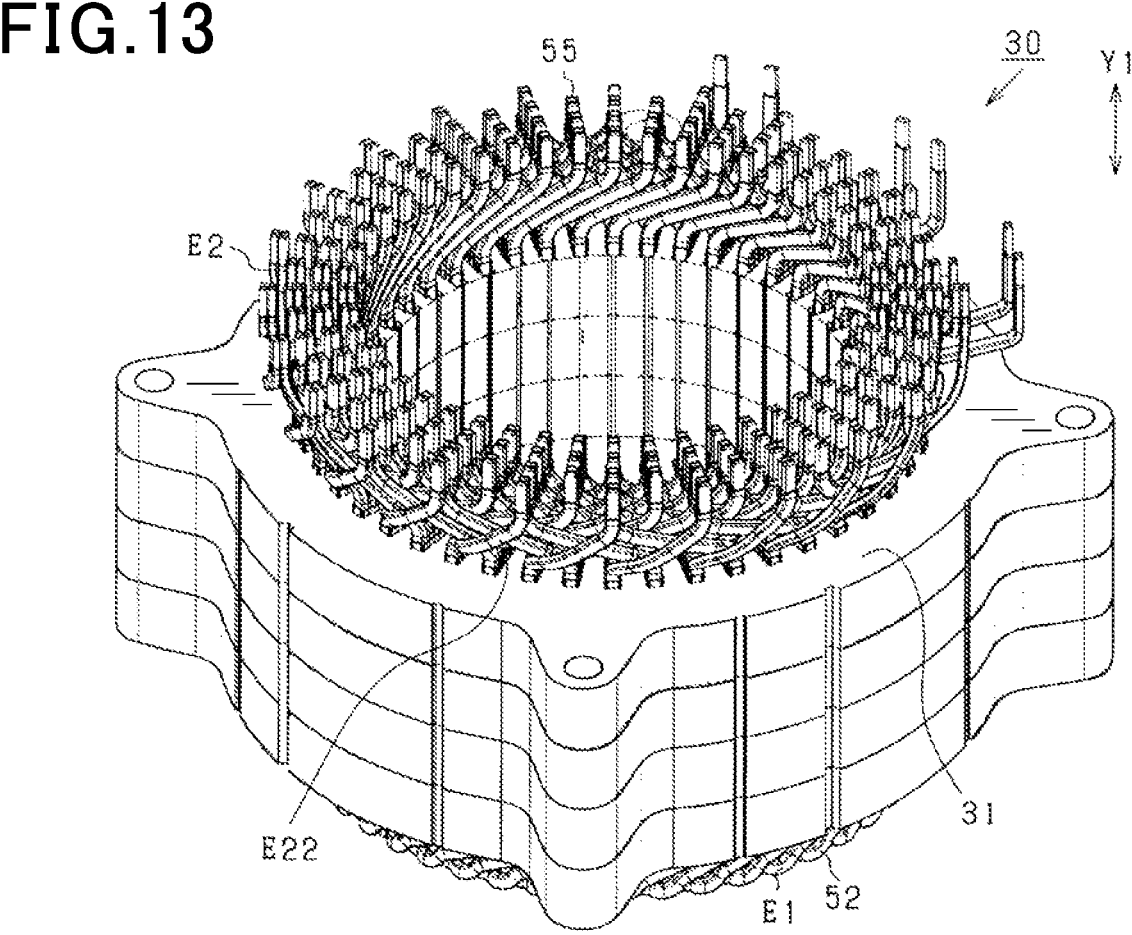
FIG. 13 is a perspective view of a stator according to a second embodiment.
Figure 14:
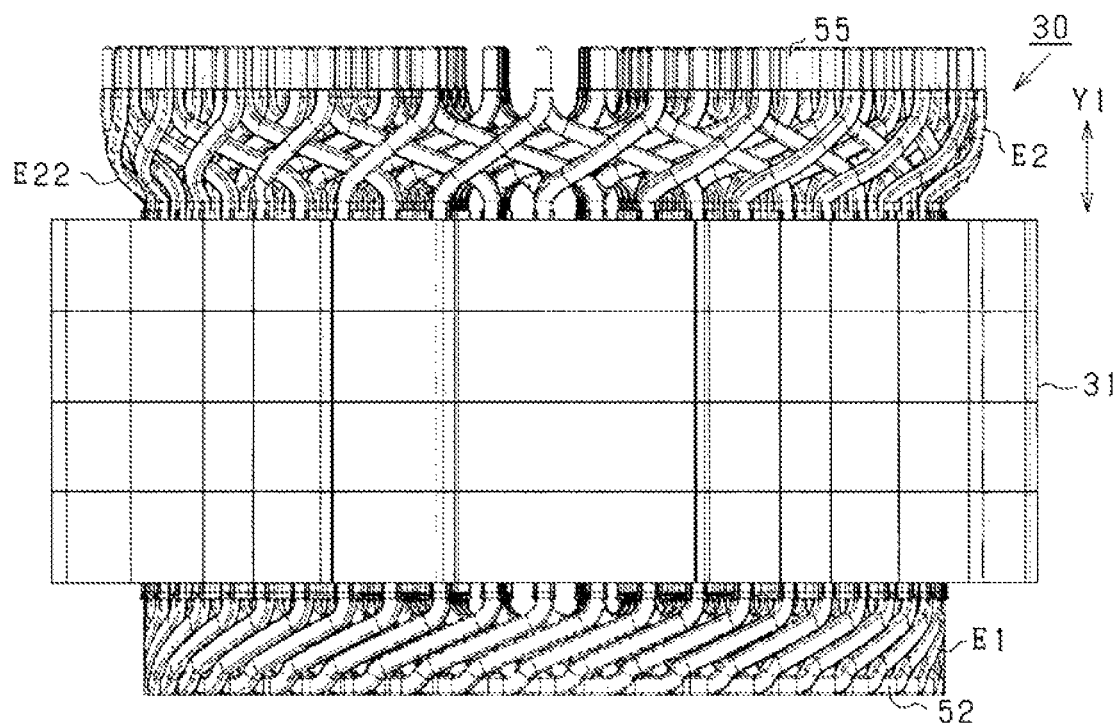
FIG. 14 is a side view of the stator according to the second embodiment.
Figure 15:
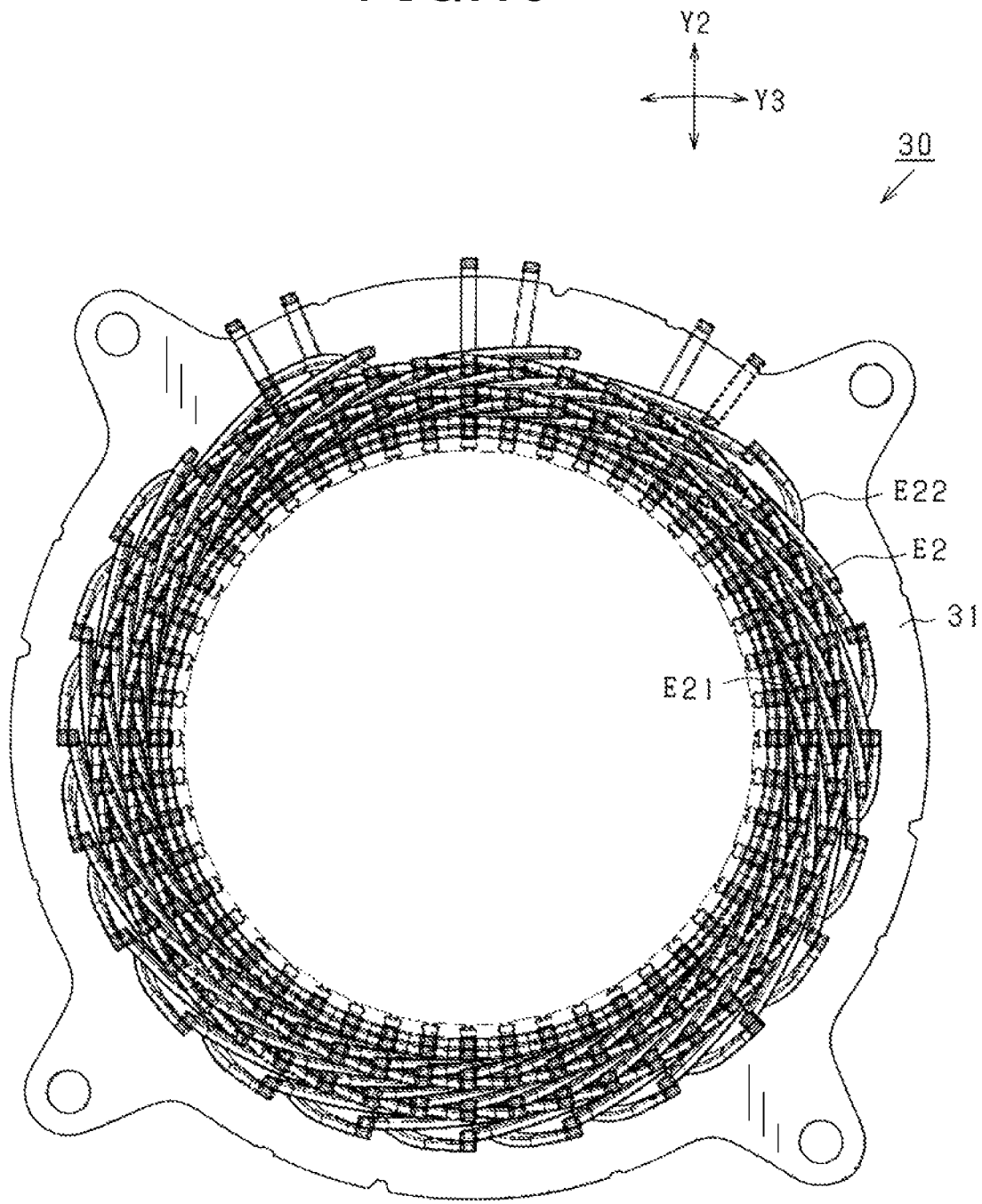
FIG. 15 is a plan view of the stator according to the second embodiment.
Figure 16:
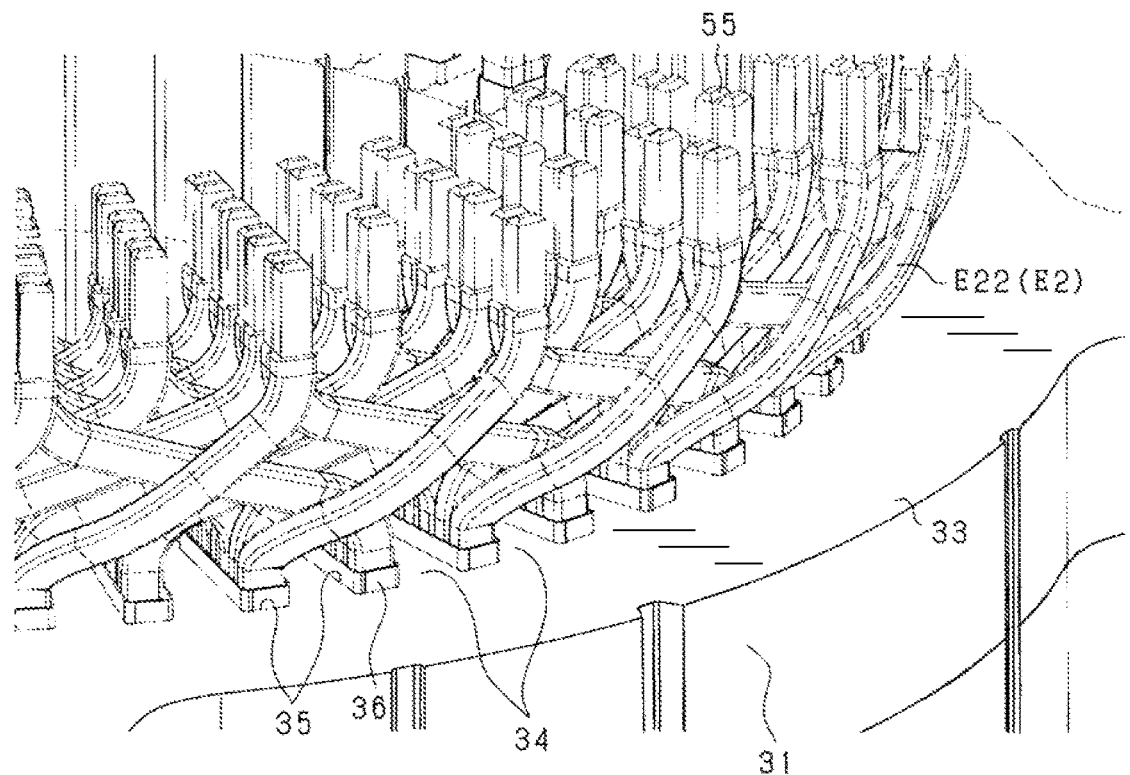
FIG. 16 is an enlarged perspective view of coil end portions on a second end side according to the second embodiment.
Figure 17:
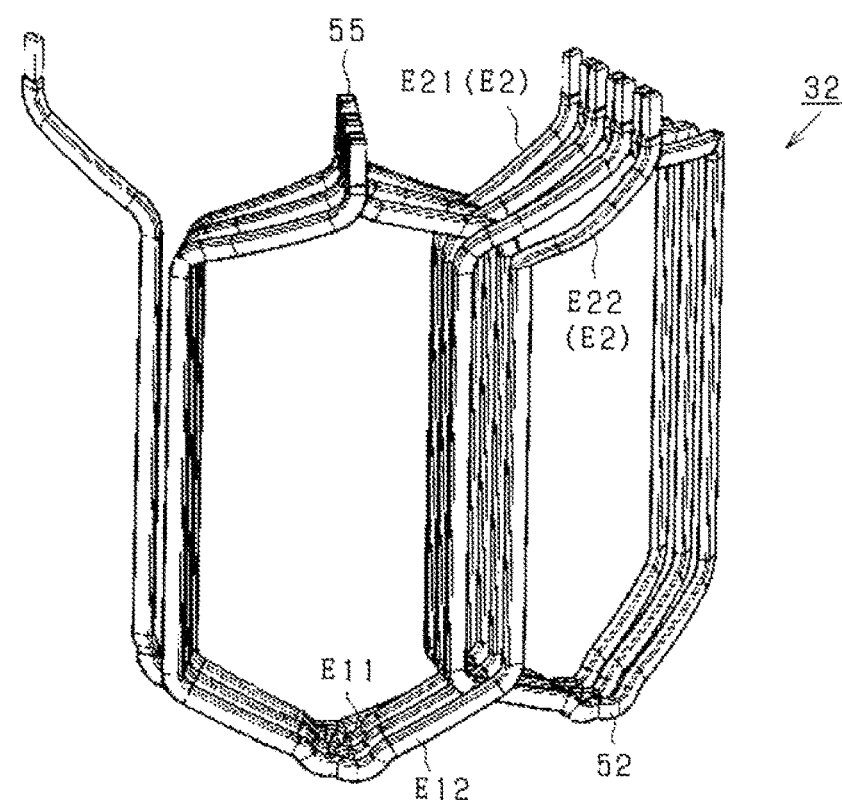
FIG. 17 is a perspective view of a portion of a stator winding according to the second embodiment.
Figure 18:
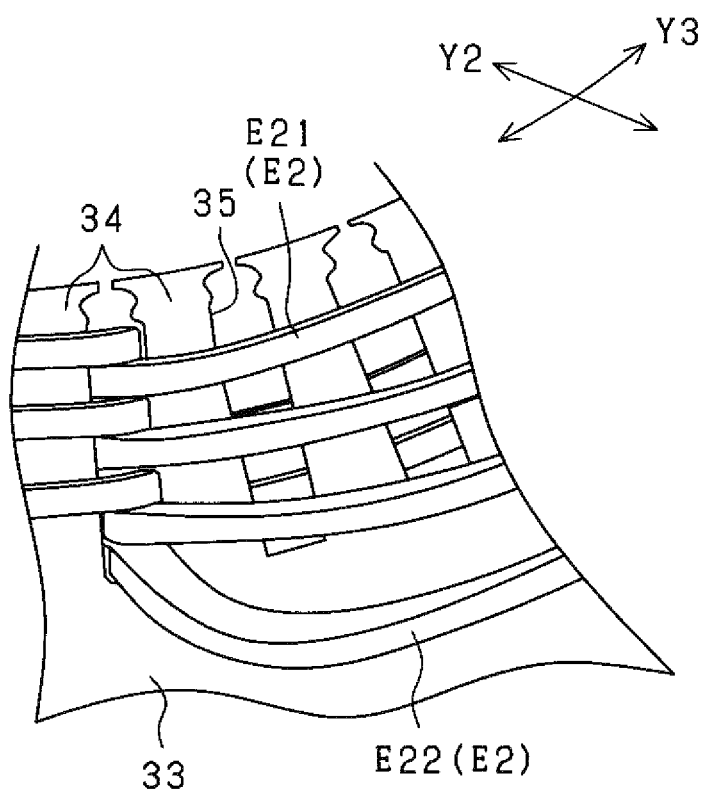
FIG. 18 is a plan view of a joining portion on the second end side.

The stator winding 32 according to a second embodiment will be described with reference to FIG. 13 to FIG. 19. FIG. 13 is a perspective view of the stator 30 according to the second embodiment. FIG. 14 is a side view of the stator 30 according to the second embodiment. FIG. 15 is a plan view of the stator 30 according to the second embodiment. Furthermore, FIG. 16 is an enlarged perspective view of the coil end portions on the second end side according to the second embodiment. FIG. 17 is a perspective view of a portion of the stator winding 32 according to the second embodiment. FIG. 18 is a plan view of the joining portion 55 on the second end side.

A wiring pattern of the stator winding 32 according to the second embodiment will be described with reference to FIG. 19. According to the second embodiment, sections that differ from the wiring pattern shown in FIG. 11 according to the first embodiment will mainly be described.

Figure 19:
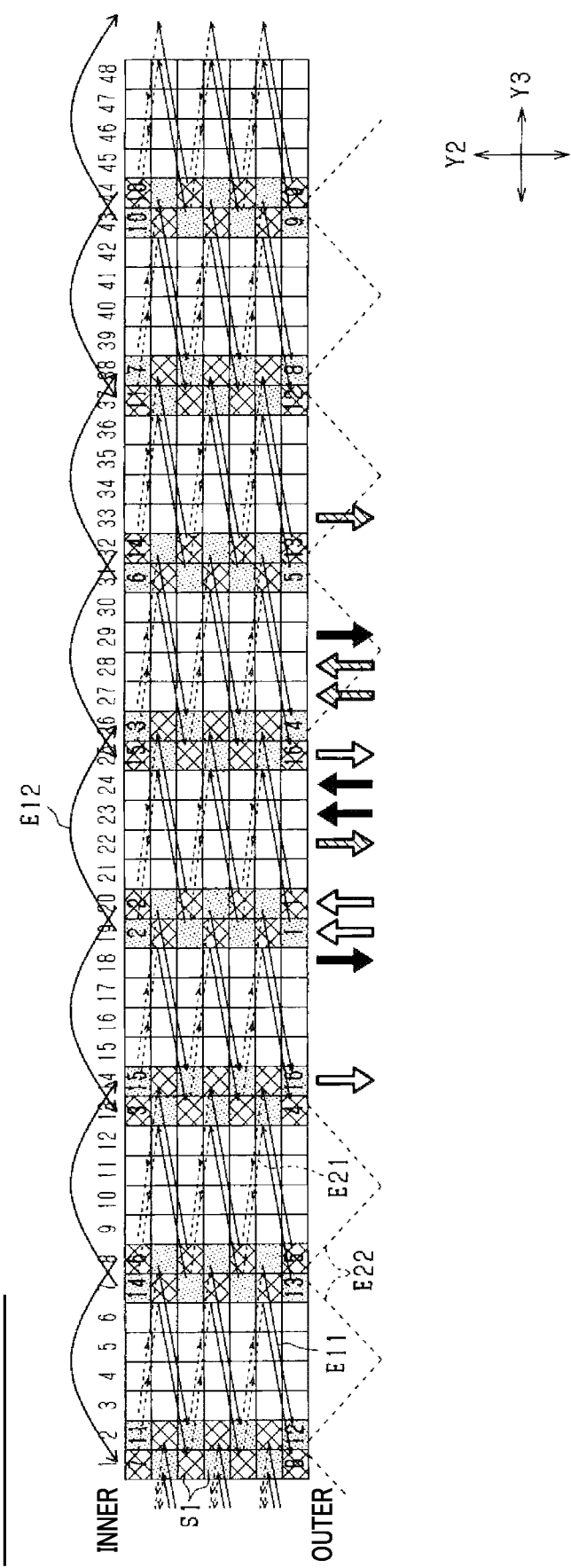
FIG. 19 is a wiring diagram of a wiring pattern of a U-phase stator winding according to the second embodiment.

As shown in FIG. 19, among the coil end portions E1 on the first end side, the first coil end portion E11 that connects the coil side portions S1 of differing layers in the radial direction is similar to that according to the first embodiment. Meanwhile, among the coil end portions E1 on the first end side, the second coil end portion E12 that connects the coil side portions S1 of the same layer in the radial direction is provided so as to connect together the coil side portions S1 in the innermost layer (the first layer from the inner side in the radial direction) that are seven pitches apart in the clockwise direction.

In addition, among the coil end portions E2 on the second end side, the first coil end portion E21 that connects the coil side portions S1 of differing layers in the radial direction is similar that according to the first embodiment. Meanwhile, among the coil end portions E2 on the second end side, the second coil end portion E22 that connects the coil side portions of the same layer in the radial direction is provided so as to connect together the coil side portions S1 in the outermost layer (the seventh layer from the inner side in the radial direction) that are five pitches apart in the clockwise direction. Here, positions of the lead-out lines of the stator winding 32 of each phase are also changed as appropriate.

Here, on the second end side, as shown in FIG. 15 and FIG. 16, the joining portion 55 of the second coil end portion E22 that connects the coil side portions S1 of the same layer is configured by the conductor end portions 53 that form a pair being overlapped in the radial direction and joined together. That is, in a manner similar to that of the joining portion 55 of the first coil end portion E21, the conductor end portions 53 of the joining portion 55 of the second coil end portion E22 are arrayed in a single row in the radial direction. Therefore, as shown in FIG. 18, of the conductor end portions 53 that form a pair, the conductor end portion 53 on the right side in the clockwise direction is bent toward the outer side in the radial direction. The conductor end portion 53 on the right side is configured to be further toward the outer side in the radial direction than the conductor end portion 53 on the left side is.

Here, as shown in FIG. 16, on the second end side of the stator 30, the second coil end portions E22 that are adjacent to each other in the circumferential direction intersect. That is, when the conductor end portions 53 on the outermost layer that form a pair are wired along the circumferential direction, interference occurs with the second coil end portion E22 of the same phase that is adjacent thereto in the circumferential direction.

Therefore, when the second coil end portions E22 are provided, of the conductor end portions 53 that form a pair, the conductor end portion 53 on the right side in the clockwise direction is greatly bent toward the outer side in the radial direction, such that interference with the second coil end portion E22 of the same phase that is adjacent thereto in the circumferential direction does not occur (see FIG. 18).

In a manner similar to that according to the first embodiment, in the stator winding 32 according to the second embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the second embodiment can achieve effects similar to those according to the first embodiment.

Third Embodiment

Figure 20:
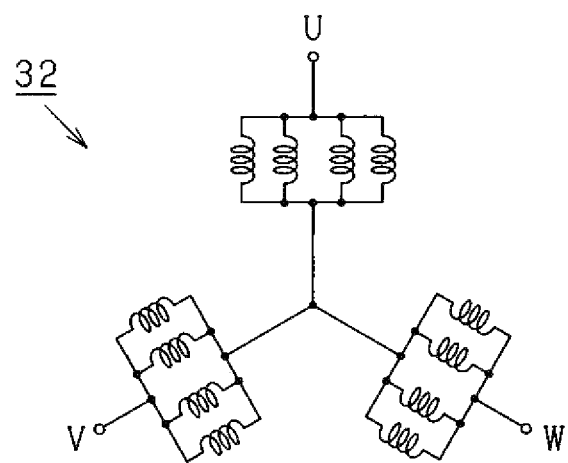
FIG. 20 is a circuit diagram of the stator winding.

The stator winding 32 according to a third embodiment will be described with reference to FIG. 20 and FIG. 21. As shown in FIG. 20, the stator winding 32 according to the third embodiment is configured such that four three-phase windings that are each connected by a Y connection (star connection) are connected in parallel.

A wiring pattern of the stator winding 32 according to the third embodiment will be described with reference to FIG. 21. In FIG. 21, a first U-phase stator winding 32 is configured by the coil side portions S1 that are indicated by light dot-shaded (lightly-shaded) squares being connected based on an order that is indicated by arrows and numbers. In a similar manner, a second U-phase stator winding 32 is configured by the coil side portions S1 that are indicated by dark dot-shaded (dark-shaded) squares being connected based on an order that is indicated by arrows and numbers. In a similar manner, a third U-phase stator winding 32 is configured by the coil side portions S1 that are indicated by diagonally hatched squares being connected based on an order that is indicated by arrows and numbers. In a similar manner, a fourth U-phase stator winding 32 is configured by the coil side portions S1 that are indicated by cross-hatched squares being connected based on an order that is indicated by arrows and numbers.

Figure 21:
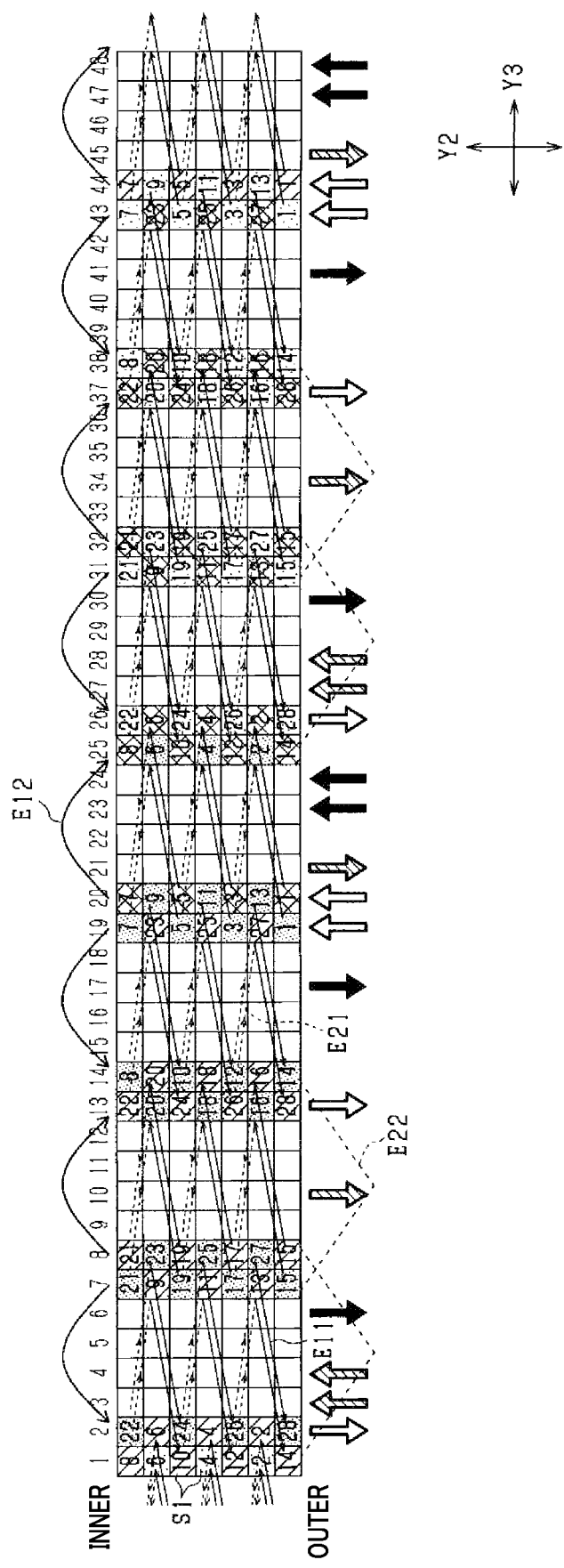
FIG. 21 is a wiring diagram of a wiring pattern of a U-phase stator winding according to a third embodiment.

As shown in the wiring pattern in FIG. 21, in the stator winding 32 of each phase, the number of lead-out lines that are connected to the power line and the number of lead-out lines that are connected to the neutral point are respectively four each. That is, unlike the wiring pattern shown in FIG. 11 according to the first embodiment, the lead-out lines (input/output terminals) from the stator windings 32 of the phases are increased. In accompaniment, the number of second coil end portions E22 on the second end side is decreased. Regarding other sections, the wiring pattern in FIG. 21 is identical to the wiring pattern shown in FIG. 11 according to the first embodiment.

Therefore, in a manner similar to that according to the first embodiment, in the stator winding 32 according to the third embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the third embodiment can achieve effects similar to those according to the first embodiment.

Fourth Embodiment

The stator winding 32 according to a fourth embodiment will be described with reference to FIG. 20 and FIG. 22. As shown in FIG. 20, the stator winding 32 according to the fourth embodiment is configured such that four three-phase windings that are each connected by a Y connection (star connection) are connected in parallel.

A wiring pattern of the stator winding 32 according to the fourth embodiment will be described with reference to FIG. 22. In FIG. 21, a first U-phase stator winding 32 is configured by the coil side portions S1 that are indicated by light dot-shaded squares being connected based on an order that is indicated by arrows and numbers. In a similar manner, a second U-phase stator winding 32 is configured by the coil side portions S1 that are indicated by dark dot-shaded squares being connected based on an order that is indicated by arrows and numbers. In a similar manner, a third U-phase stator winding 32 is configured by the coil side portions S1 that are indicated by diagonally hatched squares being connected based on an order that is indicated by arrows and numbers. In a similar manner, a fourth U-phase stator winding 32 is configured by the coil side portions S1 that are indicated by cross-hatched squares being connected based on an order that is indicated by arrows and numbers.

Figure 22:
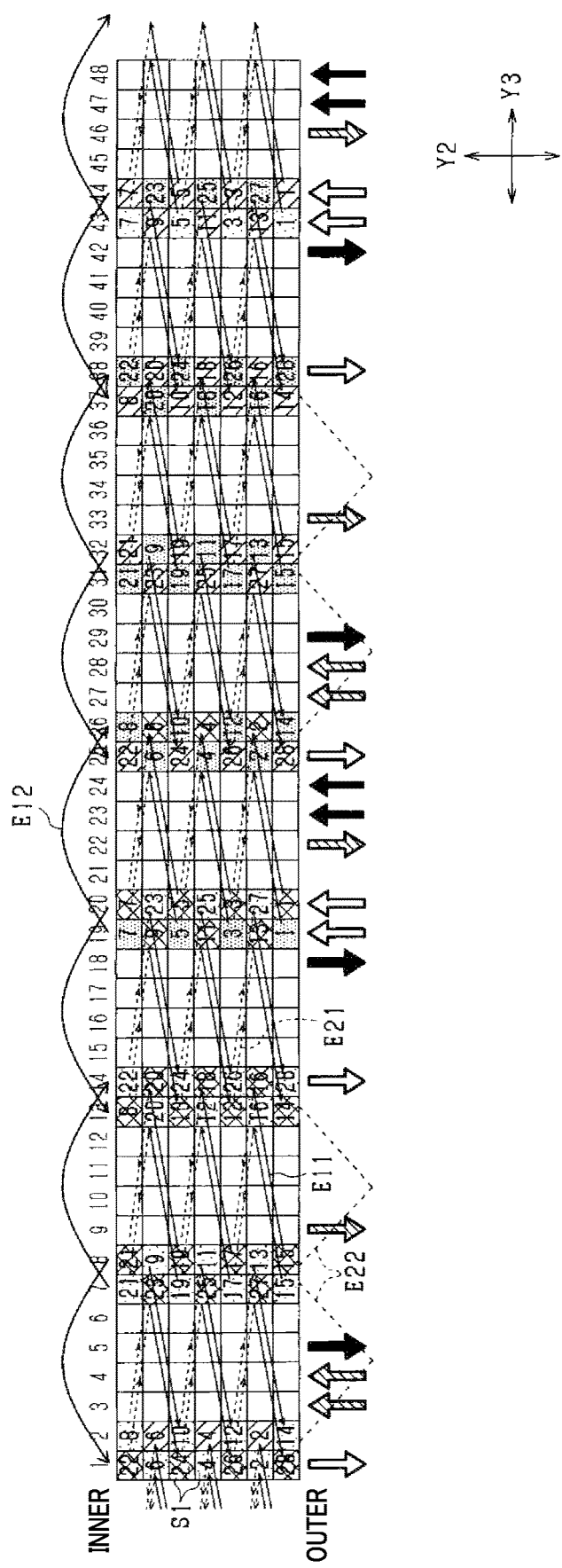
FIG. 22 is a wiring diagram of a wiring pattern of a U-phase stator winding according to a fourth embodiment.

As shown in the wiring pattern in FIG. 22, in the stator winding 32 of each phase, the number of lead-out lines that are connected to the power line and the number of lead-out lines that are connected to the neutral point are respectively four each. That is, unlike the wiring pattern shown in FIG. 19 according to the second embodiment, the lead-out lines (input/output terminals) from the stator windings 32 of the phases are increased. In accompaniment, the number of second coil end portions E22 on the second end side is decreased. Regarding other sections, the wiring pattern in FIG. 22 is identical to the wiring pattern shown in FIG. 19 according to the second embodiment.

Therefore, in a manner similar to that according to the above-described embodiments, in the stator winding 32 according to the fourth embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the fourth embodiment can achieve effects similar to those according to the above-described embodiments.

Fifth Embodiment

Figure 23:
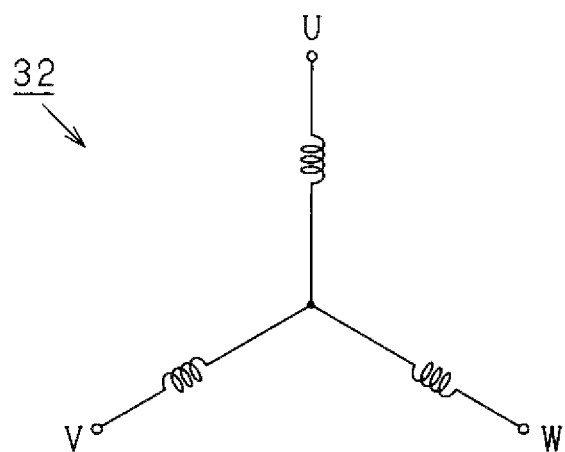
FIG. 23 is a circuit diagram of the stator winding.

The stator winding 32 according to a fifth embodiment will be described with reference to FIG. 23 and FIG. 24. As shown in FIG. 23, the stator winding 32 according to the fifth embodiment is configured by a single three-phase windings that is connected by a Y connection (star connection).

A wiring pattern of the stator winding 32 according to the fifth embodiment will be described with reference to FIG. 24. In FIG. 24, a U-phase stator winding 32 of a first round is configured by the coil side portions S1 that are indicated by cross-hatched squares being connected based on an order that is indicated by arrows and numbers. In a similar manner, a U-phase stator winding 32 of a second round is configured by the coil side portions S1 that are indicated by dot-shaded squares being connected based on an order that is indicated by arrows and numbers.

Figure 24:
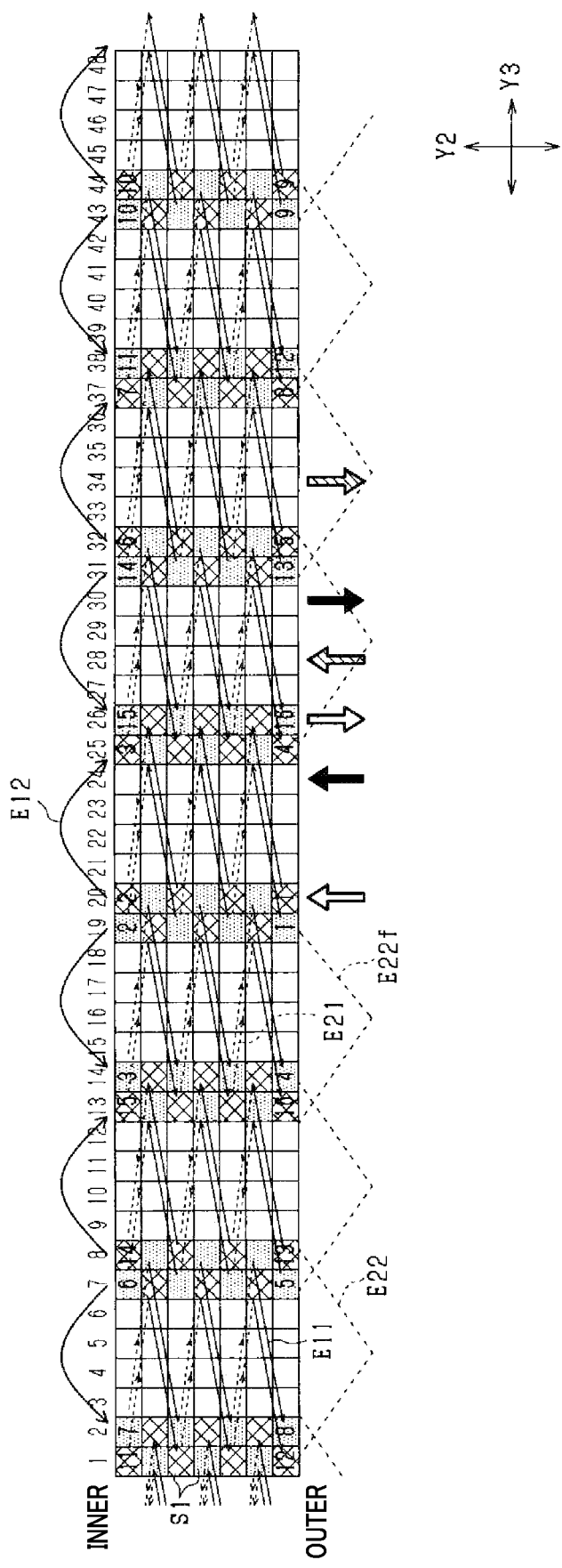
FIG. 24 is a wiring diagram of a wiring pattern of a U-phase stator winding according to a fifth embodiment.

As shown in the wiring pattern in FIG. 24, in the stator winding 32 of each phase, the number of lead-out lines that are connected to the power line and the number of lead-out lines that are connected to the neutral point are respectively one each. That is, unlike the wiring pattern shown in FIG. 11 according to the first embodiment, the lead-out lines (input/output terminals) from the stator winding 32 of each phase are decreased. In accompaniment, the number of second coil end portions E22 on the second end side is increased. The U-phase stator winding 32 of the first round and the U-phase stator winding 32 of the second round are connected by increased second coil end portions E22f. The second coil end portion E22f connects the coil side portions S1 that are six pitches apart. Regarding other sections, the wiring pattern in FIG. 24 is identical to the wiring pattern shown in FIG. 11 according to the first embodiment.

Therefore, in a manner similar to that according to the above-described embodiments, in the stator winding 32 according to the fifth embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the fifth embodiment can achieve effects similar to those according to the above-described embodiments.

Sixth Embodiment

The stator winding 32 according to a sixth embodiment will be described with reference to FIG. 23 and FIG. 25. As shown in FIG. 23, the stator winding 32 according to the sixth embodiment is configured by a single three-phase windings that is connected by a Y connection (star connection).

A wiring pattern of the stator winding 32 according to the sixth embodiment will be described with reference to FIG. 25. In FIG. 25, a U-phase stator winding 32 of a first round is configured by the coil side portions S1 that are indicated by cross-hatched squares being connected based on an order that is indicated by arrows and numbers. In a similar manner, a U-phase stator winding 32 of a second round is configured by the coil side portions S1 that are indicated by dot-shaded squares being connected based on an order that is indicated by arrows and numbers.

Figure 25:
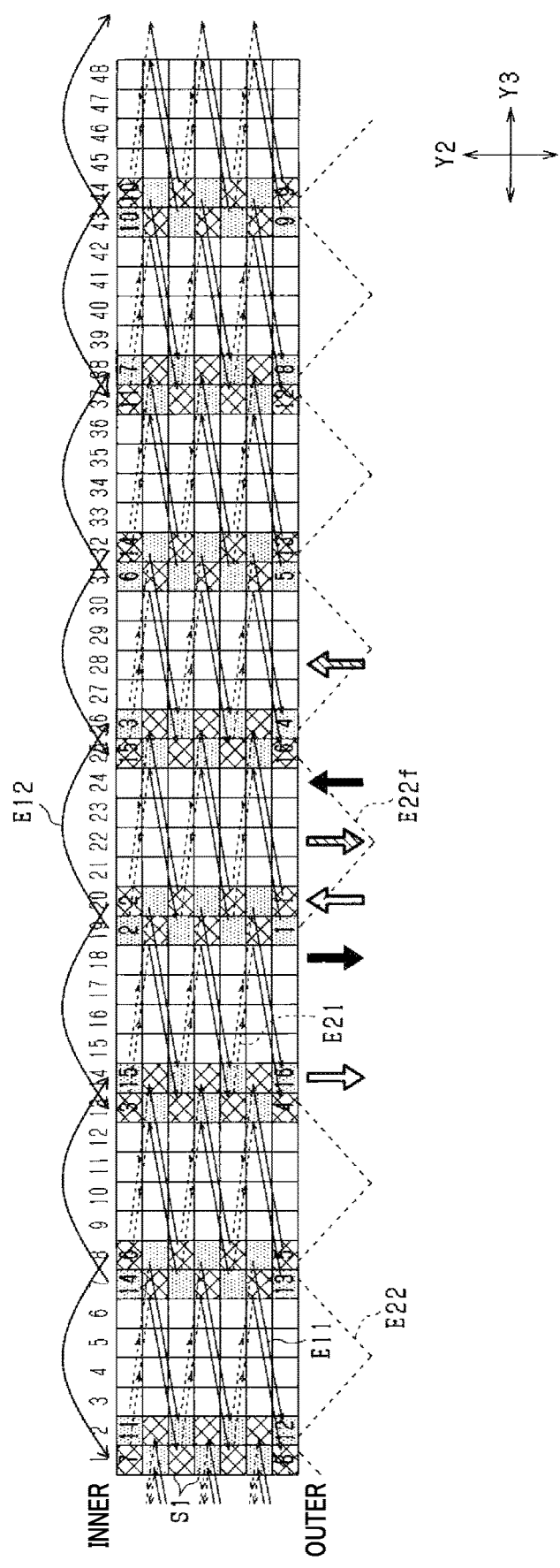
FIG. 25 is a wiring diagram of a wiring pattern of a U-phase stator winding according to a sixth embodiment.

As shown in the wiring pattern in FIG. 25, in the stator winding 32 of each phase, the number of lead-out lines that are connected to the power line and the number of lead-out lines that are connected to the neutral point are respectively one each. That is, unlike the wiring pattern shown in FIG. 19 according to the second embodiment, the lead-out lines (input/output terminals) from the stator winding 32 of each phase are decreased. In accompaniment, the number of second coil end portions E22 on the second end side is increased. The U-phase stator winding 32 of the first round and the U-phase stator winding 32 of the second round are connected by increased second coil end portions E22f. The second coil end portion E22f connects the coil side portions S1 that are six pitches apart. Regarding other sections, the wiring pattern in FIG. 25 is identical to the wiring pattern shown in FIG. 19 according to the second embodiment.

Therefore, in a manner similar to that according to the above-described embodiments, in the stator winding 32 according to the sixth embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the sixth embodiment can achieve effects similar to those according to the above-described embodiments.

Seventh Embodiment

The stator winding 32 according to a seventh embodiment will be described with reference to FIG. 23 and FIG. 26. As shown in FIG. 23, the stator winding 32 according to the seventh embodiment is configured by a single three-phase windings that is connected by a Y connection (star connection).

A wiring pattern of the stator winding 32 according to the seventh embodiment will be described with reference to FIG. 26. In FIG. 26, a U-phase stator winding 32 of a first round is configured by the coil side portions S1 that are indicated by dot-shaded squares being connected based on an order that is indicated by arrows and numbers. In a similar manner, a U-phase stator winding 32 of a second round is configured by the coil side portions S1 that are indicated by cross-hatched squares being connected based on an order that is indicated by arrows and numbers.

Figure 26:
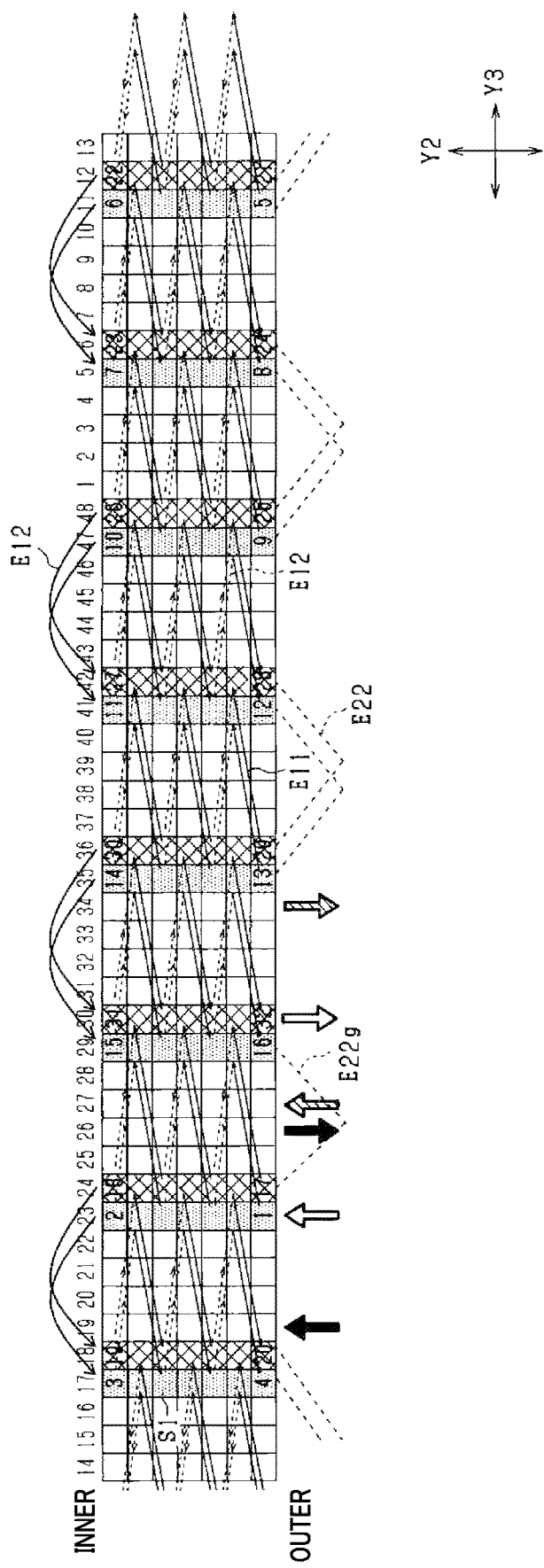
FIG. 26 is a wiring diagram of a wiring pattern of a U-phase stator winding according to a seventh embodiment.

As shown in the wiring pattern in FIG. 26, in the stator winding 32 of each phase, the number of lead-out lines that are connected to the power line and the number of lead-out lines that are connected to the neutral point are respectively one each.

As shown in FIG. 26, among the coil end portions E1 on the first end side, the first coil end portion E11 that connects the coil side portions S1 of differing layers in the radial direction is similar to that according to the first embodiment. Meanwhile, among the coil end portions E1 on the first end side, the second coil end portion E12 that connects the coil side portions S1 of the same layer in the radial direction is provided so as to connect together the coil side portions S1 in the innermost layer (the first layer from the inner side in the radial direction) that are six pitches apart in the clockwise direction. Here, the second coil end portions E12 are formed by being bent such that the second coil end portions E12 of the same phase that are arranged so as to be adjacent to each other do not interfere with each other.

As shown in FIG. 26, among the coil end portions E2 on the second end side, the second coil end portion E22 that connects the coil side portions S1 of differing layers in the radial direction is similar to that according to the first embodiment. Meanwhile, among the coil end portions E2 on the second end side, the first coil end portion E21 that connects the coil side portions S1 of the same layer in the radial direction is provided so as to connect together the coil side portions S1 in the outermost layer (the seventh layer from the inner side in the radial direction) that are six pitches or five pitches apart in the clockwise direction. Here, among the second coil end portions E22, a second coil end portion E22g that connects the stator winding 32 of the first round and the stator winding 32 of the second round connects the coil side portions S1 that are five pitches apart. The remaining second coil end portions E22 connect the coil side portions S1 that are six pitches apart. The second coil end portions E22 are formed by being bent such that interference with the second coil end portion E22 of the same phase that is arranged adjacent thereto does not occur.

Therefore, in a manner similar to that according to the above-described embodiments, in the stator winding 32 according to the seventh embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the seventh embodiment can achieve effects similar to those according to the above-described embodiments.

Eighth Embodiment

The stator winding 32 according to an eighth embodiment will be described with reference to FIG. 23 and FIG. 27. As shown in FIG. 23, the stator winding 32 according to the eighth embodiment is configured by a single three-phase windings that is connected by a Y connection (star connection). Therefore, in the stator winding 32 of each phase, the number of lead-out lines that are connected to the power line and the number of lead-out lines that are connected to the neutral point are respectively one each. In addition, the coil side portions S1 are housed in each slot 35 so as to be stacked in five layers in the radial direction.

A wiring pattern of the stator winding 32 according to the eighth embodiment will be described with reference to FIG. 27. As shown in FIG. 27, the stator winding 32 according to the eighth embodiment is a short-pitch winding in which the coil pitch is shorter than the pole pitch. In addition, the stator winding 32 is wound by lap winding. In FIG. 27, a U-phase stator winding 32 of a first round is configured by the coil side portions S1 that are indicated by cross-hatched squares being connected based on an order that is indicated by arrows and numbers. In a similar manner, a U-phase stator winding 32 of a second round is configured by the coil side portions S1 that are indicated by dot-shaded squares being connected based on an order that is indicated by arrows and numbers.

As shown in FIG. 27, the U-phase coil side portions S1 are housed so as to be distributed among three slots 35 that are adjacent to one another in the circumferential direction.

Specifically, the U-phase coil side portions S1 are housed in the first, third, and fifth layers from the inner side in the radial direction in the slot 35 that has a slot number that is 6kth (k being an integer that is any of 1 to 8). In addition, the U-phase coil side portions S1 are housed in the first to fifth layers from the inner side in the radial direction in the slot 35 that has a slot number that is 6k-5th. Furthermore, the U-phase coil side portions S1 are housed in the second and fourth layers from the inner side in the radial direction in the slot 35 that has a slot number that is 6k-4th.

In addition, among the coil end portions E1 on the first end side, the first coil end portion E11 that connects the coil side portions S1 of differing layers in the radial direction is provided so as to connect the coil side portion S1 that is in a tth layer (t being a number that is either of 2 and 4) from the inner side in the radial direction, and the coil side portion S1 that is six pitches away in the clockwise direction from the coil side portion S1 in the tth layer and is in a t+1th layer from the inner side in the radial direction. Here, in the short-pitch winding, the first coil end portion E11 connects together the coil side portions S1 that are separated by a pitch (pitch per pole per phase—K, K being a natural number that is smaller than the pitch per pole per phase) that is smaller than the pole pitch in the circumferential direction.

Meanwhile, among the coil end portions E1 on the first end side, the second coil end portion E12 that connects the coil side portions S1 of the same layer in the radial direction is arranged in the innermost layer in the radial direction. The second coil end portion E12 is provided so as to connect together the coil side portions S1 in the innermost layer (the first layer from the inner side in the radial direction) that are six pitches apart in the clockwise direction.

In addition, among the coil end portions E2 on the second end side, the first coil end portion E21 that connects the coil side portions S1 of differing layers in the radial direction is provided so as to connect the coil side portion S1 that is in the tth layer from the inner side in the radial direction, and the coil side portion S1 that is six pitches away in the clockwise direction from the coil side portion S1 in the tth layer and is in a t−1th layer from the inner side in the radial direction. Here, in the short-pitch winding, the first coil end portion E21 connects together the coil side portions S1 that are separated by a pitch (pitch per pole per phase—K, K being a natural number that is smaller than the pitch per pole per phase) that is smaller than the pole pitch in the circumferential direction.

Meanwhile, among the coil end portions E2 on the second end side, the second coil end portion E22 that connects the coil side portions S1 of the same layer in the radial direction is arranged in the outermost layer in the radial direction. The second coil end portion E22 is provided so as to connect together the coil side portions S1 in the outermost layer (a fifth layer from the inner side in the radial direction) that are six pitches or five pitches apart in the clockwise direction.

Here, among the second coil end portions E22, the second coil end portion E22g that connects the stator winding 32 of the first round and the stator winding 32 of the second round connects the coil side portions S1 that are five pitches apart. The remaining second coil end portions E22 connect the coil side portions S1 that are six pitches apart. In addition, the second coil end portion E22 that connects the coil side portions S1 that are six pitches apart is formed by being bent such that interference with the second coil end portion E22 of the same phase that is arranged adjacent thereto does not occur.

Here, a method for changing the number of turns of the stator winding 32 according to the eighth embodiment from an even number to an odd number will be described. First, as a premise, a comparison example in FIG. 28 will be described. FIG. 28 shows a wiring pattern of the stator windings 32 of three phases that are connected (in series) into a single stator winding 32. The stator winding 32 is a short-pitch winding and a lap winding. The wiring pattern in FIG. 28 differs from the wiring pattern in FIG. 27 in terms of the number of turns. Hereafter, the wiring pattern of the comparison example shown in FIG. 28 will be described mainly focusing on sections that differ from the wiring pattern according to the present embodiment shown in FIG. 27.

In the comparison example in FIG. 28, among the coil end portions E1 on the first end side, the first coil end portions E11 are provided in a manner similar to that in FIG. 27. Meanwhile, among the coil end portions E1 on the first end side, the second coil end portions E11 that connects the coil side portions S1 of the same layer in the radial direction are arranged in the innermost layer and the outermost layer in the radial direction. Hereafter, the second coil end portion E12 in the innermost layer in the radial direction is referred to as the second coil end portion E12a, and the second coil end portion E12 in the outermost layer is referred to as the second coil end portion E12b.

The second coil end portion E12a is provided so as to connect together the coil side portions S1 in the innermost layer (the first layer from the inner side in the radial direction) that are six pitches apart in the clockwise direction. That is, the second coil end portion E12a is provided in a manner similar to the second coil end portion E12 in FIG. 27. The second coil end portion E12b is provided so as to connect together the coil side portions S1 in the outermost layer (a sixth layer from the inner side in the radial direction) that are six pitches apart in the clockwise direction.

In addition, among the coil end portions E2 on the second end side, the first coil end portion E21 that connects the coil side portions S1 of differing layers in the radial direction is provided so as to connect the coil side portion S1 that is in an mth layer (m being a number that is any of 2, 4, and 6) from the inner side in the radial direction, and the coil side portion S1 that is six pitches away in the clockwise direction from the coil side portion S1 in the mth layer and is in an m−1th layer from the inner side in the radial direction. That is, compared to the wiring pattern in FIG. 27, the first coil end portions E21 are increased.

Therefore, when the wiring pattern is changed from the wiring pattern shown in FIG. 28 (an even number of turns) to the wiring pattern shown in FIG. 27 (an odd number of turns), only the configuration of the outermost layer need be changed. Specifically, first, the number of coil side portions S1 that are housed in each slot 35 is reduced to an odd number (five layers). Specifically, the first coil end portions E21 on the second end side are decreased.

Then, on both ends in the axial direction, any of the plurality of coil side portions S1 that are housed in the slot 35 is connected to the second coil end portion E12 or E22. More specifically, on the first end side, the second coil end portions E12b in the outermost layer are eliminated. Instead, on the second end side, the coil side portions S1 in the outermost layer are connected together by the second coil end portions E22. As a result of the foregoing, the stator 30 according to the eighth embodiment can achieve effects similar to those according to the above-described embodiments.

Ninth Embodiment

The stator winding 32 according to a ninth embodiment will be described with reference to FIG. 23 and FIG. 29. As shown in FIG. 23, the stator winding 32 according to the ninth embodiment is configured by a single three-phase windings that is connected by a Y connection (star connection). Therefore, in the stator winding 32 of each phase, the number of lead-out lines that are connected to the power line and the number of lead-out lines that are connected to the neutral point are respectively one each. In addition, the coil side portions S1 are housed in each slot 35 so as to be stacked in five layers in the radial direction.

A wiring pattern of the stator winding 32 according to the ninth embodiment will be described with reference to FIG. 29. As shown in FIG. 29, in a manner similar to that according to the eight embodiment, the stator winding 32 according to the ninth embodiment is a short-pitch winding in which the coil pitch is shorter than the pole pitch. Therefore, only sections of the wiring pattern that differ from the wiring pattern shown in FIG. 27 according to the eighth embodiment will be described.

Among the coil end portions E1 on the first end side, the second coil end portion E12 that connects the coil side portions S1 of the same layer in the radial direction is arranged in the innermost layer in the radial direction. The second coil end portion E12 is provided so as to connect together the coil side end portions S1 in the innermost layer (the first layer from the inner side in the radial direction) that are five pitches or seven pitches apart in the clockwise direction.

Therefore, in a manner similar to that according to the above-described embodiments, in the stator winding 32 according to the ninth embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the ninth embodiment can achieve effects similar to those according to the above-described embodiments.

Tenth Embodiment

The stator winding 32 according to a tenth embodiment will be described with reference to FIG. 8 and FIG. 30. As shown in FIG. 8, the stator winding 32 according to the tenth embodiment is configured by two three-phase windings that are each connected by a Y connection (star connection) being connected in parallel. Therefore, in the stator winding 32 of each phase, the number of lead-out lines that are connected to the power line and the number of lead-out lines that are connected to the neutral point are respectively two each. In addition, the coil side portions S1 are housed in each slot 35 so as to be stacked in five layers in the radial direction.

A wiring pattern of the stator winding 32 according to the tenth embodiment will be described with reference to FIG. 30. As shown in FIG. 30, in the stator winding 32 according to the tenth embodiment, unlike the wiring pattern shown in FIG. 29 according to the ninth embodiment, the lead-out lines (input/output terminals) from the stator windings 32 of the phases are increased. In accompaniment, on the second end side, the second coil end portions E22 that connect together partial windings of the stator winding 32 are decreased. Specifically, the second coil end portion E22g that connects together the coil side portions S1 that are five pitches apart is eliminated. Regarding other sections, the wiring pattern in FIG. 30 is identical to the wiring pattern shown in FIG. 29 according to the ninth embodiment. Therefore, according to the tenth embodiment, effects similar to those according to the ninth embodiment can be achieved.

Eleventh Embodiment

The stator winding 32 according to an eleventh embodiment will be described with reference to FIG. 8, FIG. 31, FIG. 32A, and FIG. 32B. As shown in FIG. 8, the stator winding 32 according to the eleventh embodiment is configured by two three-phase windings that are each connected by a Y connection (star connection) being connected in parallel. Therefore, in the stator winding 32 of each phase, the number of lead-out lines that are connected to the power line and the number of lead-out lines that are connected to the neutral point are respectively two each. In addition, the coil side portions S1 are housed in each slot 35 so as to be stacked in five layers in the radial direction.

A wiring pattern of the stator winding 32 according to the eleventh embodiment will be described with reference to FIG. 31. Here, sections that differ from the wiring pattern shown in FIG. 29 described according to the ninth embodiment will mainly be described. As shown in FIG. 31, in the stator winding 32 according to the eleventh embodiment, unlike the wiring pattern shown in FIG. 29 according to the ninth embodiment, the number of the lead-out lines (input/output terminals) from the stator windings 32 of the phases is increased. In accompaniment, on the second end side, the second coil end portions E22 that connect together partial windings of the stator winding 32 are decreased. Specifically, the second coil end portion E22g that connects together the coil side portions 51 that are five pitches apart is eliminated.

In addition, among the coil end portions E2 on the second end side, the second coil end portion E22 that connects the coil side portions 51 of the same layer in the radial direction is arranged in the outermost layer in the radial direction. The second coil end portion E22 is provided so as to connect together the coil side portions 51 in the outermost layer (the fifth layer from the inner side in the radial direction) that are five pitches or seven pitches apart in the clockwise direction.

Here, among the second coil end portions E22, the second coil end portion E22 that connects together the coil side portions S1 that are five pitches apart is referred to as a second coil end portion E22a, and the second coil end portion E22 that connects together the coil side portions S1 that are seven pitches apart is referred to as a second coil end portion E22b.

Figure 32A:
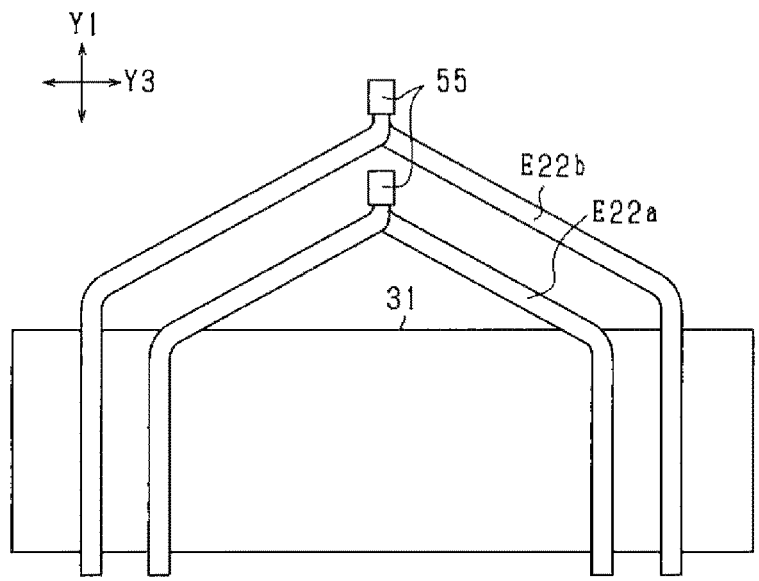
FIG. 32A is a front view of second coil end portions according to the eleventh embodiment and FIG. 32B is a side view thereof.
Figure 32B:
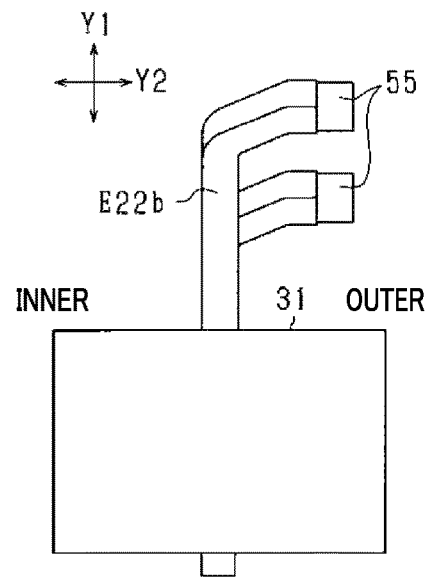

On the second end side, as shown in FIG. 32A, the second coil end portion E22a and the second coil end portion E22b are arranged so as to overlap in the axial direction in the outermost layer. That is, the second coil end portion E22a is arranged so as to be sandwiched between the second coil end portion E22b and the stator core 31. At this time, as shown in FIG. 32B, the second coil end portion E22a and the second coil end portion E22b are bent such that the joining portions 55 of the second coil end portion E22a and the second coil end portion E22b are arranged further toward the outer side in the radial direction than the outermost layer is. As a result, the joining portions 55 of the second coil end portion E22a and the second coil end portion E22b are arranged in a row in the axial direction. Connection is facilitated.

Here, the second coil end portion E22a is a portion that has a higher electric potential than the second coil end portion E22*b*. That is, the second coil end portion E22*a* is a portion that is far from the neutral point. As a result, insulation performance can be improved.

Therefore, in a manner similar to that according to the above-described embodiments, in the stator winding 32 according to the eleventh embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the eleventh embodiment can achieve effects similar to those according to the above-described embodiments.

Figure 33:
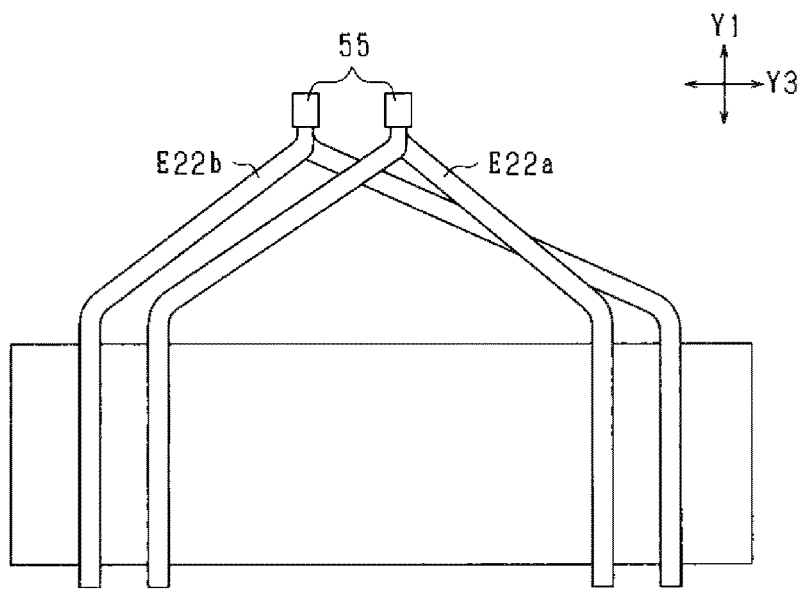
FIG. 33 is a front view of the second coil end portions in another example according to the eleventh embodiment.

Here, the second coil end portion E22*a* and the second coil end portion E22*b* are not required to be overlapped in the axial direction as shown in FIG. 32A. Shapes and arrangements of the second coil end portion E22*a* and the second coil end portion E22*b* may be arbitrarily modified. For example, as shown in FIG. 33, the shapes of the second coil end portion E22*a* and the second coil end portion E22*b* may be modified so as to be shifted in the circumferential direction. As a result, an axial-direction size can be reduced.

Twelfth Embodiment

The stator winding 32 according to a twelfth embodiment will be described with reference to FIG. 20 and FIG. 34. As shown in FIG. 20, the stator winding 32 according to the twelfth embodiment is configured by four three-phase windings that are each connected by a Y connection (star connection) being connected in parallel.

A wiring pattern of the stator winding 32 according to the twelfth embodiment will be described with reference to FIG. 34. In FIG. 34, a first U-phase stator winding 32 is configured by the coil side portions S1 that are indicated by left-to-right diagonally hatched squares being connected based on an order that is indicated by arrows and numbers. In a similar manner, a second U-phase stator winding 32 is configured by the coil side portions S1 that are indicated by dot-shaded squares being connected based on an order that is indicated by arrows and numbers. In a similar manner, a third U-phase stator winding 32 is configured by the coil side portions S1 that are indicated by right-to-left diagonally hatched squares being connected based on an order that is indicated by arrows and numbers. In a similar manner, a fourth U-phase stator winding 32 is configured by the coil side portions S1 that are indicated by cross-hatched squares being connected based on an order that is indicated by arrows and numbers.

As shown in the wiring pattern in FIG. 34, in the stator winding 32 of each phase, the number of lead-out lines that are connected to the power line and the number of lead-out lines that are connected to the neutral point are respectively four each. Therefore, in the wiring pattern in FIG. 34, unlike the wiring pattern shown in FIG. 29 according to the ninth embodiment, the lead-out lines from the partial windings of the stator windings 32 of the phases are increased. In accompaniment, on the second end side, the second coil end portions E22 that connect the partial windings are decreased. Regarding other sections, the wiring pattern in FIG. 34 is identical to the wiring pattern shown in FIG. 29 according to the ninth embodiment.

Therefore, in a manner similar to that according to the above-described embodiments, in the stator winding 32 according to the twelfth embodiment as well, the number of turns can be easily changed from an even number to an odd number by the configuration of the outermost layer being changed. That is, upon the coil side portions S1 that are housed in each slot 35 being decreased to an odd number, on both sides in the axial direction, any one of the plurality of coil side portions S1 that are housed in the slot 35 is connected to the second coil end portion E12 or E22. As a result of the foregoing, the stator 30 according to the twelfth embodiment can achieve effects similar to those according to the above-described embodiments.

Thirteenth Embodiment

The stator winding 32 according to a thirteenth embodiment will be described with reference to FIG. 23, FIG. 35A, and FIG. 35B. As shown in FIG. 23, the stator winding 32 according to the thirteenth embodiment is configured by a single three-phase windings that is connected by a Y connection (star connection). Therefore, in the stator winding 32 of each phase, the number of lead-out lines that are connected to the power line and the number of lead-out lines that are connected to the neutral point are respectively one each. In addition, the coil side portions S1 are housed in each slot 35 so as to be stacked in five layers in the radial direction.

Here, the wiring pattern of the stator winding 32 will be described with reference to FIG. 35A and FIG. 35B. As shown in FIG. 35A and FIG. 35B, the stator winding 32 according to the present embodiment is wound by wave winding. In FIG. 35A, a U-phase stator winding 32 (partial winding) of a first round is configured by the coil side portions S1 that are indicated by cross-hatched squares being connected based on an order that is indicated by arrows and numbers. In FIG. 35B, a U-phase stator winding 32 (partial winding) of a second round is configured by the coil side portions S1 that are indicated by dot-shaded squares being connected based on an order that is indicated by arrows and numbers.

As shown in FIG. 35A and FIG. 35B, the coil side portions S1 of the same phase are housed in two slots 35 that are adjacent to each other in the circumferential direction. Among the coil end portions E1 on the first end side, the first coil end portion E11 that connects the coil side portions S1 of differing layers in the radial direction is provided so as to connect the coil side portion S1 that is in an xth layer (x being a number that is either of 1 and 3) from the inner side in the radial direction and the coil side portion S1 that is six pitches away in the clockwise direction from the coil side portion S1 in the xth layer, and is in an x+1th layer from the inner side in the radial direction.

Meanwhile, among the coil end portions E1 on the first end side, the second coil end portions E12 that connect the coil side portions S1 of the same layer in the radial direction are arranged in the innermost layer and the outermost layer in the radial direction. The second coil end portion E12 (referred to, hereafter, as a second coil end portion E12*c*) in the outermost layer is provided so as to connect together the coil side portions S1 in the outermost layer (the fifth layer from the inner side in the radial direction) that are six pitches apart in the clockwise direction.

In addition, on the first end side, the second coil end portion E12 (referred to, hereafter, as a second coil end portion E12*d*) in the innermost layer is provided so as to connect the coil side portion S1 that is housed in the slot 35 that has a slot number that is 42nd and the coil side portion S1 that is housed in the slot 35 that has a slot number that is 48th. The second coil end portion E12d is provided to connect in series the U-phase stator winding 32 (partial winding) of the first round and the U-phase stator winding 32 (partial winding) of the second round.

Furthermore, among the coil end portions E2 on the second end side, the first coil end portion E21 that connects the coil side portions S1 of differing layers in the radial direction is provided so as to connect the coil side portion S1 that is in an x+1th (x being a number that is either of 1 and 3) layer from the inner side in the radial direction, and the coil side portion S1 that is six pitches away in the clockwise direction from the coil side portion S1 in the x+1th layer, and is in an xth layer from the inner side in the radial direction.

Meanwhile, among the coil end portions E2 on the second end side, the second coil end portion E22 that connects the coil side portions S1 of the same layer in the radial direction is arranged in the outermost layer in the radial direction. The second coil end portion E22 is provided so as to connect together the coil side portions S1 in the outermost layer (the fifth layer from the inner side in the radial direction) that are six pitches apart in the clockwise direction. Here, as shown in FIG. 35A and FIG. 35B, the second coil end portions E12c on the first end side and the second coil end portions E22 on the second end side are provided in the outermost layer so as to alternate in the circumferential direction.

Here, a method for changing the number of turns of the stator winding 32 according to the thirteenth embodiment from an even number to an odd number will be described. First, as a premise, a comparison example in FIG. 36 will be described. FIG. 36 shows a wiring pattern of the stator winding 32 that is configured by a single (series-connection) three-phase winding. The stator winding 32 is a wave winding. The wiring pattern in FIG. 36 differs from the wiring pattern in FIG. 35 in terms of the number of turns. Hereafter, the wiring pattern of the comparison example shown in FIG. 36 will be described mainly focusing on sections that differ from the wiring pattern according to the present embodiment shown in FIG. 35. Here, in FIG. 36, only numbers are shown regarding the wiring pattern of the U-phase stator winding 32 of the second round. Illustration thereof is omitted.

In the comparison example in FIG. 36, on both the first end side and the second end side, the first coil end portions E11 and E21 that connect the coil side portions S1 of differing layers in the radial direction are increased by one each in the radial direction. In addition, in a manner similar to that in FIG. 35, on the first end side, the second coil end portion E12d that connects the partial windings in series is provided in the innermost layer in the radial direction.

Meanwhile, on the first end side, the second coil end portion E12 (referred to, hereafter, as a second coil end portion E12e) is provided in the outermost layer in the radial direction. The second coil end portion E12e is provided to fold back the stator winding 32 in the radial direction. The second coil end portion E12e connects the coil side portion S1 in the outermost layer that is housed in the slot 35 that has a slot number that is 47th, and the coil side portion S1 in the outermost layer that is housed in the slot 35 that has a slot number that is 6th. Here, although not shown, the second coil end portion E12e that connects the coil side portion S1 in the outermost layer that is housed in the slot 35 that has a slot number that is 48th, and the coil side portion S1 in the outermost layer that is housed in the slot 35 that has a slot number that is 45th is also present.

Meanwhile, on the second end side, the second coil end portion E22 that connects the coil side portions S1 of the same layer is not present. Therefore, when the wiring pattern is changed from the wiring pattern shown in FIG. 36 to the wiring pattern shown in FIG. 35, first, the coil side portions S1 that are housed in each slot 35 are reduced to an odd number. Then, on both ends in the axial direction, any of the plurality of coil side portions S1 that are housed in the slot 35 is connected to the second coil end portion E12 or E22. Specifically, in the outermost layer, the second coil end portion E12c on the first end side and the second coil end portion E22 on the second end side are provided so as to alternate in the circumferential direction. As a result of the foregoing, the stator 30 according to the thirteenth embodiment can achieve effects similar to those according to the above-described embodiments.

Fourteenth Embodiment

The stator winding 32 according to a fourteenth embodiment will be described with reference to FIG. 8, FIG. 37A, and FIG. 37B. As shown in FIG. 8, the stator winding 32 according to the fourteenth embodiment is configured by two three-phase windings that are each connected by a Y connection (star connection) being connected in parallel. Therefore, in the stator winding 32 of each phase, the number of lead-out lines that are connected to the power line and the number of lead-out lines that are connected to the neutral point are respectively two each. In addition, the coil side portions S1 are housed in each slot 35 so as to be stacked in five layers in the radial direction.

Here, the wiring pattern of the stator winding 32 will be described with reference to FIG. 37A and FIG. 37B. In a manner similar to that according to the thirteenth embodiment, the stator winding 32 according to the fourteenth embodiment is wound by wave winding. Therefore, sections that differ from the wiring pattern shown in FIG. 35 described according to the thirteenth embodiment will mainly be described.

In FIG. 37A, a first U-phase stator winding 32 is configured by the coil side portions S1 that are indicated by cross-hatched squares being connected based on an order that is indicated by arrows and numbers. In FIG. 37B, a second U-phase stator winding 32 is configured by the coil side portions S1 that are indicated by dot-shaded squares being connected based on an order that is indicated by arrows and numbers.

As shown in FIG. 37A and FIG. 37B, on the first end side and the second end side, the configurations of the first coil end portions E11 and E21 that connect the coil side portions S1 of differing layers in the radial direction are similar to those according to the thirteenth embodiment. Meanwhile, on the first end side and the second end side, the second coil end portions E12c and E22 that connect the coil side portions S1 of the same layer in the radial direction are provided in the outermost layer.

As shown in FIG. 37A, in the outermost layer of the first U-phase stator winding 32, the second coil end portions E12c on the first end side and the second coil end portions E22 on the second end side are provided so as to alternate in the circumferential direction. Here, in the first U-phase stator winding 32, most of the second coil end portions E12c and E22 connect the coil side portions S1 that are six pitches apart. The second coil end portion E12c that connects the coil side portions E1 that are housed in the 18th slot 35 and the 23rd slot 35 connects the coil side portions S1 that are five pitches apart.

In addition, as shown in FIG. 37B, in the outermost layer of the second U-phase stator winding 32, the second coil end portions E12c on the first end side and the second coil end portions E22 on the second end side are provided so as to alternate in the circumferential direction. Here, in the second U-phase stator winding 32, most of the second coil end portions E12c and E22 connect the coil side portions S1 that are six pitches apart. The second coil end portion E12c that connects the coil side portions E1 that are housed in the 17th slot 35 and the 24th slot 35 connects the coil side portions S1 that are seven pitches apart.

According to the fourteenth embodiment, the number of turns can be set to an odd number in a manner similar to that according to the thirteenth embodiment. In addition, when the number of turns is changed from an even number to an odd number, upon the coil side portions S1 that are housed in each slot 35 being decreased to an odd number, on both sides in the axial direction, any of the plurality of coil side portions S1 that are housed in the slot 35 is connected to the second coil end portion E12 or E22. Specifically, in the outermost layer, the second coil end portions E12c on the first end side and the second coil end portions E22 on the second end side are provided so as to alternate in the circumferential direction. As a result of the foregoing, the stator 30 according to the fourteenth embodiment can achieve effects similar to those according to the above-described embodiments.

Fifteenth Embodiment

The stator winding 32 according to a fifteenth embodiment will be described with reference to FIG. 8, FIG. 38A, and FIG. 38B. As shown in FIG. 8, the stator winding 32 according to the fourteenth embodiment is configured by two three-phase windings that are each connected by a Y connection (star connection) being connected in parallel. Therefore, in the stator winding 32 of each phase, the number of lead-out lines that are connected to the power line and the number of lead-out lines that are connected to the neutral point are respectively two each. In addition, the coil side portions S1 are housed in each slot 35 so as to be stacked in five layers in the radial direction.

Here, the wiring pattern of the stator winding 32 will be described with reference to FIG. 38A and FIG. 38B. In a manner similar to that according to the thirteenth embodiment, the stator winding 32 according to the fifteenth embodiment is wound by wave winding. Therefore, sections that differ from the wiring pattern shown in FIG. 35 described according to the thirteenth embodiment will mainly be described.

In FIG. 38A, a first U-phase stator winding 32 is configured by the coil side portions S1 that are indicated by cross-hatched squares being connected based on an order that is indicated by arrows and numbers. FIG. 38B, a second U-phase stator winding 32 is configured by the coil side portions S1 that are indicated by dot-shaded squares being connected based on an order that is indicated by arrows and numbers.

As shown in FIG. 38A and FIG. 38B, on the first end side and the second end side, the configurations of the first coil end portions E11 and E21 that connect the coil side portions S1 of differing layers in the radial direction are similar to those according to the thirteenth embodiment. Meanwhile, on the first end side and the second end side, the second coil end portions E12c and E22 that connect the coil side portions S1 of the same layer in the radial direction are provided in the outermost layer.

As shown in FIG. 38A, in the outermost layer of the first U-phase stator winding 32, the second coil end portions E12c on the first end side and the second coil end portions E22 on the second end side are provided so as to alternate in the circumferential direction. In the first U-phase stator winding 32, the second coil end portion E12c on the first end side connects the coil side portions S1 that are seven pitches apart and the second coil end portion E22 on the second end side connects the coil side portions S1 that are five pitches apart.

In addition, as shown in FIG. 38B, in the outermost layer of the second U-phase stator winding 32, the second coil end portions E12c on the first end side and the second coil end portions E22 on the second end side are provided so as to alternate in the circumferential direction. In the second U-phase stator winding 32, the second coil end portion E12c on the first end side connects the coil side portions S1 that are five pitches apart and the second coil end portion E22 on the second end side connects the coil side portions S1 that are seven pitches apart.

According to the fifteenth embodiment, the number of turns can be set to an odd number in a manner similar to that according to the thirteenth embodiment. In addition, when the number of turns is changed from an even number to an odd number, upon the coil side portions S1 that are housed in each slot 35 being decreased to an odd number, on both sides in the axial direction, any of the plurality of coil side portions S1 that are housed in the slot 35 is connected to the second coil end portion E12 or E22. Specifically, in the outermost layer, the second coil end portions E12c on the first end side and the second coil end portions E22 on the second end side are provided so as to alternate in the circumferential direction. As a result of the foregoing, the stator 30 according to the fifteenth embodiment can achieve effects similar to those according to the above-described embodiments.

Sixteenth Embodiment

The stator winding 32 according to a sixteenth embodiment will be described with reference to FIG. 20, FIG. 39A, and FIG. 39B. As shown in FIG. 20, the stator winding 32 according to the sixteenth embodiment is configured such that four three-phase windings that are each connected by a Y connection (star connection) are connected in parallel. Therefore, in the stator winding 32 of each phase, the number of lead-out lines that are connected to the power line and the number of lead-out lines that are connected to the neutral point are respectively four each. In addition, the coil side portions 51 are housed in each slot 35 so as to be stacked in five layers in the radial direction.

Figure 39A:
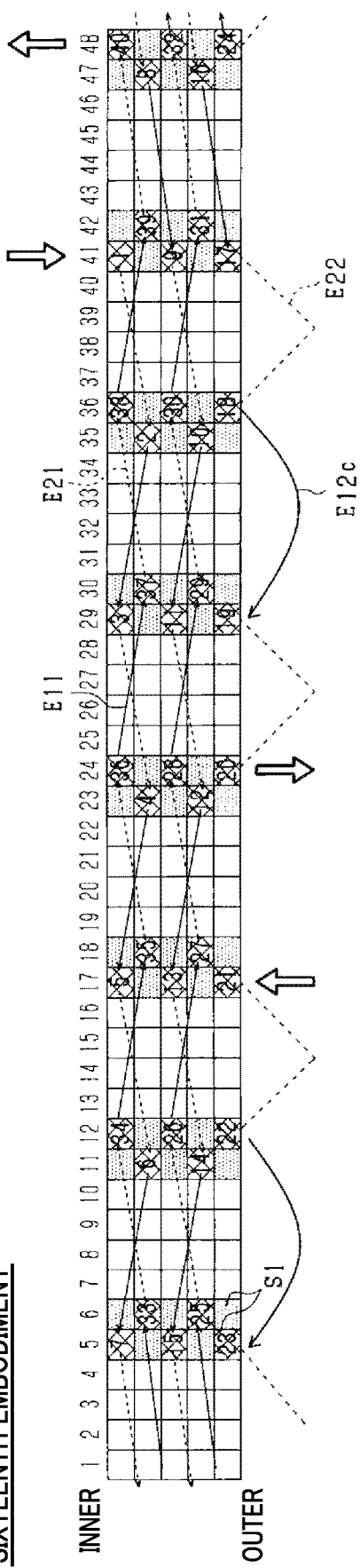
FIG. 39A and FIG. 39B are wiring diagrams of a wiring pattern of a U-phase stator winding according to a sixteenth embodiment.
Figure 39B:
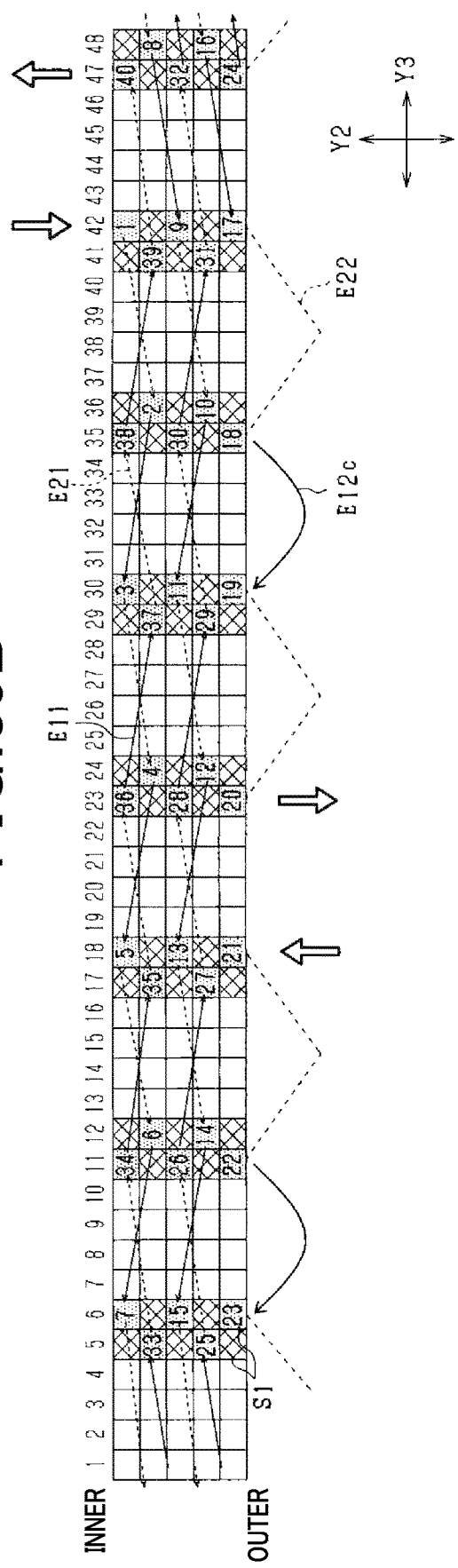

As shown in FIG. 39A and FIG. 39B, the wiring pattern according to the sixteenth embodiment is substantially identical to the wiring pattern in FIG. 38 described according to the fifteenth embodiment. Here, in accompaniment with an increase in the lead-out lines, a portion of the second coil end portions E12c and E22 is eliminated.

According to the sixteenth embodiment, the number of turns can be set to an odd number in a manner similar to that according to the thirteenth embodiment. In addition, when the number of turns is changed from an even number to an odd number, upon the coil side portions 51 that are housed in each slot 35 being decreased to an odd number, on both sides in the axial direction, any of the plurality of coil side portions 51 that are housed in the slot 35 is connected to the second coil end portion E12 or E22. Specifically, in the outermost layer, the second coil end portions E12c on the first end side and the second coil end portions E22 on the second end side are provided so as to alternate in the circumferential direction. As a result of the foregoing, the stator 30 according to the sixteenth embodiment can achieve effects similar to those according to the above-described embodiments.

(Modifications)

Modifications in which portions of the configurations according to the above-described embodiments are modified will be described.

Figure 40:
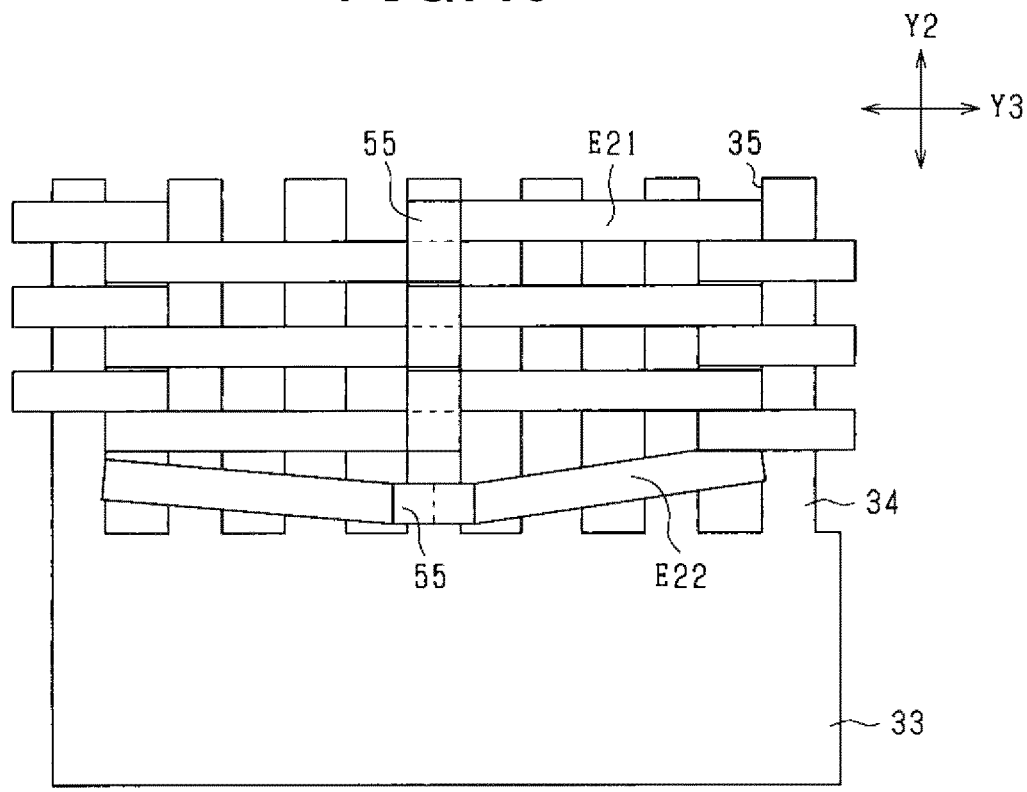
FIG. 40 is a plan view of a modification of the joining portions.

According to the above-described embodiments, in the joining portion 55 that is provided in the second coil end portion E22 on the second side, the conductor end portions 53 are joined so as to overlap in the radial direction. As a modification thereof, as shown in FIG. 40, in the joining portion 55 of the second coil end portion E22 on the second end side, the conductor end portions 53 may be joined so as to overlap in the circumferential direction. Because the second coil end portion E22 connects the coil side portions S1 of the same layer in the radial direction, as a result of the conductor end portions 53 being connected so as to overlap in the circumferential direction, a bending amount of the second coil end portion E22 can be reduced. Consequently, a radial-direction size can be suppressed. Here, FIG. 40 is a plan view in which the circumferential direction of the stator 30 is expanded in the left/right direction.

Figure 41:
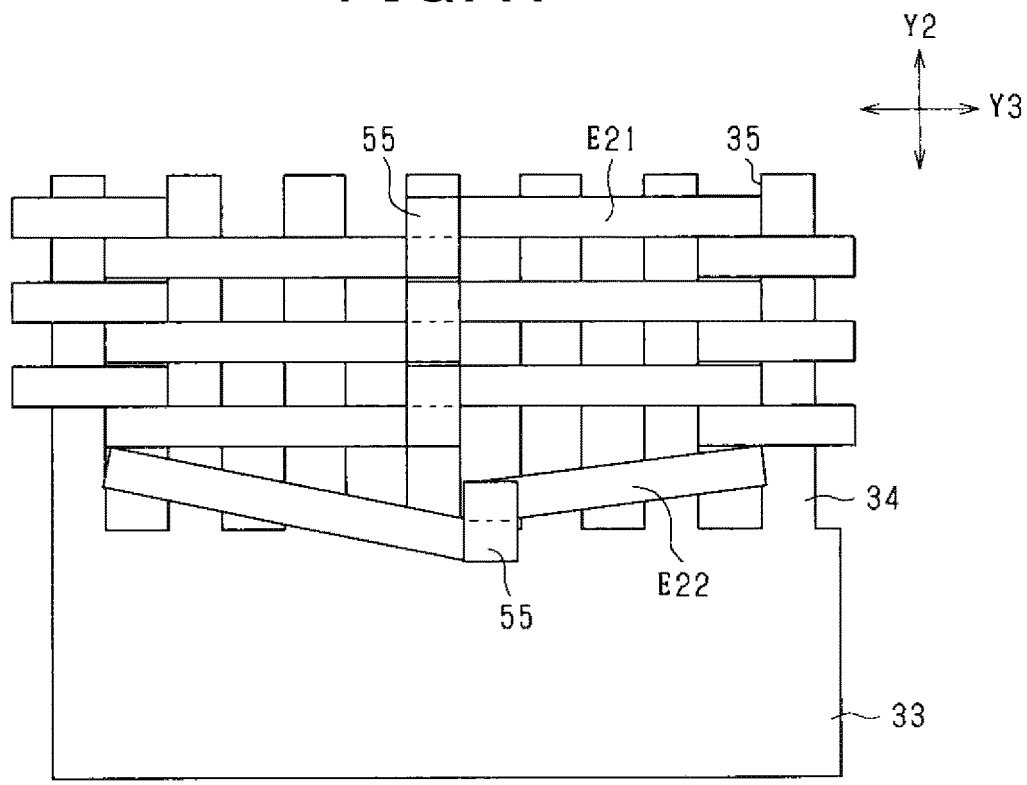
FIG. 41 is a plan view of a modification of the joining portions.

According to the above-described embodiments, on the second end side of the stator core 31, the joining portions 55 that are provided in the first coil end portion E21 and the second coil end portion E22 are provided so as to be arrayed in a row in the radial direction. As a modification thereof, as shown in FIG. 41, a position of the joining portion 55 of the second coil end portion E22 may be shifted in the circumferential direction in relation to the joining portion 55 of the first coil end portion 21. Consequently, the radial-direction size can be suppressed. In addition, the bending amount can be reduced. Here, FIG. 41 is a plan view in which the circumferential direction of the stator 30 is expanded in the left/right direction.

Figure 42B:
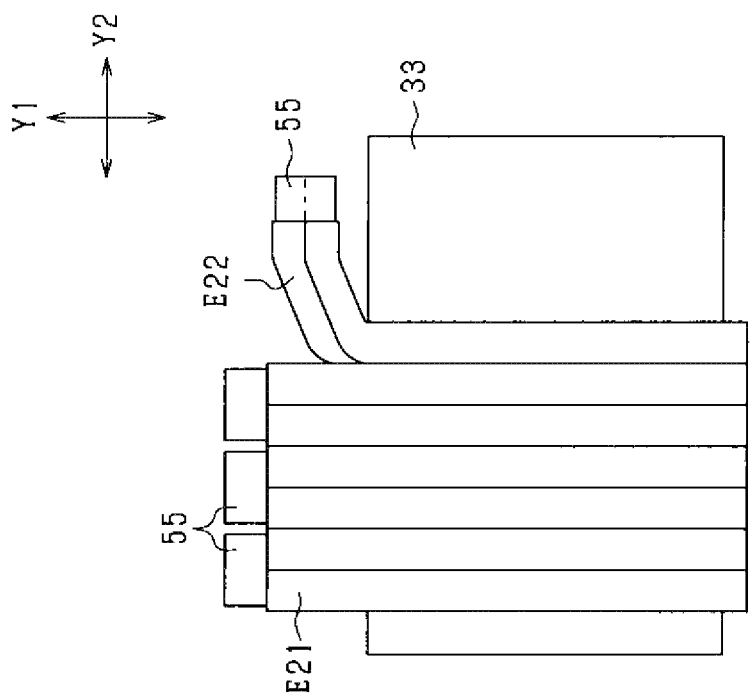
FIG. 42A is a plan view of a modification of the joining portions and FIG. 42B is a side cross-sectional view of the modification of the joining portions.
Figure 42A:
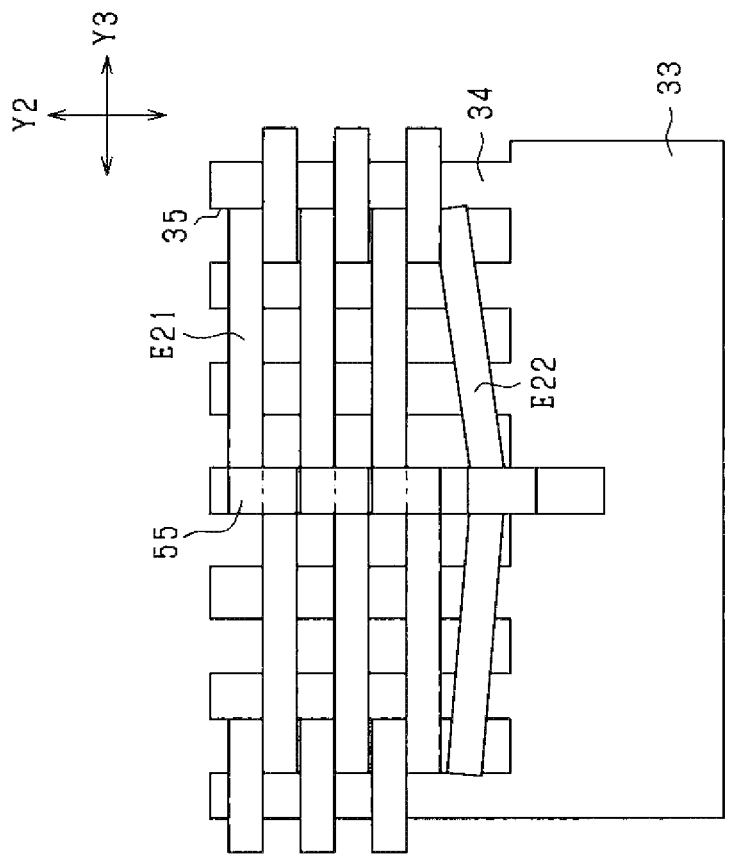

According to the above-described embodiment, as shown in FIG. 42A and FIG. 42B, the second coil end portion E22 may be bent in the radial direction such that the joining portion 55 thereof protrudes further toward the outer side in the radial direction than the coil side portion S1 in the outermost layer is. As a result of the joining portion 55 of the second coil end portion E22 being made to protrude toward the outer side in the radial direction that is relatively spacious, joining is facilitated. In addition, interference with other coil end portions E2 being avoided by the second coil end portion E22 being bent toward the outer side in the radial direction is facilitated.

Figure 43:
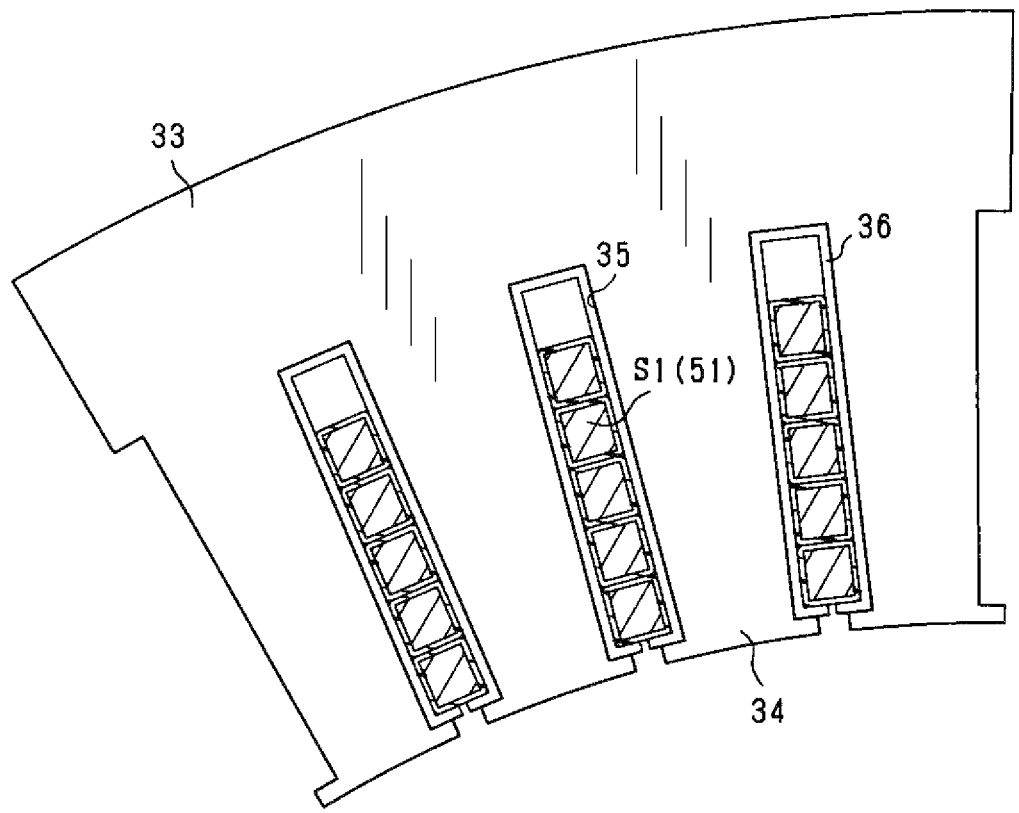
FIG. 43 is a lateral cross-sectional view of a modification of the stator.

According to the above-described embodiments, when the number of turns is changed from an even number to an odd number, the number of coil side portions S1 that are housed in each slot 35 is decreased. However, a size of the stator core 31 need not be changed in accompaniment with the decrease in the coil side portions S1. That is, as shown in FIG. 43, the slot 35 may be configured to be capable of housing 2N+2 layers (N being a natural number; six layers in FIG. 43). When the number of turns is changed from an even number to an odd number, an empty space in which the coil side portion S1 amounting to a single layer can be housed may be provided on the outer side in the radial direction in the slot 35. As a result, the stator core 31 need not be modified in accompaniment with the change in the number of turns. The change in the number of turns can be further facilitated. Here, as a result of the empty space in which the coil side portion S1 amounting to a single layer can be housed being provided on the outer side in the radial direction, compared to when the space is provided on the inner side in the radial direction, a distance between a magnet and the stator winding 32 is shortened. Magnetic flux leakage can be suppressed.

In addition, as shown in FIG. 43, when the number of turns is changed from an even number to an odd number, the shape of the insulation sheet 36 need not be changed. As a result, space is provided on the inner side of the insulation sheet 36. When the coil side portions S1 of the odd-number of layers are inserted, the insulation sheet 36 being pulled and damaged can be suppressed.

Figure 44:
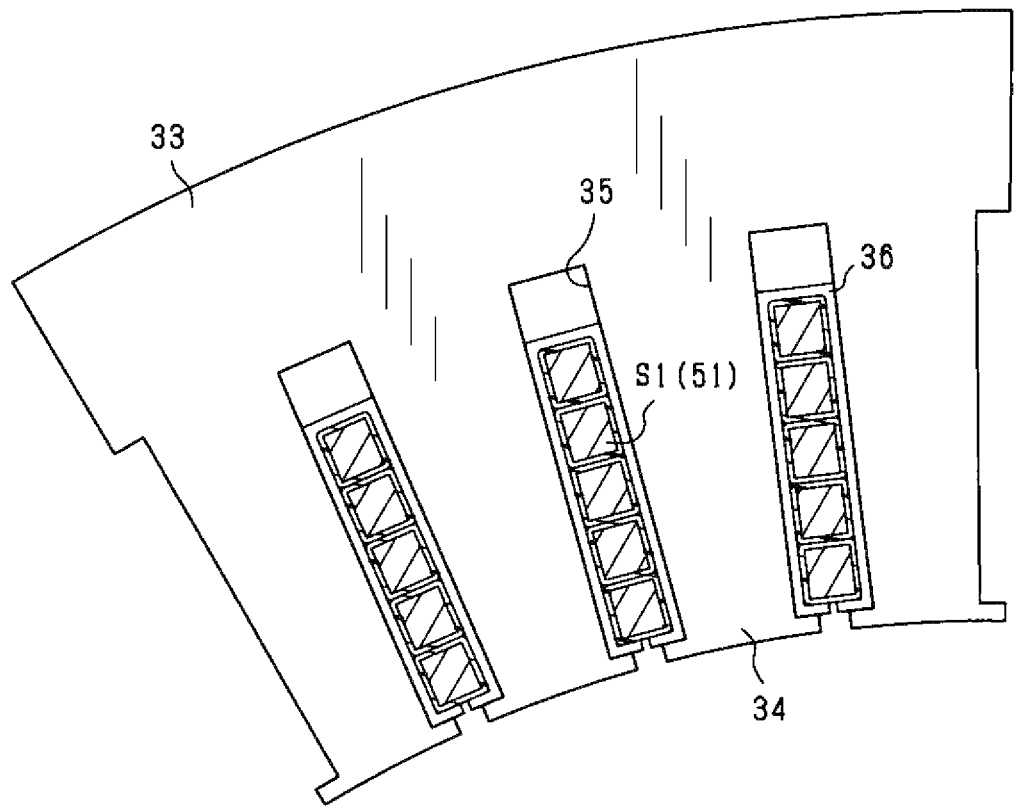
FIG. 44 is a lateral cross-sectional view of a modification of the stator.

Here, as shown in FIG. 44, when the number of turns is changed from an even number to an odd number, the shape of the insulation sheet 36 may be changed. The space on the inner side of the insulation sheet 36 may be eliminated and the insulation sheet 36 may snugly cover the coil side portions S1.

Figure 45:
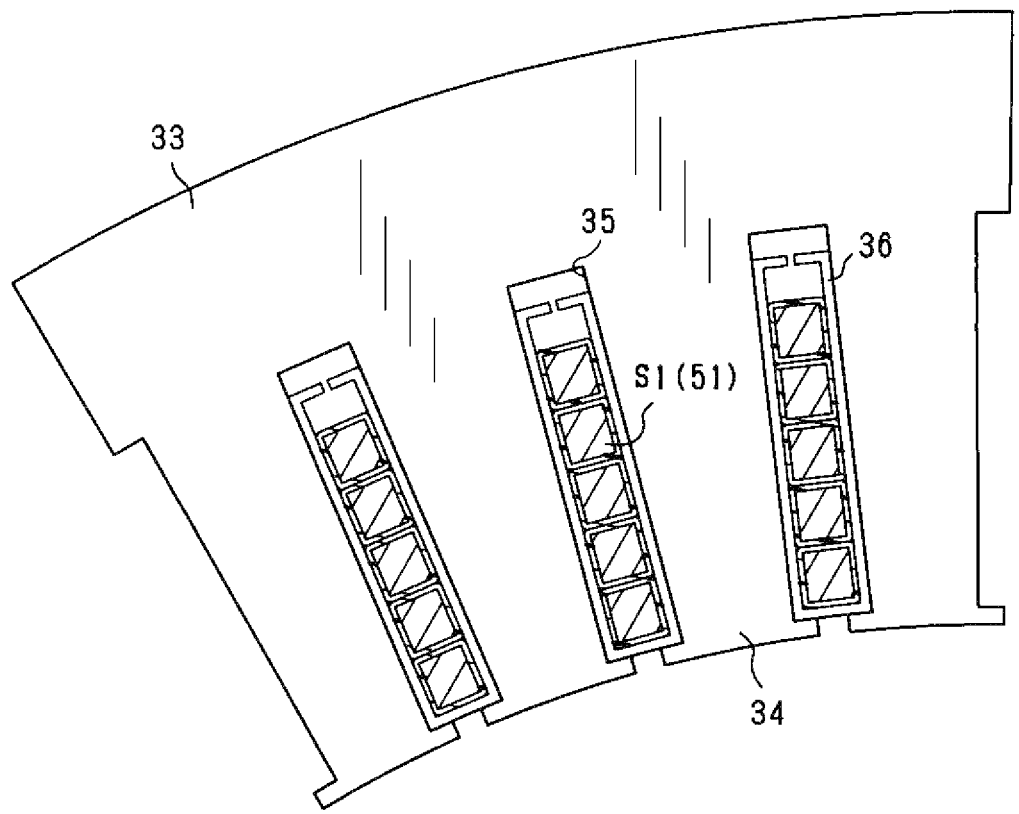
FIG. 45 is a lateral cross-sectional view of a modification of the stator.
Figure 46:
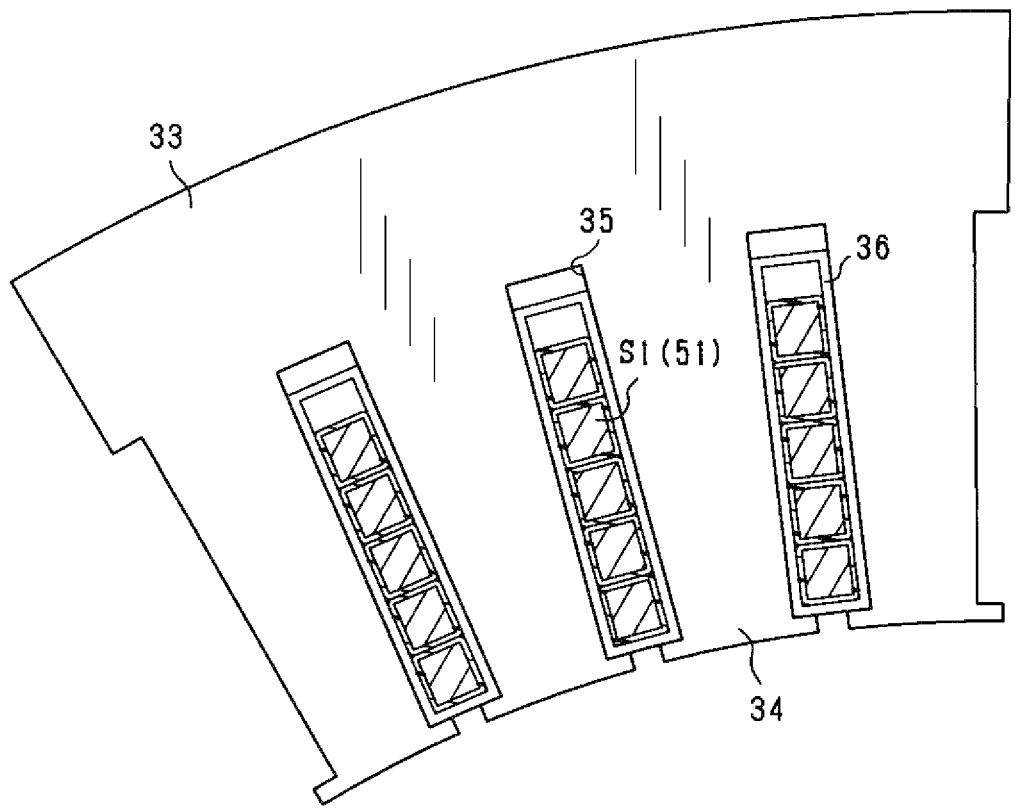
FIG. 46 is a lateral cross-sectional view of a modification of the stator.

In addition, as shown in FIG. 45 and FIG. 46, when the number of turns is changed from an even number to an odd number, the shape of the insulation sheet 36 may be changed, and space may be provided on the inner side and the outer side of the insulation sheet 36. As a result, the insulation sheet 36 can be easily inserted into the slot 35 and the conductor segments 50 can be easily inserted into the inner side of the insulation sheet 36. Here, a start position and an end position of wrapping of the insulation sheet 36 may be on either of the inner side and the outer side in the radial direction.

According to the above-described embodiments, when the empty space is provided inside the slot 35 as shown in FIG. 43, the empty space may be effectively used as in the modifications in FIG. 47 to FIG. 54. This will be described in detail below.

Figure 47:
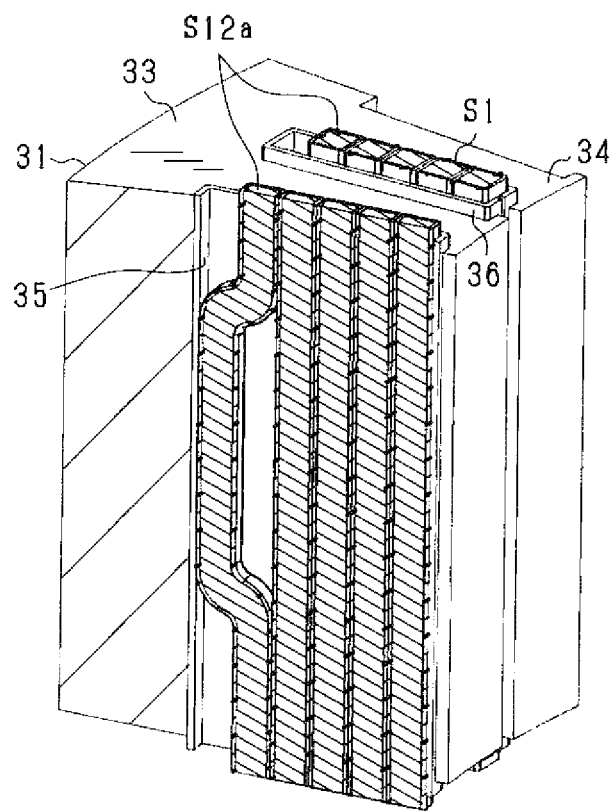
FIG. 47 is a perspective cross-sectional view of a modification of the stator.

As shown in FIG. 47, a coil side portion S12a in the outermost layer may be bent such that a portion thereof is housed in the empty space. That is, the coil side portion S12a that is adjacent to the empty space may be bent such that a portion thereof is housed in the empty space. The coil side portion S12a is such that a center portion thereof in the axial direction is bent toward the outer side in the radial direction while both end portions in the axial direction remain stacked against the other coil side portion S1.

Figure 48:
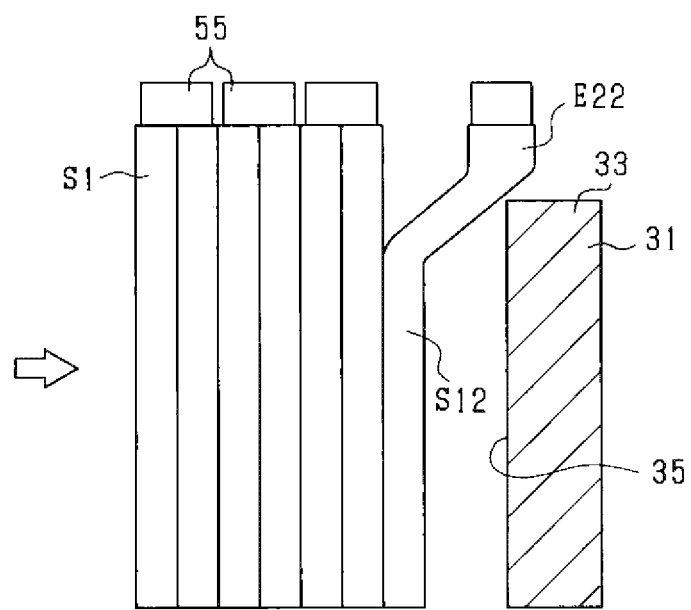
FIG. 48 is a longitudinal cross-sectional view of a modification of the stator.
Figure 49:
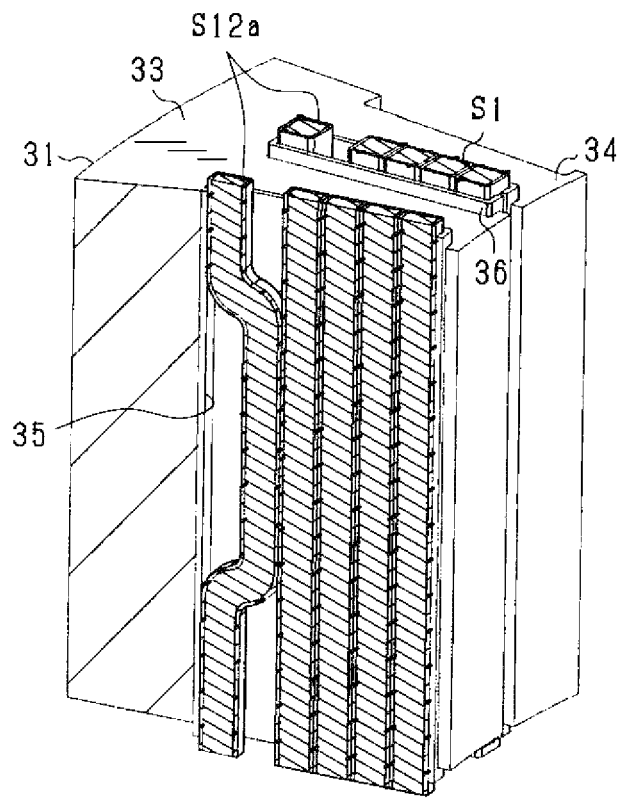
FIG. 49 is a perspective cross-sectional view of the modification of the stator.

In a similar manner, as shown in FIG. 48 and FIG. 49, a coil side portion S12b in the outermost layer may be bent such that a portion thereof is housed in the empty space. The coil side portion S12b is such that both end portions thereof in the axial direction are bent toward the outer side in the radial direction while the center portion in the axial direction remains stacked against the other coil side portion S1. That is, both end in the axial direction of the coil side portion S12b that is adjacent to the empty space may be housed in the empty space. Here, when both end portions of the coil side portion S12b are bent toward the outer side in the radial direction, as shown in FIG. 48, the second coil end portion E22 that connects the coil end portions S12b can also be arranged further toward the outer side in the radial direction. Therefore, the bending amount of the second coil end portion E22 can be reduced.

Figure 50:
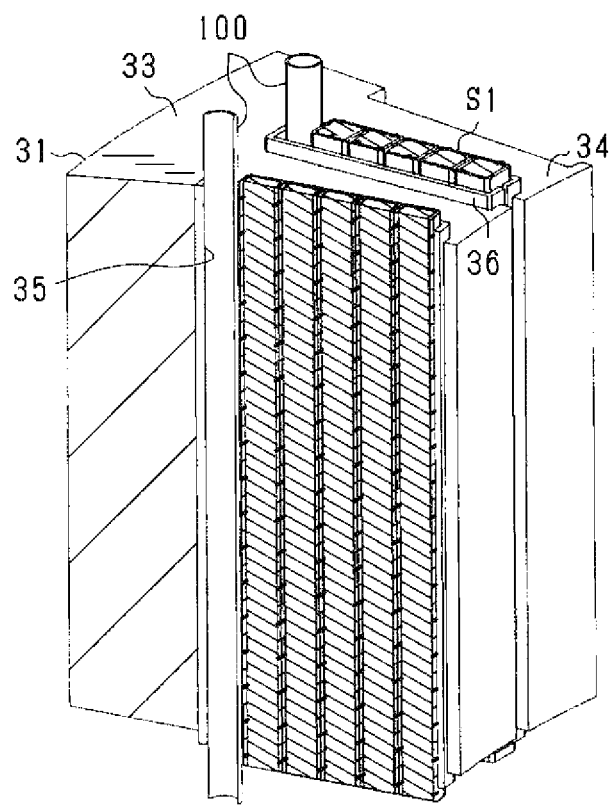
FIG. 50 is a perspective cross-sectional view of a modification of the stator.

As shown in FIG. 50, a coolant passage 100 through which a coolant such as cooling water passes may be arranged so as to pass through the empty space that is provided on the outer side in the radial direction inside the slot 35. As a result, the stator core 31 and the stator winding 32 can be efficiently cooled.

Figure 51:
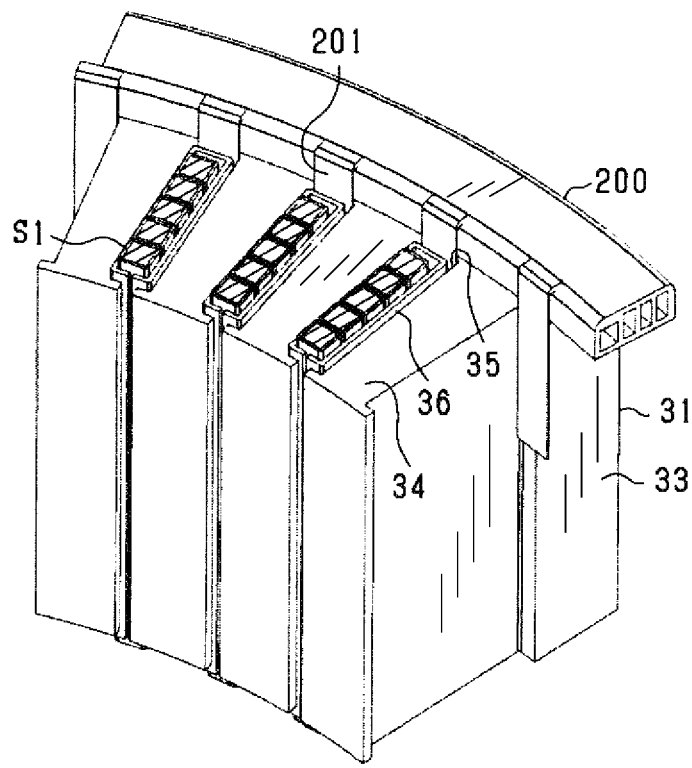
FIG. 51 is a perspective cross-sectional view of a modification of the stator.

As shown in FIG. 51, a leg portion 201 that serves as a fixing member for a bus bar unit 200 may be inserted into the empty space that is provided on the outer side in the radial direction inside the slot 35. The bus bar unit 200 may thereby be fixed to the stator core 31. The bus bar unit 200 connects together winding end portions (lead-out lines) of the stator windings 32 of the phases that are separated in the circumferential direction. In addition, the bus bar unit 200 may be used to connect the stator winding 32 to the power line. Furthermore the bus bar unit 200 may be used to connect the stator windings 32 of the phases to the neutral point. The bus bar unit 200 is arranged on the outer side in the radial direction of the stator winding 32. For example, the bus bar unit 200 may be arranged so as to overlap the back yoke 33. As shown in FIG. 51, the leg portion 201 protrudes in the axial direction from the bus bar unit 200 and is inserted into the empty space inside each slot 35.

Figure 52:
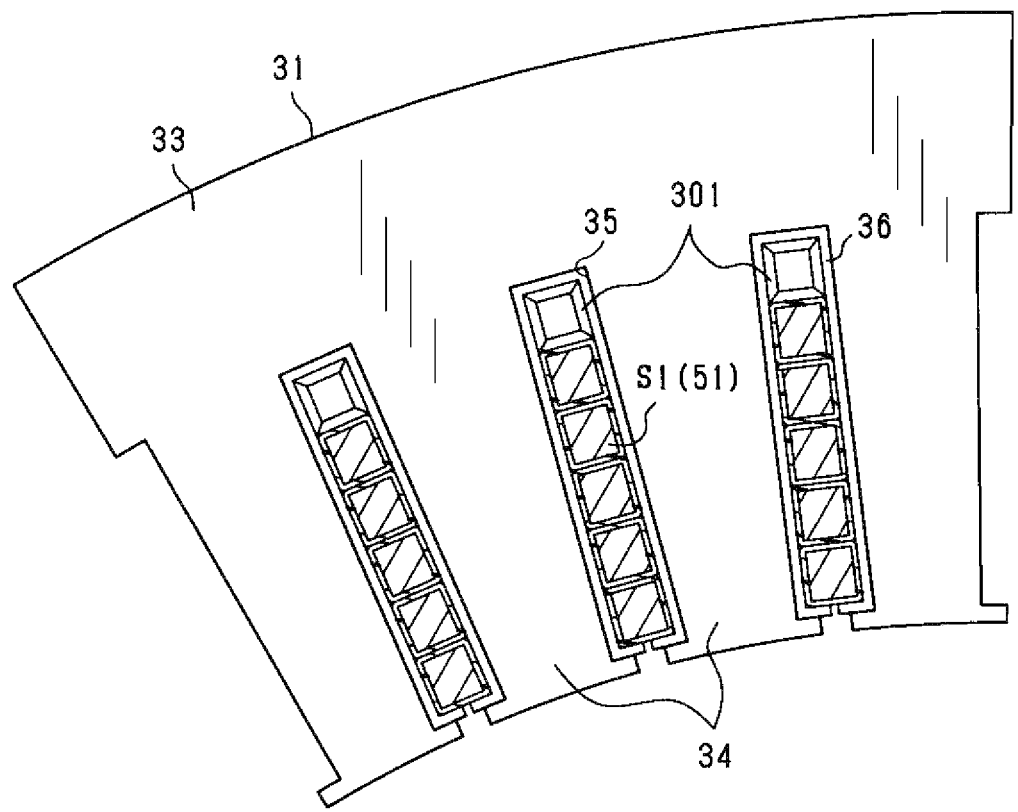
FIG. 52 is a lateral cross-sectional view of a modification of the stator.

As shown in FIG. 52, a dummy coil 301 may be housed inside the empty space that is provided on the outer side in the radial direction inside the slot 35. The empty space can be filled by the dummy coil 301. A varnish for coil bonding can be prevented from flowing out. In addition, when a magnetic body (such as a dust core) is used as the dummy coil 301, a magnetic path that decreases as a result of the empty space can be supplemented and performance can be improved. In addition, when an insulating heat-conductive member is used as the dummy coil 301, heat release from the coil side portion S1 can be supported and cooling performance can be improved. Here, as a result of an external exposed portion of the dummy coil 301 that is the insulating heat-conductive member being provided in an uneven shape, the cooling performance can be further improved.

Figure 53:
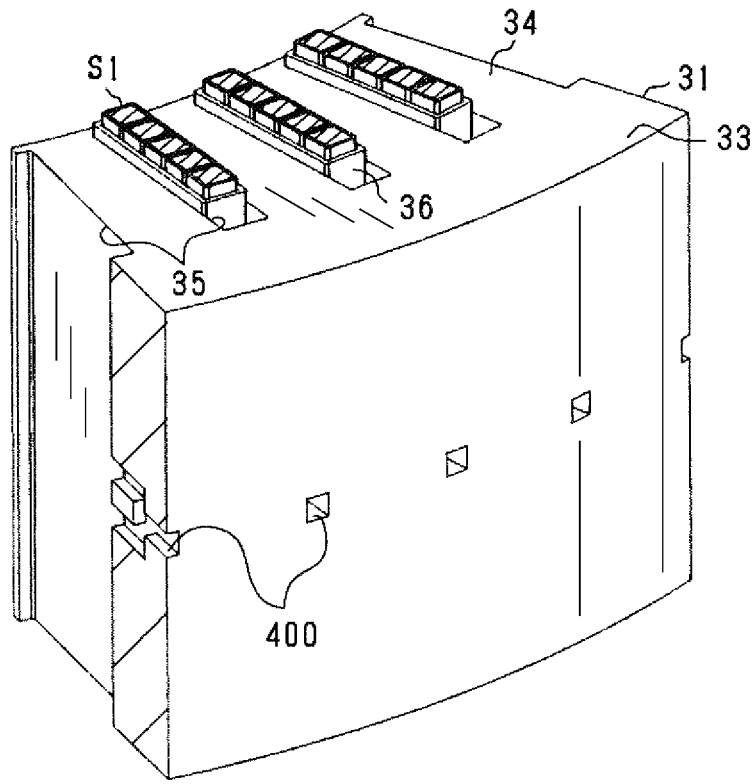
FIG. 53 is a perspective cross-sectional view of a modification of the stator.

As shown in FIG. 53, the back yoke 33 may be provided with a through hole 400 that passes through the back yoke 33 along the radial direction. The through hole 400 and the empty space that is provided on the outer side in the radial direction inside the slot 35 may be connected. In addition, a cooling oil may be passed through the through hole 400 and the empty space. That is, the through hole 400 and the empty space may be used as a passage for the oil. As a result, the stator winding 32 can be efficiently cooled.

Alternatively, the through hole 400 and the empty space may be used as a passage for varnish that is used to fix the stator winding 32. As a result, the stator winding 32 can be fixed with certainty inside the slots 35.

Figure 54:
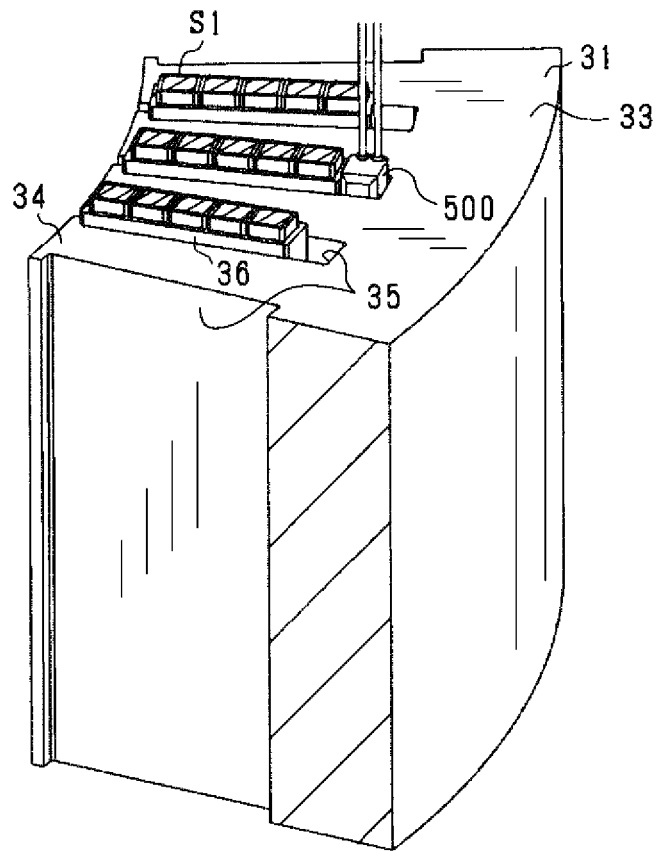
FIG. 54 is a perspective cross-sectional view of a modification of the stator.

As shown in FIG. 54, a temperature sensor 500 may be housed in the empty space. A coil temperature inside the stator core 31 that is expected to have a highest temperature in the stator winding 32 can be accurately detected. In addition, an attachment structure for the temperature sensor 500 need not be provided.

According to the above-described embodiments, the conductor segment 50 has a U-shape. However, the conductor segment 50 may be configured to have an I-shape. When the conductor segment 50 has the I-shape, the joining portion 55 is provided on both end in the axial direction of the stator 30. In addition, the conductor segment 50 may be configured to have a shape in which the conductor segment 50 is wound a plurality of times in a tortoise shell shape, a zigzag shape, or a combination thereof. In these cases, the conductor segment 50 has at least one or more turn portions 52 each on both sides in the axial direction of the stator 30.

According to the above-described embodiments, the joining portion 55 is provided on the second end side. However, the joining portion 55 may be provided on only the first end side or on both ends in the axial direction.

According to the above-described embodiments, the joining portion 55 includes that which connects together the conductor segments 50 in the coil end portions E1 and E2 on both ends in the axial direction and the coil side portions S1 by methods such as arc welding, tungsten inert gas (TIG) welding, laser welding, resistance welding, ultrasonic welding, friction stir welding, brazing, press-fitting, and joining with a conductive paste.

According to the above-described embodiment, on the second end side, the second coil end portion E22 connects together the coil side portions S1 in the outermost layer in the radial direction. However, the second coil end portion E22 may connect together the coil side portions S1 of a same layer other than the outermost layer. For example, the second coil end portion E22 may connect together the coil side portions S1 in the innermost layer.

In a similar manner, on the first end side, the second coil end portion E12 connects together the coil side portions S1 in the innermost layer in the radial direction. However, the second coil end portion E12 may connect together the coil side portions S1 of a same layer other than the innermost layer. For example, the second coil end portion E12 may connect together the coil side portions S1 in the outermost layer.

According to the above-described thirteenth to sixteenth embodiments (in which the stator winding 32 is a wave winding), the coil end portions E12 and E22 are provided in the outermost layer. However, the coil end portions E12 and E22 may be provided in a layer other than the outermost layer. For example, the coil end portions E12 and E22 may be provided in the innermost layer.

According to the above-described embodiments, the shapes of the coil end portions E1 and E2 may be arbitrarily modified such that interference with other coil end portions E1 and E2 does not occur.

According to the above-described embodiments, a distance (the number of pitches) between the coil side portions S1 that are connected by the coil end portions E1 and E2 may be arbitrarily changed. In addition, a configuration in which the number of poles is eight, the number of phases is three, and Q that is the number of slots per pole per phase is two is described. However, configurations that have other numbers of poles, numbers of phases, and Q are also applicable.

According to the above-described embodiment, the number of coil side portions S1 that are housed in each slot 35 may be arbitrarily changed. That is, the number of turns may be arbitrarily changed. In addition, a connection method is not limited to the Y connection (star connection). Types of connection such as a $\Delta$ connection and a Y–$\Delta$ connection may also be used.

According to the above-described embodiments, the number of lead-out lines and arrangements thereof in the stator windings 32 of the phases may be arbitrarily changed.

According to the above-described embodiments, the motor 10 is used as a motor for a vehicle. However, contents of the present application can also be applied to a rotating electric machine that functions as a power generator, or as both a motor and a power generator. In addition, an intended use of the motor 10 is not limited to the vehicle. The motor 10 can be applied to various uses such as transport equipment, household appliances, and air-conditioning and industrial facilities.

What is claimed is:
1. A rotating electric machine comprising:
an armature that includes
an armature winding, and
an armature core around which the armature winding is wound, wherein:
the armature is provided with a plurality of slots in a circumferential direction thereof;

the armature winding includes a plurality of segmented conductors which are connected;

each of the segmented conductors includes a coil side portion that is housed in the slots and coil end portions that protrude from the armature core at first and second ends in an axial direction of the armature core;

the coil side portions are housed in the slots so as to form 2N+1 layers, where N is a natural number;

the coil end portions are configured to connect two coil side portions that are respectively housed in the slots that are a predetermined pitch apart in the circumferential direction;

the coil end portions are comprised of a first coil end portion type that connects together the coil side portions of differing layers in a radial direction and a second coil end portion type that connects together the coil side portions of a same layer in the radial direction;

the coil end portions of the second coil end portion type are located at both the first and second ends in the axial direction of the armature core;

the armature winding is a lap winding;

at at least one of the first and second ends in the axial direction, the coil end portion includes a joining portion in which conductor end portions of the segmented conductors are connected together; and the coil end portions of the second coil end portion type connects together the coil side portions in an innermost layer or an outermost layer in the radial direction.

2. The rotating electric machine according to claim 1, wherein:

at the first end in the axial direction, the coil side portion that is housed in the outermost layer in the radial direction is connected to the coil end portions of the second coil end portion type, and at the second end, the coil side portion that is housed in the innermost layer is connected to the coil end portions of the second coil end portion type.

3. The rotating electric machine according to claim 1, wherein:

the conductor end portions are joined so as to overlap in the radial direction in the joining portion of the coil end portions of the first coil end portion type; and the conductor end portions are joined so as to overlap in the circumferential direction in the joining portion in the coil end portions of the second coil end portion type.

4. The rotating electric machine according to claim 1, wherein:

the joining portion of the coil end portions of the second coil end portion type is shifted in the circumferential direction in relation to the joining portion of the coil end portions of the first coil end portion type.

5. The rotating electric machine according to claim 1, wherein:

the coil end portions of the second coil end portion type is bent in the radial direction such that the joining portion protrudes further toward an inner side in the radial direction than the innermost layer is or further toward an outer side in the radial direction than the outermost layer is.

6. The rotating electric machine according to claim 1, wherein:

two coil end portions of the second coil end portion type that have differing pitches in the circumferential direction are arranged so as to overlap in the axial direction in a same position in the circumferential direction; and the two coil end portions of the second coil end portion type each connect together the coil side portions in the innermost layer or the outermost layer in the radial direction, and are each bent in the radial direction such that the respective joining portions protrude further toward an inner side in the radial direction than the innermost layer is or further toward an outer side in the radial direction than the outermost layer is.

7. The rotating electric machine according to claim 1, wherein:

two coil end portions of the second coil end portion type that have differing pitches in the circumferential direction each connect together the coil side portions in the innermost layer or the outermost layer in the radial direction, and are arranged such that positions in the axial direction of respective joining portions coincide and the two coil end portions of the second coil end portion type are shifted in the circumferential direction.

8. The rotating electric machine according to claim 1, wherein:

a space is provided in the slots.

9. The rotating electric machine according to claim 8, wherein:

the slots are configured to house 2N+2 layers, where N is a natural number, of the coil side portions.

10. The rotating electric machine according to claim 8, wherein:

the coil side portion that is adjacent to the space is bent such that a portion of the coil side portion is housed in the space.

11. The rotating electric machine according to claim 10, wherein:

the coil side portion that is adjacent to the space is bent on both ends in the axial direction and both ends are housed in the space.

12. The rotating electric machine according to claim 8, wherein:

a coolant passage through which a coolant passes is housed in the space.

13. The rotating electric machine according to claim 8, further comprising:

a bus bar unit that connects together winding end portions of the armature windings that are separated in the circumferential direction;

the bus bar unit is arranged on the outer side in the radial direction of the coil end portion;

the bus bar unit is fixed to the armature core by a fixing member; and the fixing member is inserted into the space and fixed.

14. The rotating electric machine according to claim 8, wherein:

a dummy coil is housed in the space.

15. The rotating electric machine according to claim 1, wherein:

the segmented conductor is configured to have a U-shape or an I-shape.

16. The rotating electric machine according to claim 1, wherein:

the coil end portions of the first coil end portion type connects together the coil side portions that are separated by a same pitch as a pole pitch in the circumferential direction.

17. The rotating electric machine according to claim 1, wherein:

the coil end portions of the first coil end portion type connects together the coil side portions that are separated by a pitch that is smaller than a pole pitch in the circumferential direction.

18. The rotating electric machine according to claim 1, wherein:
- at the first end in the axial direction, only the coil side portions that are housed in the innermost layer in the radial direction are connected to the coil end portions of the second coil end portion type; and
- at the second end in the axial direction, only the coil side portions that are housed in the outermost layer in the radial direction are connected to the coil end portions of the second coil end portion type.

* * * * *